US008648745B2

(12) United States Patent
Kanamoto

(10) Patent No.: US 8,648,745 B2
(45) Date of Patent: Feb. 11, 2014

(54) ELECTRONIC SCANNING RADAR APPARATUS, RECEIVED WAVE DIRECTION ESTIMATING METHOD, AND RECEIVED WAVE DIRECTION ESTIMATING PROGRAM

(75) Inventor: Junji Kanamoto, Yokohama (JP)

(73) Assignee: Honda elesys Co., Ltd., Yokohama (JP)

( * ) Notice: Subject to any disclaimer, the term of this patent is extended or adjusted under 35 U.S.C. 154(b) by 289 days.

(21) Appl. No.: 13/276,157

(22) Filed: Oct. 18, 2011

(65) Prior Publication Data

US 2012/0268316 A1    Oct. 25, 2012

(30) Foreign Application Priority Data

Oct. 21, 2010    (JP) .................................. 2010-236672

(51) Int. Cl.
*G01S 13/42*    (2006.01)
*G01S 13/93*    (2006.01)

(52) U.S. Cl.
USPC ............. 342/158; 342/70; 342/108; 342/189; 342/194

(58) Field of Classification Search
USPC ..................... 342/70–72, 107–111, 113, 133, 342/139–140, 145–147, 157–158, 189, 342/194–195
See application file for complete search history.

(56) References Cited

U.S. PATENT DOCUMENTS

| | | | |
|---|---|---|---|
| 6,369,747 B1 * | 4/2002 | Ashihara | 342/70 |
| 7,893,864 B2 * | 2/2011 | Shibata et al. | 342/70 |
| 7,907,083 B2 * | 3/2011 | Sakamoto et al. | 342/70 |
| 8,179,303 B2 * | 5/2012 | Kishida et al. | 342/70 |
| 8,441,395 B2 * | 5/2013 | Kanamoto | 342/107 |
| 8,466,830 B2 * | 6/2013 | Kanamoto | 342/149 |
| 2007/0171123 A1 * | 7/2007 | Nakano et al. | 342/173 |
| 2012/0038506 A1 * | 2/2012 | Kanamoto et al. | 342/158 |
| 2012/0242535 A1 * | 9/2012 | Kanamoto | 342/158 |
| 2012/0249360 A1 * | 10/2012 | Kanamoto | 342/158 |
| 2012/0268313 A1 * | 10/2012 | Shimizu et al. | 342/107 |
| 2012/0268314 A1 * | 10/2012 | Kuwahara et al. | 342/147 |
| 2012/0268316 A1 * | 10/2012 | Kanamoto | 342/158 |

FOREIGN PATENT DOCUMENTS

| | | |
|---|---|---|
| JP | 2006-275840 A | 10/2006 |
| JP | 2009-156582 A | 7/2009 |
| JP | 2009-162688 A | 7/2009 |

OTHER PUBLICATIONS

Steven M. Kay, "Modern Spectral Estimation Theory & Application", Sinusoidal Parameter Estimation, Chapt. 13, pp. 426-428, 1988.

* cited by examiner

*Primary Examiner* — John B Sotomayor
(74) *Attorney, Agent, or Firm* — Arent Fox LLP

(57) ABSTRACT

An electronic scanning radar apparatus in accordance with an embodiment of the present invention, a frequency resolving unit resolves beat signals into beat frequencies having a predetermined frequency bandwidth and calculates complex data based on the resolved beat signals for each beat frequency. An azimuth calculating unit estimates a number of received waves based on eigenvalues of a matrix being part of a primary normal equation having complex data as elements calculated from the beat signals, creates coefficients calculated as a solution of a secondary normal equation of a signal subspace created based on eigenvalues and eigenvectors corresponding to the number of the estimated waves, and calculates a DOA of a received wave based on the created coefficients.

29 Claims, 44 Drawing Sheets

FIG. 5

| | ASCENDING PEAK → | | | | |
|---|---|---|---|---|---|
| | 1 | 2 | 3 | 4 | 5 |
| 1 | $r_{11}$ $v_{11}$ $pu_1$ $pd_1$ | $r_{12}$ $v_{12}$ $pu_2$ $pd_2$ | ... | | |
| 2 | $r_{21}$ $v_{21}$ $pu_1$ $pd_2$ | $r_{22}$ $v_{22}$ $pu_2$ $pd_2$ | | | |
| 3 | ... | ... | | | |
| 4 | | | | | |
| 5 | | | | | $r_{55}$ $v_{55}$ $pu_5$ $pd_5$ |

DESCENDING PEAK ↓

AFTER DBF, MATRIX IS CREATED FOR EVERY ANGLE CH

FIG. 6

| TARGET GROUP NUMBER | DISTANCE | RELATIVE VELOCITY | FREQUENCY POINT |
|---|---|---|---|
| TARGET GROUP NUMBER 1 | $r_1$ | $v_1$ | $f_1$ |
| TARGET GROUP NUMBER 2 | $r_2$ | $v_2$ | $f_2$ |
| TARGET GROUP NUMBER 3 | $r_3$ | $v_3$ | $f_3$ |
| TARGET GROUP NUMBER 4 | $r_4$ | $v_4$ | $f_4$ |
| ⋮ | | | |

FIG. 10

EXAMPLE: THIRD ORDER NORMAL EQUATION
 (3 WAVES RECEIVABLE BY MODIFIED COVARIANCE FUNCTION)

COVARIANCE MATRIX Cxx (FIRST MEANS)

EIGENVALUE DECOMPOSITION (COMPLEX NUMBER)

$|C_{xx} - \lambda I| = 0$  CHARACTERISTIC EQUATION

ARBITRARY SOLUTION PROGRAM IS USED (ITERATIVE METHOD
ALGORITHMS SUCH AS JACOBI METHOD,
HOUSEHOLDER METHOD, AND QR METHOD
CAN BE USED)

EIGENVALUE $\lambda_1, \lambda_2, \lambda_3$
EIGENVECTOR $v_1, v_2, v_3$

ASCENDING

|  | ANGLE 1 | ANGLE 2 | ... | FREQUENCY POINT |
|---|---|---|---|---|
| TARGET GROUP 1 | $t_1\_ang_1$ | $t_1\_ang_2$ |  | $f_1$ |
| TARGET GROUP 2 | $t_2\_ang_1$ | $t_2\_ang_2$ |  | $f_2$ |
| TARGET GROUP 3 | $t_3\_ang_1$ | $t_3\_ang_2$ |  | $f_3$ |
| TARGET GROUP 4 | $t_4\_ang_1$ | $t_4\_ang_2$ |  | $f_4$ |
| ⋮ |  |  |  |  |

DESCENT

|  | ANGLE 1 | ANGLE 2 | ... | FREQUENCY POINT |
|---|---|---|---|---|
| TARGET GROUP 1 | $t_1\_ang_1$ | $t_1\_ang_2$ |  | $f_1$ |
| TARGET GROUP 2 | $t_2\_ang_1$ | $t_2\_ang_2$ |  | $f_2$ |
| TARGET GROUP 3 | $t_3\_ang_1$ | $t_3\_ang_2$ |  | $f_3$ |
| TARGET GROUP 4 | $t_4\_ang_1$ | $t_4\_ang_2$ |  | $f_4$ |
| ⋮ |  |  |  |  |

FIG. 18

| TARGET GROUP NO. | LONGITUDINAL DISTANCE | LONGITUDINAL POSITION | LATERAL POSITION | RELATIVE VELOCITY | FREQUENCY POINT |
|---|---|---|---|---|---|
| TARGET GROUP 1 | $r_1$ | $long\_d_1$ | $late\_d_1$ | $v_1$ | $f_1$ |
| TARGET GROUP 2 | $r_2$ | $long\_d_2$ | $late\_d_2$ | $v_2$ | $f_2$ |
| TARGET GROUP 3 | $r_3$ | $long\_d_3$ | $late\_d_3$ | $v_3$ | $f_3$ |
| TARGET GROUP 4 | $r_4$ | $long\_d_4$ | $late\_d_4$ | $v_4$ | $f_4$ |
| ⋮ | | | | | |

FIG. 26

|  |  | t (GROUP) | t (PREDICTION) | t − 1 |
|---|---|---|---|---|
| TARGET 1 | r |  |  |  |
|  | Long_d |  |  |  |
|  | Late_d |  |  |  |
|  | velo |  |  |  |
|  | f_up |  |  |  |
|  | x_up_1 |  |  |  |
|  | x_up_2 |  |  |  |
|  | f_dwn |  |  |  |
|  | x_dwn_1 |  |  |  |
|  | x_dwn_2 |  |  |  |
| TARGET 2 | r |  |  |  |
|  | Long_d |  |  |  |
|  | Late_d |  |  |  |
|  | velo |  |  |  |
|  | f_up |  |  |  |
|  | x_up_1 |  |  |  |
|  | x_up_2 |  |  |  |
|  | f_dwn |  |  |  |
|  | x_dwn_1 |  |  |  |
|  | x_dwn_2 |  |  |  |
| ⋮ | ⋮ | ⋮ | ⋮ | ⋮ | r: DISTANCE
Long_d: LONGITUDINAL POSITION
Late_d: LATERL POSITION
velo: RELATIVE VELOCITY
f_up: ASCENDING PEAK FREQUENCY
x_up_1: COMPLEX DATA (FIRST) OF ASCENDING PEAK FREQUENCY
x_up_2: COMPLEX DATA (SECOND) OF ASCENDING PEAK FREQUENCY
f_dwn: DESCENDING PEAK FREQUENCY
x_dwn_1: COMPLEX DATA (FIRST) OF DESCENDING PEAK FREQUENCY
x_dwn_2: COMPLEX DATA (SECOND) OF DECENDING PEAK FREQUENCY

FIG. 29

|  |  | t (GROUP) | t (PREDICTION) | t − 1 |
|---|---|---|---|---|
| TARGET 1 | r |  |  |  |
|  | Long_d |  |  |  |
|  | Late_d |  |  |  |
|  | velo |  |  |  |
|  | f_up |  |  |  |
|  | $C_{xxave\_up}$ |  |  |  |
|  | $c_{xxave\_up}$ |  |  |  |
|  | f_dwn |  |  |  |
|  | $C_{xxave\_dwn}$ |  |  |  |
|  | $c_{xxave\_dwn}$ |  |  |  |
| TARGET 2 | r |  |  |  |
|  | Long_d |  |  |  |
|  | Late_d |  |  |  |
|  | velo |  |  |  |
|  | f_up |  |  |  |
|  | $C_{xxave\_up}$ |  |  |  |
|  | $c_{xxave\_up}$ |  |  |  |
|  | f_dwn |  |  |  |
|  | $C_{xxave\_dwn}$ |  |  |  |
|  | $c_{xxave\_dwn}$ |  |  |  |
| ⋮ | ⋮ | ⋮ | ⋮ | ⋮ | r: DISTANCE
Long_d: LONGITUDINAL POSITION
Late_d: LATERAL POSITION
velo: RELATIVE VELOCITY
f_up: ASCENDING PEAK FREQUENCY
$C_{xxave\_up}$: COVARIANCE MATRIX OF ASCENDING PEAK FREQUENCY
$c_{xxave\_up}$: RIGHT-HAND VECTOR OF ASCENDING PEAK FREQUENCY
f_dwn: DESCENDING PEAK FREQUENCY
$C_{xxave\_dwn}$: COVARIANCE MATRIX OF DESCENDING PEAK FREQUENCY
$c_{xxave\_dwn}$: RIGHT-HAND VECTOR OF DESCENDING PEAK FREQUENCY

FIG. 32

| | | t (GROUP) | (PREDICTIO | t − 1 |
|---|---|---|---|---|
| TARGET 1 | r | | | |
| | Long_d | | | |
| | Late_d | | | |
| | velo | | | |
| | f_up | | | |
| | Ave_C$_{xx}$_up | | | |
| | Ave_c$_{xx}$_up | | | |
| | f_dwn | | | |
| | Ave_C$_{xx}$_dwn | | | |
| | Ave_c$_{xx}$_dwn | | | |
| TARGET 2 | r | | | |
| | Long_d | | | |
| | Late_d | | | |
| | velo | | | |
| | f_up | | | |
| | Ave_C$_{xx}$_up | | | |
| | Ave_c$_{xx}$_up | | | |
| | f_dwn | | | |
| | Ave_C$_{xx}$_dwn | | | |
| | Ave_c$_{xx}$_dwn | | | |
| ⋮ | ⋮ | ⋮ | ⋮ | ⋮ | r: DISTANCE
Long_d: LONGITUDINAL POSITION
Late_d: LATERAL POSITION
velo: RELATIVE VELOCITY
f_up: ASCENDING PEAK FREQUENCY
Ave_C$_{xx}$_up: AVERAGED COVARIANCE MATRIX OF ASCENDING PEAK FREQUENCY
Ave_c$_{xx}$_up: AVERAGED RIGHT-HAND VECTOR OF ASCENDING PEAK FREQUENCY
f_dwn: DESCENDING PEAK FREQUENCY
Ave_C$_{xx}$_dwn: AVERAGED COVARIANCE MATRIX OF DESCENDING PEAK FREQUENCY
Ave_c$_{xx}$_dwn: AVERAGED RIGHT-HAND VECTOR OF DESCENDING PEAK FREQUENCY

FIG. 36

| | | t (GROUP) | t (PREDICTION) | t − 1 |
|---|---|---|---|---|
| TARGET 1 | r | | | |
| | Long_d | | | |
| | Late_d | | | |
| | velo | | | |
| | f_up | | | |
| | x_up_1 | | | |
| | x_up_2 | | | |
| | AR_C_up | | | |
| | f_dwn | | | |
| | x_dwn_1 | | | |
| | x_dwn_2 | | | |
| | AR_C_dwn | | | |
| TARGET 2 | r | | | |
| | Long_d | | | |
| | Late_d | | | |
| | velo | | | |
| | f_up | | | |
| | x_up_1 | | | |
| | x_up_2 | | | |
| | AR_C_up | | | |
| | f_dwn | | | |
| | x_dwn_1 | | | |
| | x_dwn_2 | | | |
| | AR_C_dwn | | | |
| ⋮ | ⋮ | ⋮ | ⋮ | ⋮ | r: DISTANCE
Long_d: LONGITUDINAL POSITION
Late_d: LATERL POSITION
velo: RELATIVE VELOCITY
f_up: ASCENDING PEAK FREQUENCY
x_up_1: COMPLEX DATA (FIRST) OF ASCENDING PEAK FREQUENCY
x_up_2: COMPLEX DATA (SECOND) OF ASCENDING PEAK FREQUENCY
AR_C_up: AR COEFFICIENT OF ASCENDING PEAK FREQUENCY
f_dwn: DESCENDING PEAK FREQUENCY
x_dwn_1: COMPLEX DATA (FIRST) OF DESCENDING PEAK FREQUENCY
x_dwn_2: COMPLEX DATA (SECOND) OF DECENDING PEAK FREQUENCY
AR_C_dwn: AR COEFFICIENT OF DESCENDING PEAK FREQUENCY

FIG. 39A

ASCENDING

|  | ANGLE 1 | ANGLE 2 | ... | FREQUENCY POINT |
|---|---|---|---|---|
| TARGET GROUP 1 | $t_{1\_}ang_1$ | $t_{1\_}ang_2$ |  | $f_1$ |
| TARGET GROUP 2 | $t_{2\_}ang_1$ | $t_{2\_}ang_2$ |  | $f_2$ |
| TARGET GROUP 3 | $t_{3\_}ang_1$ | $t_{3\_}ang_2$ |  | $f_3$ |
| TARGET GROUP 4 | $t_{4\_}ang_1$ | $t_{4\_}ang_2$ |  | $f_4$ |
| ⋮ |  |  |  |  |

FIG. 39B

DESCENT

|  | ANGLE 1 | ANGLE 2 | ... | FREQUENCY POINT |
|---|---|---|---|---|
| TARGET GROUP 1 | $t_{1\_}ang_1$ | $t_{1\_}ang_2$ |  | $f_1$ |
| TARGET GROUP 2 | $t_{2\_}ang_1$ | $t_{2\_}ang_2$ |  | $f_2$ |
| TARGET GROUP 3 | $t_{3\_}ang_1$ | $t_{3\_}ang_2$ |  | $f_3$ |
| TARGET GROUP 4 | $t_{4\_}ang_1$ | $t_{4\_}ang_2$ |  | $f_4$ |
| ⋮ |  |  |  |  |

FIG. 41

| TARGET GROUP NO. | LONGITUDINAL DISTANCE | LONGITUDINAL POSITION | LATERAL POSITION | RELATIVE VELOCITY | FREQUENCY POINT |
|---|---|---|---|---|---|
| TARGET GROUP 1 | $r_1$ | $long\_d_1$ | $late\_d_1$ | $v_1$ | $f_1$ |
| TARGET GROUP 2 | $r_2$ | $long\_d_2$ | $late\_d_2$ | $v_2$ | $f_2$ |
| TARGET GROUP 3 | $r_3$ | $long\_d_3$ | $late\_d_3$ | $v_3$ | $f_3$ |
| TARGET GROUP 4 | $r_4$ | $long\_d_4$ | $late\_d_4$ | $v_4$ | $f_4$ |
| ⋮ | | | | | |

FIG. 45
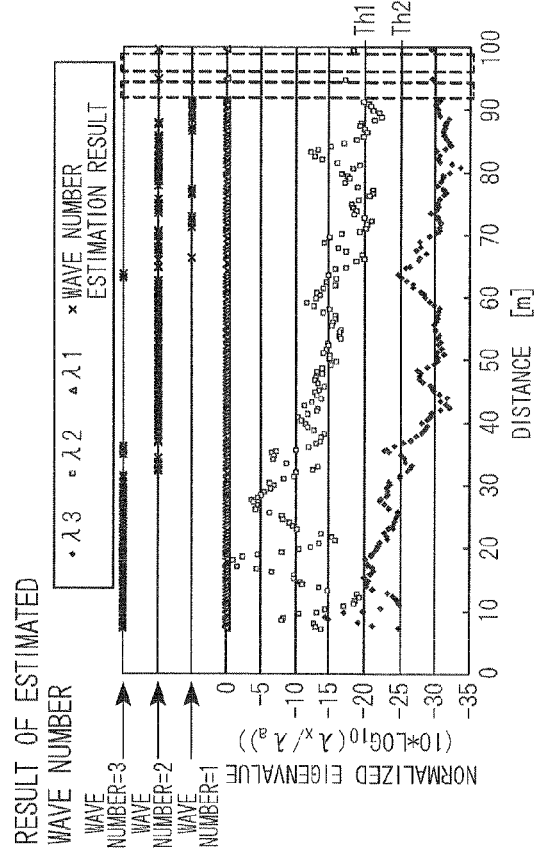
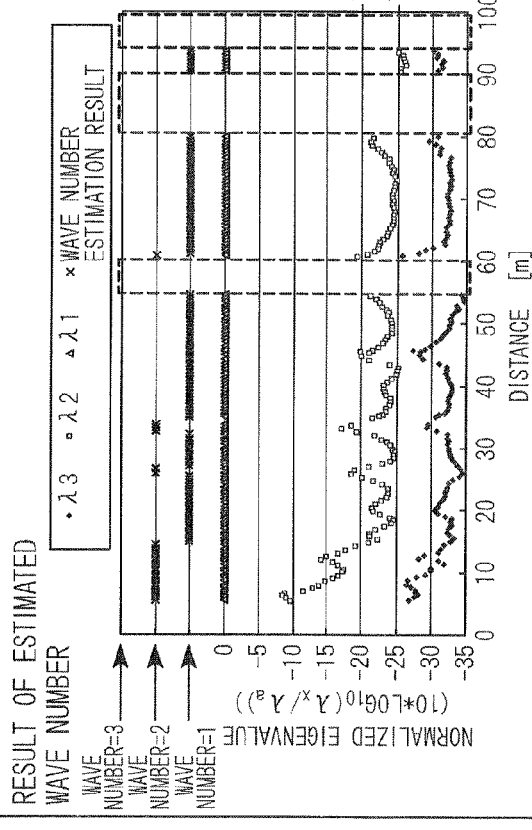

FIG. 46

PART 1

CONFIRM IF PEAKS ARE SEPARATED IN PRESENT EMBODIMENT (a).
SELECT DISTANCE POINT IN WHICH PEAKS
ARE NOT SEPARATED WITH ORDER 2 (b).

PART 2

POWER SPECTRUM FOR PART 2 IN FIG. 45
AT DISTANCE 60m
(RESULT OF WAVE NUMBER ESTIMATION = 2)

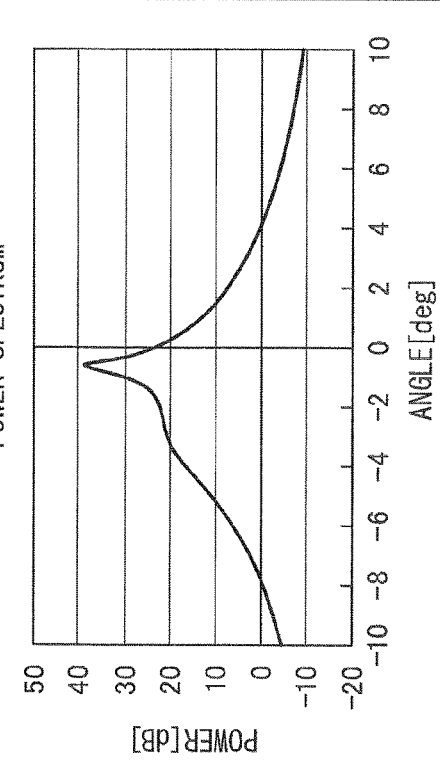

STANDARD AR SPECTRUM ESTIMATION RESULT
FOR ORDER 2 POWER SPECTRUM

PEAKS ARE NOT SEPARATED

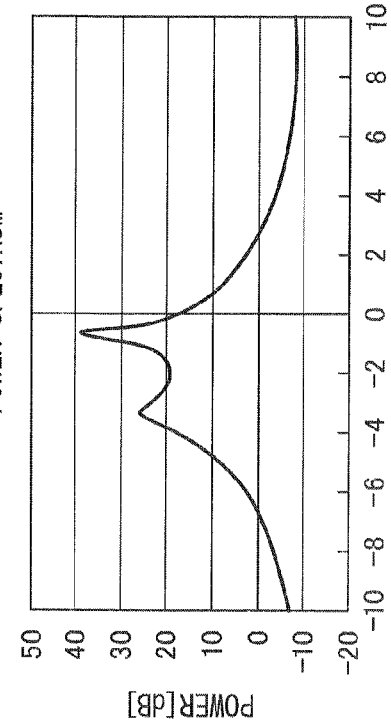

AR ESTIMATION RESULT ACCORDING TO THE PRESENT
EMBODIMENT (WAVE NUMBER 2 WITH ORDER 3)

PEAKS ARE SEPARATED

ELECTRONIC SCANNING RADAR APPARATUS, RECEIVED WAVE DIRECTION ESTIMATING METHOD, AND RECEIVED WAVE DIRECTION ESTIMATING PROGRAM

CROSS REFERENCE TO RELATED APPLICATIONS

Priority is claimed on Japanese Patent Application No. 2010-236672, filed Oct. 21, 2010, the content of which is incorporated herein by reference.

BACKGROUND OF THE INVENTION

1. Field of the Invention

The present invention relates to an electronic scanning radar apparatus and a received wave direction estimating method, which can detect a target using a reflected wave from the target in response to a transmitted wave and which can be suitably used for a vehicle, and a received wave direction estimating program used therein.

2. Description of Related Art

Electronic scanning type radars such as an FMCW (Frequency Modulated Continuous Wave) radar, a multi-frequency CW (Continuous Wave) radar, and a pulse radar have been known for some time.

In the radars, an arrival wave direction estimating method of an array antenna is used as a technique of detecting an arrival wave (or a received wave) from a target (a reflecting object).

Japanese Patent Application Nos. JP-A-2006-275840 (patent document 1), JP-A-2009-156582 (patent document 2), and JP-A-2009-162688 (patent document 3) describe that as an arrival wave direction estimating method using array antennas, high-resolution (high-accuracy) algorithms such as an AR spectrum estimating method (FIG. 47) which can obtain high resolution without increasing the number of channels of a receiving antenna and a MUSIC (Multiple Signal Classification) method have been used. The AR spectrum estimating method may be called a maximum entropy method (MEM) or a linear prediction method.

When an arrival direction (direction of Arrival: DOA) of a received wave from a target (a reflecting object) is estimated using such algorithms, the estimation process is performed after input data (data in which a noise component is mixed into a complex sinusoidal wave) expressed by a complex number is transformed into a matrix format of a correlation matrix. An arrival direction may be referred to as a DOA (Direction of Arrival).

For an arrival wave direction estimating method used in an in-vehicle radar, a correlation matrix in a past control cycle is stored and is subjected to an averaging process (or an adding process) with a correlation matrix in the present control cycle and then a direction estimating process is performed, to suppress a noise component and to improve estimation accuracy. Japanese Patent Application No. JP-A-2009-156582 describes that an averaging process of the correlation matrix provides a large improvement in a direction detection accuracy (azimuth accuracy or separation capability).

In addition, Japanese Patent Application JP-A-2009-162688 describes that such algorithms have a drawback in which the estimation should be performed after an appropriate number of arrival waves (received waves) (model order in the case of the AR spectrum estimating method) is set. It is necessary to set an appropriate value when the algorithm is applied to an in-vehicle radar.

With respect to the AR spectrum estimation method, the algorithm is performed by relatively light computational load, and which can perform an azimuth estimation process for a number of targets existing in a distance direction. Thus, the AR spectrum estimation method is suitable for in-vehicle radars. Furthermore, in comparison with the MUSIC method, the AR spectrum estimation method has an advantage, which can perform estimation without sensitively setting of the received wave number (a number of model orders), and the estimation accuracy improves as the number of model orders increases.

On the other hand, in the AR spectrum estimation method, when the number of received waves is much smaller than the number of settled orders and the noise component is a large number, there is an issue which a fail peak may be detected even if the averaging process is performed for the correlation matrix (normal equation) to improve accuracy.

Furthermore, for use as in-vehicle radar, which needs small size and low cost, the configuration of receiving system is required to design for less channel (CH) number, and for a case where the configuration is designed suitable for less channel (CH) number, the number of orders to be set becomes limited. In addition, even if the CH number of receiving system can be reduced, both setting a great number of orders and establishing a suitable setting in response to the number of signal receiving waves can be insufficient at the same time, because only setting a number of orders is possible for the AR spectrum estimation method (defined as a standard AR spectrum estimation method).

As a general estimation method of receiving wave number, an FPE (Final Prediction Error) method, an AIC (Akaike Information Criterion) method, an MDL (Minimum Description Length) method and the like are described, which determine a number of receiving waves. However, these methods require heavy computational load and any of these methods do not assure to provide high accuracy estimation result. There are few reports on research examples with respect to a small number of channels and a range of low orders for use of in-vehicle radar.

SUMMARY OF THE INVENTION

Embodiments in accordance with the present invention are taken into consideration for these circumstances. An object of the present invention is to provide an electronic scanning radar apparatus, a received wave direction estimating method, and a received wave direction estimating program, which allow to precisely detect a direction, by setting an appropriate signal received wave number for an order set in the AR model and performing a spectrum estimation with a normal equation of a signal subspace (signal component).

According to an embodiment of the present invention, there is provided an electronic scanning radar apparatus mounted on a moving object that includes a receiving unit configured to include a plurality of antennas receiving a received wave arriving from a target having reflected a transmitted wave; a beat signal generating unit configured to generate beat signals from the transmitted wave and the received wave; a frequency resolving unit configured to resolve the beat signals into beat frequencies having a predetermined frequency bandwidth and calculate complex data based on the resolved beat signals for each beat frequency; and an azimuth detecting unit configured to estimate a wave number of the received wave based on an eigenvalue being a component part of a normal equation having complex data as elements calculated based on the beat signals, create a coefficient calculated as a solution of a normal equation of a signal subspace formed based on eigenvalues and eigenvectors corresponding to a number of the estimated wave number, and calculate a DOA of the received wave based on the created coefficient.

According to an embodiment of the present invention, the azimuth detecting unit calculates the DOA of the received wave based on the normal equation of the signal subspace by an AR spectrum estimating method using an autoregressive model.

According to an embodiment of the present invention, the azimuth detecting unit estimates the wave number based on a calculated result according to a value of the eigenvalue, separates a signal subspace being effective and a noise subspace in response to the wave number, and calculates the coefficient from the signal subspace.

According to an embodiment of the present invention, the azimuth detecting unit calculates the coefficient based on the normal equation of the signal subspace formed from the eigenvector and the eigenvalue obtained by eigenvalue decomposition being a component part of the normal equation.

According to an embodiment of the present invention, the azimuth detecting unit calculates the eigenvalues and the eigenvectors from a matrix being a component part of the normal equation having the same order as the order being applied to the order of the normal equation created based on complex data calculated from the beat signals.

According to an embodiment of the present invention, the azimuth detecting unit calculates the eigenvalues and the eigenvectors from an averaged matrix being a component part of an averaged normal equation obtained by averaging a plurality of normal equations.

According to an embodiment of the present invention, the azimuth detecting unit creates the averaged normal equation for calculating the eigenvalues and the eigenvectors from complex data acquired in detection cycles corresponding to predetermined detection times including a present detection cycle in repeatedly performed detection cycles calculating the DOA of the received wave.

According to an embodiment of the present invention, the azimuth detecting unit performs an averaging process to a matrix and a right-hand vector being a component part of a normal equation having complex data as elements in advance of calculations of the eigenvalues and eigenvectors.

According to an embodiment of the present invention, the azimuth detecting unit determines the eigenvalues with a fixed threshold value being independent on a distance between the target and the electronic scanning radar apparatus and estimates the wave number.

According to an embodiment of the present invention, the azimuth detecting unit normalizes the eigenvalues based on a maximum value of the eigenvalues when a value calculated from the eigenvalues is equal or greater than a predetermined threshold value.

According to an embodiment of the present invention, a value calculated from the eigenvalues is either the maximum value of the eigenvalues or a sum total of the eigenvalues.

According to an embodiment of the present invention, the azimuth detecting unit determines values of the normalized eigenvalues bases on a predetermined threshold value, and selects the wave number based on a determination result of the values.

According to an embodiment of the present invention, the azimuth detecting unit selects the wave number based on each result determined from values calculated from the eigenvalues using plural threshold values.

According to an embodiment of the present invention, the azimuth detecting unit interrupts the wave number estimation process based on the value calculated from the eigenvalues.

According to an embodiment of the present invention, the azimuth detecting unit determines to interrupt the wave number estimation process based on either the maximum value of the eigenvalues or a sum total of the eigenvalues.

According to an embodiment of the present invention, the azimuth detecting unit interrupts a calculation process of the DOA of the received wave based on interruption of the wave number estimation process.

According to an embodiment of the present invention, the azimuth detecting unit forcibly sets an arbitrary predetermined wave number as the wave number based on interruption of the wave number estimation process.

According to an embodiment of the present invention, the electronic scanning radar apparatus further includes a memory unit configured to store complex data based on the beat signals detected in detection cycles repeatedly calculating the DOA of the received wave; and a target link unit configured to correlate with a target to be detected and store the complex data correlated with the correlated target to the memory unit in a present detection cycle and a past detection cycle performed before the present detection cycle.

According to an embodiment of the present invention, the memory unit stores the distance from the correlated target and the relative velocity of the correlated target detected in the past detection cycle in accordance with the complex data or a normal equation, and the target link unit correlates the target in the present detection cycle and a target in the past detection cycle time sequentially related to the present detection cycle being correlated with the target in the present detection cycle.

According to an embodiment of the present invention, when the target link unit correlates targets respectively detected in the present and past detection cycles, the target link unit detects whether or not the targets in the present and past detection cycles correspond to the correlated target based on a result determined whether a present distance and a present relative velocity obtained from a detection beat frequency in the present detection cycle is respectively included in a distance range and a relative velocity range calculated based on a past distance and a past relative velocity obtained in the past detection cycle.

According to an embodiment of the present invention, the azimuth detecting unit creates the matrix being a component part of the averaged normal equation for calculating the eigenvalues and the eigenvectors including the complex data acquired in the past detection cycle.

According to an embodiment of the present invention, the azimuth detecting unit includes the normal equation calculated in the past detection cycle with the matrix being a component part of the normal equation and the averaged normal equation for calculating the eigenvalues and the eigenvectors.

According to an embodiment of the present invention, the azimuth detecting unit estimates a spectrum by averaging the coefficient calculated from the normal equation of the signal subspace for calculating the DOA of the received wave and another coefficient calculated based on the normal equation of the signal subspace in the past detection cycle.

According to an embodiment of the present invention, the electronic scanning radar apparatus further includes a target detecting unit configured to detect a presence of the target by detecting a peak value from an intensity value of the beat frequency, wherein the azimuth detecting unit calculates the DOA of the received wave based on complex data corresponding to the target which the target detecting unit has detected the presence of the target.

According to an embodiment of the present invention, the electronic scanning radar apparatus further includes a DBF processing unit configured to detect the presence of the target and an azimuth of the target based on a digital beam forming process increasing a detection sensitivity of the received wave receiving from a predetermined direction based on the complex data; and a target link unit configured to correlate with the detected target and store the complex data correlated with the correlated target to the memory unit in a present detection cycle and a past detection cycle performed before the present detection cycle, wherein the target detecting unit further includes a normal equation creating unit configured to create a normal equation and detect an azimuth of the target based on the digital beam forming process of the beat frequency in the present detection cycle, and the target link unit correlates with the target in the present and past detection cycles with respect to a distance, a relative velocity and an azimuth.

According to an embodiment of the present invention, the DBF processing unit further includes a channel deleting unit configured to detect a target, determine the target as a DBF detection target, replace a spectrum intensity of an angular channel where a target has not been detected with "0," and output resultant data as new spatial complex data, when intensities of spectra of adjacent angular channels are greater than a predetermined DBF threshold values in a predetermined angular channel range, and an IDBF processing unit configured to create a recreated complex data obtained by applying an inverse DBF processing to the new spatial complex data, wherein the normal equation creating unit creates the normal equation from the recreated complex data.

According to an embodiment of the present invention, a received wave direction estimating method using an electronic scanning radar apparatus mounted on a moving object includes a receiving step of receiving a received wave arriving from a target having reflected a transmitted wave by use of a receiving unit including a plurality of antennas; a beat signal generating step of generating beat signals from the transmitted wave and the received wave by use of a beat signal generating unit; a frequency resolving step of resolving the beat signals into beat frequencies having a predetermined frequency bandwidth and calculating complex data based on the resolved beat signals for each beat frequency by use of a frequency resolving unit; and a azimuth estimating step of estimating a wave number of the received wave based on an eigenvalue being a component part of a normal equation having complex data as elements calculated based on the beat signals, creating a coefficient calculated as a solution of a normal equation of a signal subspace formed based on eigenvalues and eigenvectors corresponding to a number of the estimated wave number, and calculating a DOA of the received wave based on the created coefficient by use of an azimuth detecting unit.

According to an embodiment of the present invention, a received wave direction estimating program for causing a computer to control operations on a received wave direction estimation by use of an electronic scanning radar apparatus mounted on a moving object, the program causing a computer to execute a receiving process that receives a received wave arriving from a target having reflected a transmitted wave by use of a receiving unit including a plurality of antennas; a beat signal generating process that generates beat signals from the transmitted wave and the received wave by use of a beat signal generating unit; a frequency resolving process that resolves the beat signals into beat frequencies having a predetermined frequency bandwidth and calculates complex data based on the resolved beat signals for each beat frequency by use of a frequency resolving unit; and a azimuth estimating process that estimates a wave number of the received wave based on an eigenvalue being a component part of a normal equation having complex data as elements calculated based on the beat signals, creates a coefficient calculated as a solution of a normal equation of a signal subspace formed based on eigenvalues and eigenvectors corresponding to a number of the estimated wave number, and calculates a DOA of the received wave based on the created coefficient by use of an azimuth detecting unit.

As described above, in accordance with the present invention, a receiving unit includes a plurality of antennas receiving a received wave arriving from a target having reflected a transmitted wave. A beat signal generating unit generates beat signals from the transmitted wave and the received wave. A frequency resolving unit resolves the beat signals into beat frequencies having a predetermined frequency bandwidth and calculate complex data based on the resolved beat signals for each beat frequency. An azimuth detecting unit estimates a wave number of the received wave based on an eigenvalue being a component part of a normal equation having complex data as elements calculated based on the beat signals, creates a coefficient calculated as a solution of a normal equation of a signal subspace formed based on eigenvalues and eigenvectors corresponding to a number of the estimated wave number, and calculates a DOA of the received wave based on the created coefficient.

Thereby, the azimuth detecting unit determines complex data of a detection beat frequency being a beat frequency in which a presence of a target has been detected, the wave number of a received wave based on a matrix created from the complex data with calculating a DOA of the received wave based on a normal equation being created based on the complex data, and the DOA of the received wave is calculated from the normal equation of a signal subspace based on the determined wave number. Thus, it is possible to provide an electronic scanning radar apparatus and a received wave direction estimating method, which can detect the DOA of the received wave with high accuracy without reducing the detection accuracy.

BRIEF DESCRIPTION OF THE DRAWINGS

FIG. 5 is a table illustrating intersections of matrices of beat frequencies in an ascending region and a descending region and intersections of the matrices in a peak combining unit, that is, distances and relative velocities in combinations of beat frequencies in an ascending region and a descending region;

FIG. 6 is a table illustrating a distance, a relative velocity, and a frequency point for each target for the peak pairs having been determined in the present detection cycle;

FIG. 10 is a diagram illustrating eigenvalue decomposition in the third functional unit;

FIG. 18 is a diagram illustrating a table storing fixed (determined) peak pairs in an ascending region and a descending region;

FIG. 26 is a diagram that illustrates a data table provided in the memory unit;

FIG. 29 is a data table provided in the memory unit in a sixth embodiment;

FIG. 32 is a data table provided in the memory unit;

FIG. 36 is a diagram illustrating a data table provided in the memory unit;

FIG. 39A is a data table provided in the memory unit;

FIG. 39B is a data table provided in the memory unit;

FIG. 41 is a diagram illustrating a data table provided in the memory unit;

FIG. 45 is a drawing that illustrates the characteristics of a model wave number estimation of the electronic scanning radar apparatus according to the eleventh embodiment;

FIG. 46 is a drawing that illustrates the characteristics of an azimuth estimation of the electronic scanning radar apparatus according to the eleventh embodiment.

DETAILED DESCRIPTION OF THE INVENTION (AR Spectrum Estimation)

Hereinafter, an AR spectrum estimating method applied to embodiments of the present invention will be described.

In a non-patent document 1, Steven M. Kay, "Modern Spectral Estimation Theory & Application," Prentice Hall, 1988, describes that the AR spectrum estimating method is a spectrum estimation method that estimates an spectrum, which is similar to an MUSIC method. The AR spectrum estimating method performs an estimating process using an AR model (autoregressive model). The AR spectrum method is classified into a parametric method, when the MUSIC method is classified into a partial space method. The AR spectrum estimating method may be referred to as a maximum entropy method or a linear prediction method, which is included in the classification of the parametric method.

Figure 47:
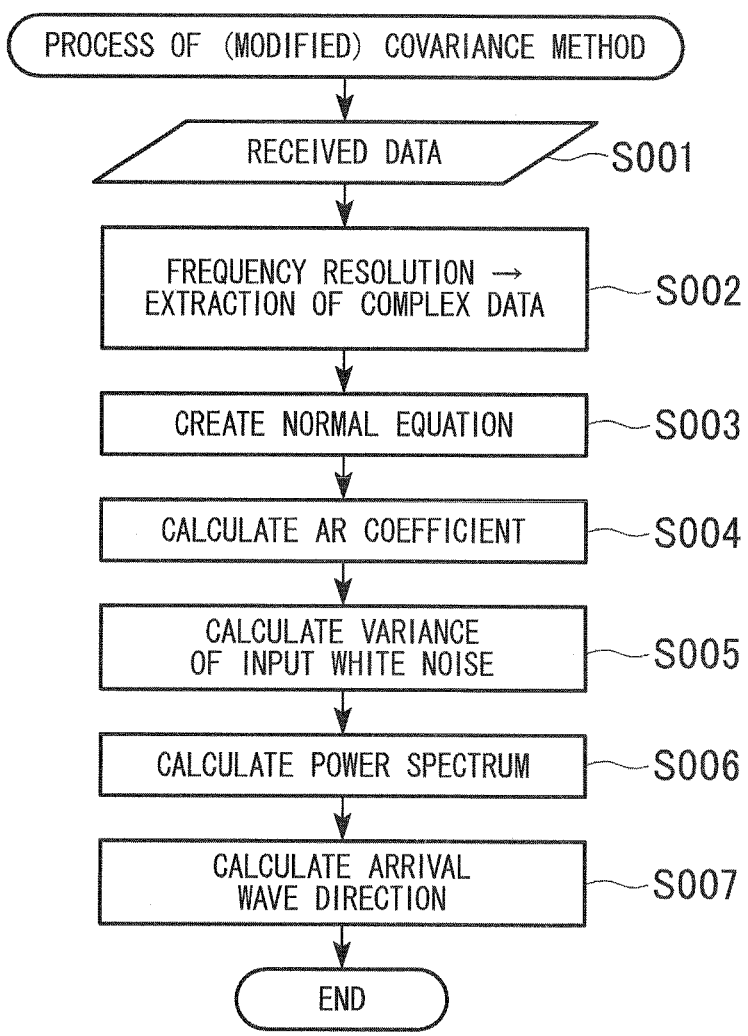
FIG. 47 is a diagram illustrating an AR spectrum estimating process in the related art.

In the AR spectrum estimating method, first, an object is modeled using an AR model expressed in a linear format and a normal equation is created on the basis of input data. The normal equation includes a matrix (correlation matrix) referred to as a self-correlation matrix and a vector (right-hand vector) referred to as a covariance matrix and a right-hand vector or a cross-correlation vector. The coefficient of an AR filter (AR coefficient) and the variance value of input white noise are calculated on the basis of the normal equation and then a power spectrum is calculated and estimated using the AR coefficient and the variance value of the input white noise. The procedure is shown in FIG. 47. Channel data in spatial directions like the radar of the present invention as well as time-series data can be used as the input data. The AR spectrum estimating method is roughly classified into a method using a self-correlation matrix and a method using a covariance matrix. Examples of the method using a self-correlation matrix include a self-correlation method (or a Yule-Walker method) and a Berg method. Examples of the method using a covariance matrix include a covariance method and a modified covariance method. The modified covariance method is also referred to as a forward and backward linear prediction method. Any method is an algorithm of creating a normal equation and calculating an AR coefficient.

First Embodiment

Hereinafter, an electronic scanning radar apparatus (FMCW millimeter wave radar) according to a first embodiment of the invention will be described with reference to the accompanying drawings.

Figure 1:
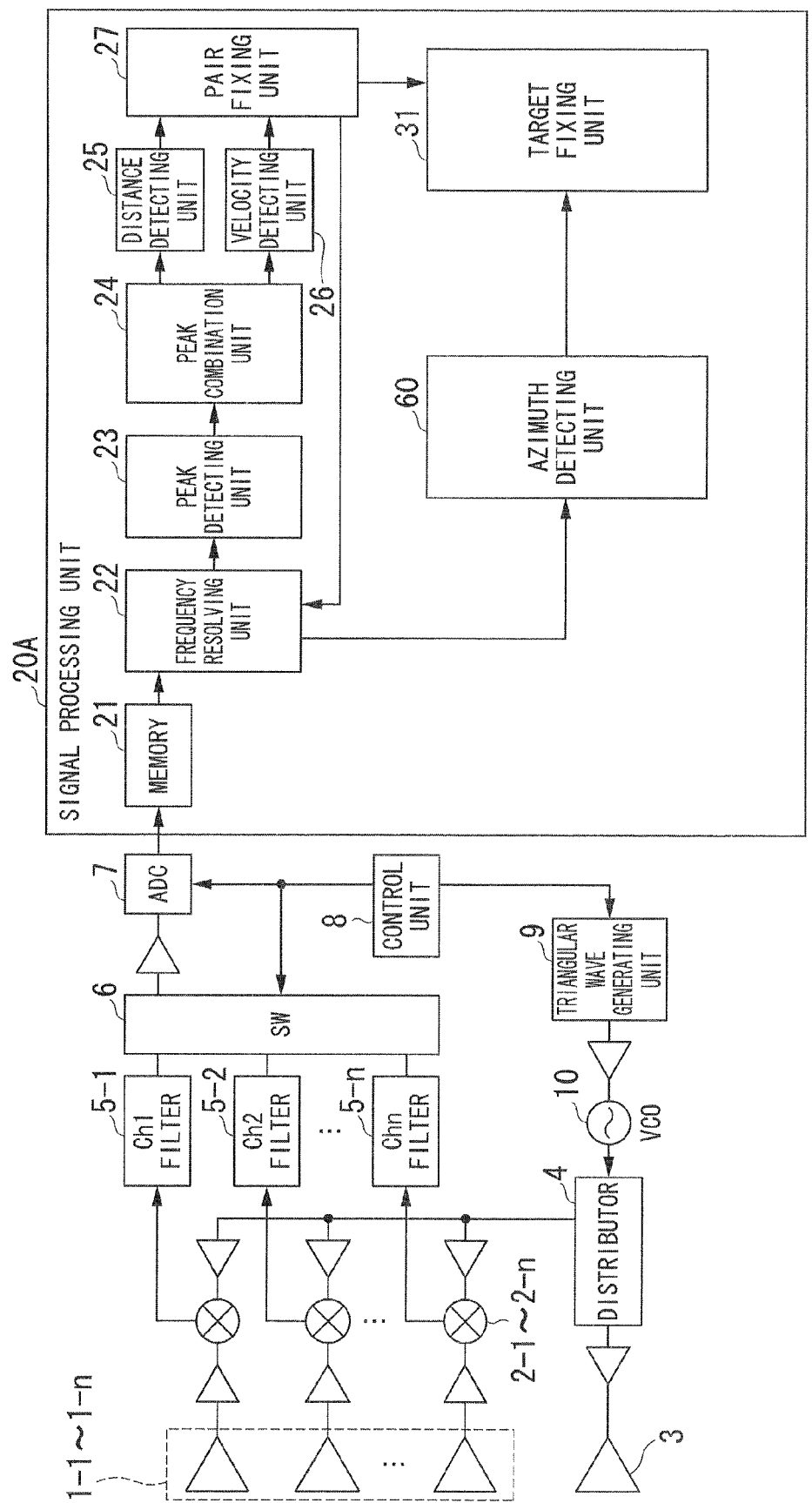
FIG. 1 is a block diagram illustrating the configuration of an electronic scanning radar apparatus according to a first embodiment of the invention.

FIG. 1 is a block diagram illustrating the configuration of the electronic scanning radar apparatus according to the first embodiment.

In the drawing, the electronic scanning radar apparatus according to the first embodiment includes receiving antennas 1-1 to 1-$n$, mixers 2-1 to 2-$n$, a transmitting antenna 3, a distributor 4, filters 5-1 to 5-$n$, a SW (switch) 6, an ADC (A/D converter) 7, a control unit 8, a triangular wave generating unit 9, a VCO 10, and a signal processing unit 20A.

The signal processing unit 20A includes a memory 21, a frequency resolving unit 22, a peak detecting unit 23, a peak combining unit 24, a distance detecting unit 25, a velocity detecting unit 26, a pair fixing unit 27, a target fixing unit 31, and an azimuth detecting unit 60. The azimuth detecting unit 60A may be referred to as an azimuth calculating unit.

The operation of the electronic scanning radar apparatus according to the first embodiment will be described below with reference to FIG. 1.

The receiving antennas 1-1 to 1-$n$ receive a reflected wave arriving from a target as a received wave by causing a transmitted wave to be reflected by the target.

The mixers 2-1 to 2-$n$ mix signals acquired by amplifying the transmitted wave transmitted from the transmitting antenna 3 and the received wave received by the receiving antennas 1-1 to 1-$n$ through the use of an amplifier and generate beat signals corresponding to frequency differences.

The transmitting antenna 3 transmits a transmission signal, which is acquired by frequency-modulating a triangular wave signal generated by the triangular wave generating unit 9 by the use of the VCO (Voltage-Controlled Oscillator) 10, to a target as the transmitted wave.

The distributor 4 distributes the frequency-modulated transmission signal from the VCO 10 to the mixers 2-1 to 2-$n$ and the transmitting antenna 3.

The filters 5-1 to 5-$n$ limit bands of the beat signals of Ch1 to Chn, which are generated by the mixers 2-1 to 2-$n$, corresponding to the receiving antennas 1-1 to 1-$n$ and output band-limited beat signals to the SW (switch) 6.

The SW 6 sequentially switches the beat signal of Ch1 to Chn, which have passed through the filters 5-1 to 5-$n$, corresponding to the receiving antennas 1-1 to 1-$n$ and outputs the beat signals to the ADC (A/D converter) 7, in response to a sampling signal input from the control unit 8.

The ADC 7 converts the beat signal of Ch1 to Chn, which are input from the SW 7 in synchronization with the sampling signal, corresponding to the receiving antennas 1-1 to 1-$n$ into digital signals in synchronization with the sampling signal and sequentially stores the digital signals in a waveform storage area of the memory 21 in the signal processing unit 20.

The control unit 8 is constructed by a micro computer or the like and controls the entire electronic scanning radar apparatus shown in FIG. 1 on the basis of a control program stored in a ROM (not shown) or the like.

(Detection Principle of Distance, Relative Velocity, Angle (Azimuth))

The principle of detecting the distance, the relative velocity, and the angle (azimuth), which are used in the signal processing unit 20, between the electronic scanning radar apparatus according to the first embodiment and a target will be described in detail below with reference to the accompanying drawings.

Figure 2A:
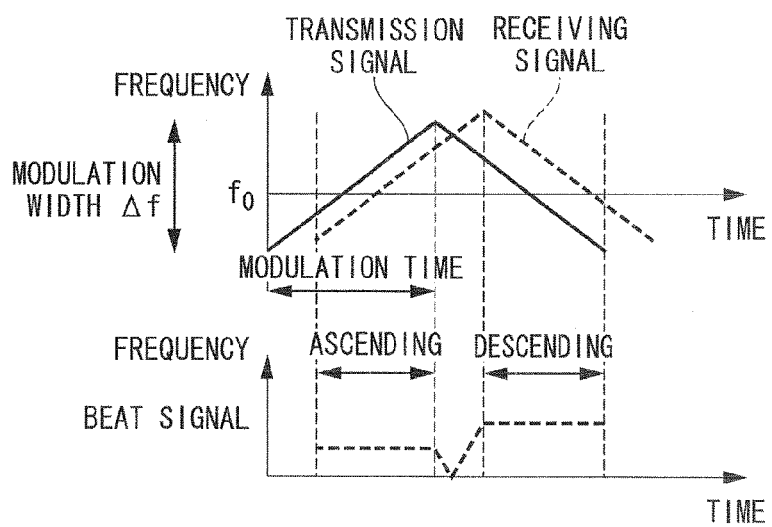
FIG. 2A is a diagram illustrating a state in which a transmitted signal and a received signal reflected from a target are input.
Figure 2B:
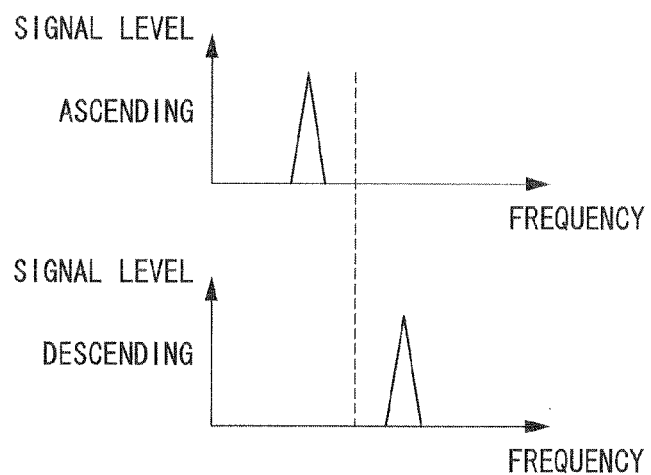
FIG. 2B is a diagram illustrating a state in which a transmitted signal and a received signal reflected from a target are input.

FIGS. 2A and 2B are diagrams illustrating a state in which a transmission signal and a received signal reflected from a target are input.

The signals shown in FIG. 2A is the transmission signal acquired by performing frequency-modulation for a signal generated by the triangular wave generating unit 9 shown in FIG. 1 at the VCO 10 and the received signal caused by the transmission signal to be reflected by the target.

As can be seen from FIG. 2A, the received signal which is a reflected wave from the target is received with a delay in a right-hand direction (time delay direction) being proportional to the distance to the target with respect to the transmission signal. The received signal is shifted with respect to the transmission signal in the vertical direction (frequency direction) in proportion to the relative velocity between the electronic scanning radar apparatus and the target. When the beat signals acquired in FIG. 2A are frequency-converted through the use of a Fourier transform, a DTC, a Hadamard transform, a wavelet transform, or the like, one peak value is generated in each of an ascending region and a descending region in the case of a single target. The result is shown in FIG. 2B. In FIG. 2B, the horizontal axis represents the frequency and the vertical axis represents the intensity.

The frequency resolving unit 22 performs frequency-conversion for the ascending region (ascending) and the descending region (descending) of the triangular wave into discrete times through the use of frequency resolution, for example, the Fourier transform, on the basis of sampled data of the beat signals stored in the memory 21. That is, frequency resolving unit 22 resolves the beat signals into beat frequencies having a predetermined frequency bandwidth and calculates complex data (complex number data) based on the beat signals resolved for each beat frequency.

As a result, as shown in FIG. 2B, a graph of signal levels for the resolved beat frequencies in the ascending region and the descending region is obtained.

The peak detecting unit 23 detects the peak value from the signal level for each beat frequency shown in FIG. 2B and detects the presence of a target. The peak detecting unit 23 outputs the beat frequencies (both the ascending region and the descending region) of the peak values as target frequencies.

The distance detecting unit 25 calculates the distance between the electronic scanning radar apparatus and the target using the following expression on the basis of the target frequency fu of the ascending region and the target frequency fd of the descending region input from the peak combining unit 24.

$$r=\{C \cdot T/(2 \cdot \Delta f)\} \cdot \{(fu+fd)/2\}.$$

The velocity detecting unit 26 calculates the relative velocity between the electronic scanning radar apparatus and the target using the following expression on the basis of the target frequency fu of the ascending region and the target frequency fd of the descending region input from the peak combining unit 24.

$$v=\{C/(2 \cdot f0)\} \cdot \{(fu-fd)/2\}$$

In the expressions, r represents the distance, v represents the relative velocity, C represents the light velocity, $\Delta f$ represents the frequency modulation width of a triangular wave, f0 represents the central frequency of the triangular wave, T represents the modulation time (ascending region/descending region), fu represents the target frequency of the ascending region, and fd represents the target frequency of the descending region.

The receiving antennas 1-1 to 1-n in the first embodiment will be described below.

Figure 3:
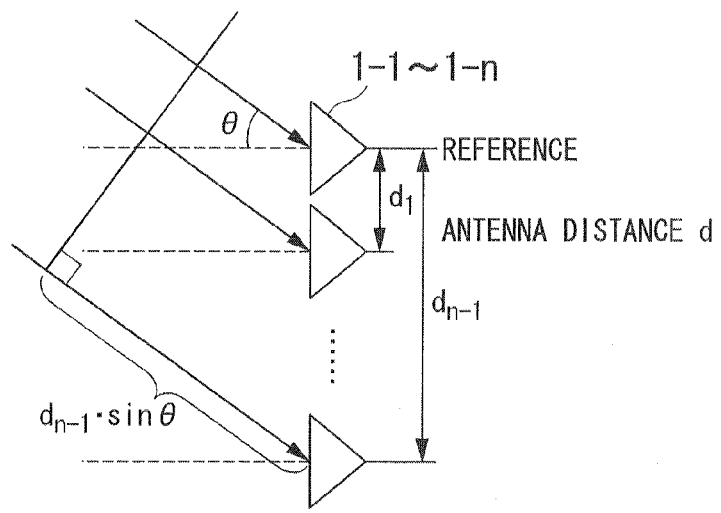
FIG. 3 is a conceptual diagram illustrating a received wave in a receiving antenna.

FIG. 3 is a conceptual diagram illustrating the received wave in the receiving antennas.

As shown in the drawing, the receiving antennas 1-1 to 1-n are arranged in an array with a pitch $d_1$. The received wave (incident wave or arrival wave) is incident on receiving antennas 1-1 to 1-n from the direction of angle θ about the axis perpendicular to the plane in which the antennas are arranged. That is, the arrival wave (incident wave) from the target, that is, the reflected wave from the target in response to the transmitted wave transmitted from the transmitting antenna 3, is input to the receiving antennas 1-1 to 1-n.

At this time, the arrival antenna is received with the same angle by the receiving antennas 1-1 to 1-n.

A phase difference "$d_{n-1} \cdot \sin \theta$" calculated by the same angle, for example, the angle θ and the pitch $d_1$ between the antennas, appears between the adjacent receiving antennas.

The angle θ can be detected through the use of a signal process such as a digital beam forming (DBF) or a high-resolution algorithm of additionally Fourier-transforming the values, which are subjected to the frequency resolution in the time direction for each antenna, in the antenna direction.

(Signal Process on Received Wave in Signal Processing Unit 20)

Next, the signal processing of the signal processing unit 20 performed for the received wave is described.

The memory 21 stores the time-series data (the ascending region and the descending region) of the received signal, which is subjected to the A/D conversion by the ADC 7, in a waveform storage area in correlation with the receiving antennas 1-1 to 1-n. For example, when 256 pieces of data are sampled from the ascending region and the descending region, data pieces of 2×256×antenna number are stored in the waveform storage area.

The frequency resolving unit 22 converts the beat signals corresponding to Ch1 to Chn (the antennas 1-1 to 1-n) into frequency components with a predetermined resolution, for example, through the use of the Fourier transform. Accordingly, frequency resolving unit 22 outputs frequency points indicating the beat frequencies and complex data of the beat frequencies. For example, when each of the ascending region and the descending region of each antenna has 256 sampled data pieces, the frequency resolving unit 22 transforms the data pieces into beat frequencies as complex frequency-domain data of the antennas and generates 128 pieces of complex data for each of the ascending region and the descending region (2×128×antenna number). The beat frequencies are indicated by the frequency points.

Here, the phase difference depending on the angle θ exists in the complex data for the antennas. The absolute values (receiving intensities or amplitudes) of the complex data pieces in the complex plane are equivalent to each other.

The peak detecting unit 23 detects the beat frequencies having a peak value greater than a predetermined value from the peaks of the signal intensities (or amplitudes) using the peak values of the intensities in the ascending region and the descending region of the triangular wave of the frequency-converted beat frequencies and the complex data. Accordingly, the presence of a target for each beat frequency is detected and the target frequency is selected.

Therefore, the peak detecting unit 23 generates a frequency spectrum from the complex data for any one antenna or the sum of the complex value of the overall antennas. Accordingly, the peaks of the spectrum can be detected as the presence of a target depending on the beat frequencies, that is, the distance from the electronic scanning radar apparatus. By adding the complex data of the overall antennas, the noise component is averaged and the S/N ratio is improved.

Figure 4A:
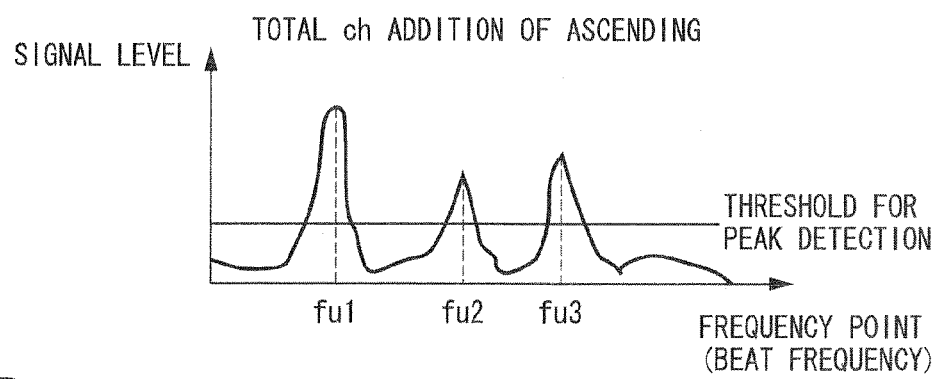
FIG. 4A is a graph illustrating a state in which a beat signal in an ascending region is frequency-resolved, where the horizontal axis represents a beat frequency and the vertical axis represents a peak value thereof.
Figure 4B:
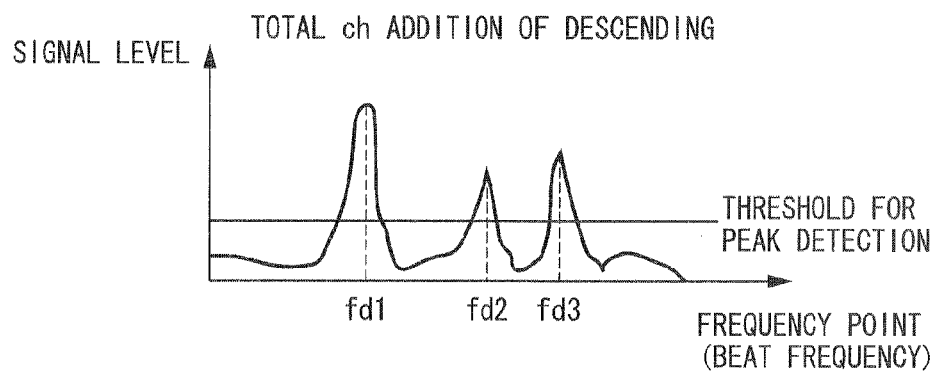
FIG. 4B is a graph illustrating a state in which a beat signal in a descending region is frequency-resolved, where the horizontal axis represents a beat frequency and the vertical axis represents a peak value thereof.

The peak combining unit 24 totally combines the beat frequencies of the ascending region and the descending region and the peak values thereof with the beat frequencies and the peak values input from the peak detecting unit 23 and shown in FIGS. 4A and 4B over the matrix. That is, the peak combining unit 24 combines all the beat frequencies of the ascending region and the descending region and sequentially outputs the combinations to the distance detecting unit 25 and the velocity detecting unit 26. In FIGS. 4A and 4B, the horizontal axis represents the frequency point and the vertical axis represents the signal level (intensity).

The distance detecting unit 25 calculates the distance r between the electronic scanning radar apparatus and the target using the values obtained by adding the beat frequencies of the combinations of the ascending region and the descending region sequentially input from the peak combining unit 24.

The velocity detecting unit 26 calculates the relative velocity v between the target and the electronic scanning radar apparatus on the basis of the difference between the beat frequencies of the combinations of the ascending region and the descending region sequentially input from the peak combining unit 24.

The pair fixing unit 27 creates a table shown in FIG. 5 on the basis of the distance r input from the distance detecting unit 25, the relative velocity v input from the velocity detecting unit 26, and the peak levels pu and pd of the ascending region and the descending region. The suitable combination of the peaks of the ascending region and the descending region is determined for each target. The pair fixing unit 27 fixes the pair of the peaks of the ascending region and the descending region as shown in FIG. 6 and outputs a target group number indicating the fixed distance r and relative velocity v to the target fixing unit 31. In FIG. 6, the distance, the relative velocity, and the frequency point (the ascending region or the descending region) are stored in the pair fixing unit 27 in correspondence to the target group number. The tables shown in FIGS. 5 and 6 are stored in an internal storage of the pair fixing unit 27. Here, since the directions of the respective target groups are not determined, the positions in the lateral direction parallel to the arrangement direction of the receiving antennas 1-1 to 1-$n$ with respect to the axis perpendicular to the arrangement direction of the antenna array in the electronic scanning radar apparatus are not determined.

Here, the pair fixing unit 27 may employ a method of selecting the combination of the target groups preferentially using the values predicted in the present detection cycle out of the distances r and the relative velocities v between the targets and the electronic scanning radar apparatus, which are finally fixed in the past detection cycle.

The azimuth detecting unit 60 performs a spectrum estimating process using the AR spectrum estimating process as a high-resolution algorithm or a process such as the MUSIC method. The azimuth of the corresponding target is detected on the basis of the spectrum estimation result and is output to the target fixing unit 31.

The target fixing unit 31 correlates the azimuth detected by the azimuth detecting unit 30 with the distance r, the relative velocity v, and the frequency points input from the pair fixing unit 27 and shown in FIG. 6 and then fixes and outputs the present status.

The configuration example where the AR spectrum estimating method known as a high-resolution algorithm is used for the spectrum estimating process will be described in more detail below.

Figure 7:
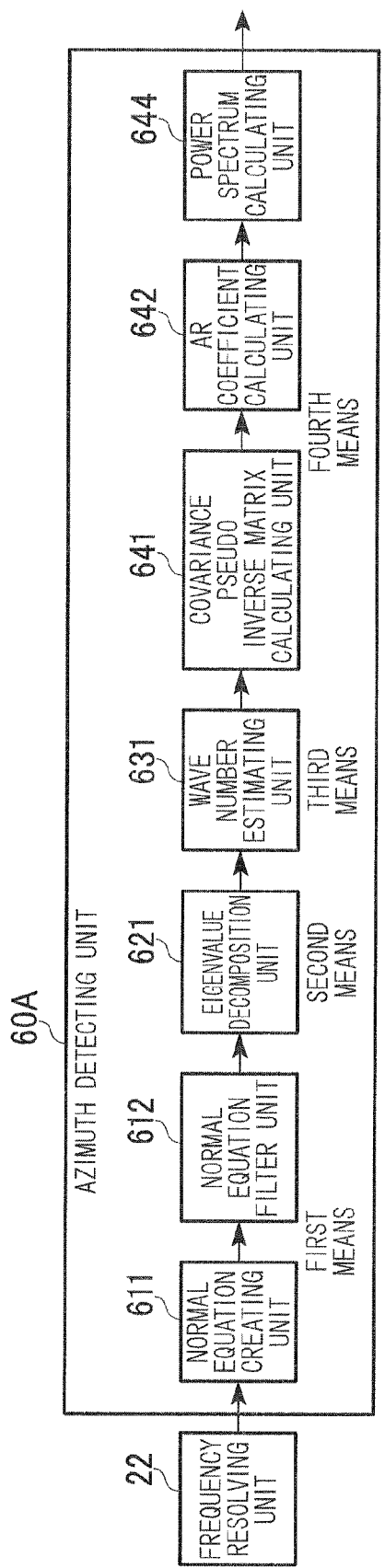
FIG. 7 is a block diagram illustrating the configuration of an azimuth detecting unit according to a first embodiment of the invention.

FIG. 7 is a block diagram illustrating the configuration of the azimuth detecting unit in the first embodiment.

The azimuth detecting unit 60A shown in FIG. 7 is an example of the azimuth detecting unit 60 shown in FIG. 1.

The azimuth detecting unit 60A includes a normal equation creating unit 611, a normal equation filter unit 612, an eigenvalue decomposition unit 621, a wave number estimating unit 631, a covariance pseudo inverse matrix calculating unit 641, an AR coefficient calculating unit 642, and a power spectrum calculating unit 644.

In the first embodiment, the normal equation creating unit 611 and the normal equation filter unit 612 function as first means, the eigenvalue decomposition unit 621 functions as a second means, the wave number estimating unit 631 functions as third means, and the covariance pseudo inverse matrix calculating unit 641 and the AR coefficient calculating unit 642 function as a fourth means.

The normal equation creating unit 611 of the azimuth detecting unit 60A creates a normal equation having the order of a normal equation used for the AR spectrum estimating process. The normal equation creating unit 611 creates a normal equation derived from complex data corresponding to the beat frequency (one or both of the ascending region and the descending region) having been resolved by the frequency resolving unit 22.

The normal equation filter unit 612 performs an averaging process on a normal equation in "the present detection cycle" created by the normal equation creating unit 611.

The eigenvalue decomposition unit 621 performs an eigenvalue decomposition (eigenvalue resolution) process based on the covariance matrix of an averaged normal equation in "the present detection cycle" in which the averaged normal equation is averaged by the normal equation filter unit 612. The eigenvalue decomposition process is a process that calculates an eigenvalue and an eigenvector from a characteristic equation based on a covariance matrix. For the eigenvalue decomposition process, any solution program can be applied. For example, an algorithm for solving a direct characteristic equation, or a repeatable type algorithm such as the Jacobi method, Householder method and QR method can apply to the eigenvalue decomposition process.

The wave number estimating unit 631 determines an eigenvalue indicating the maximum value from among eigenvalues (and eigenvectors) calculated through the eigenvalue calculation process by the eigenvalue decomposition unit 621. The wave number estimating unit 631 normalizes the calculated eigenvalues based on the calculated maximum eigenvalue. The wave number estimating unit 631 determines the normalized eigenvalues based on a predetermined threshold value, and selects the wave number to be processed in the subsequent stages based on the determination result.

The covariance pseudo inverse matrix calculating unit 641 creates a covariance pseudo inverse matrix of a signal subspace from an eigenvalue and eigenvector calculated by the eigenvalue decomposition unit 621 (second means).

By creating the covariance pseudo inverse matrix of a signal subspace, noise components can be removed. The noise reduction of a subspace using the AR spectrum estimation process can be referred from the Principal Component AR spectral Estimator described in Steven M. Kay, "Modern Spectral Estimation Theory & Application", Prentice Hall, 1988, pp. 426-428 (13.8.1 AR Frequency Estimation).

The AR coefficient calculating unit 642 calculates AR coefficients derived from a right hand vector and the covariance pseudo inverse matrix of the signal subspace created by the covariance pseudo inverse matrix calculating unit 641, and calculates the variance $\sigma^2$ of the input white noise. In this manner, the AR coefficient calculating unit 642 can derive the AR coefficient and the variance $\sigma^2$ of the input white noise based on the complex data of the detection beat frequency as a beat frequency from which the presence of a target is detected in response to the detection cycles. Furthermore, the AR coefficient calculating unit 642 outputs the derived AR coefficient and the derived variance $\sigma^2$ of the input white noise to the power spectrum calculating unit 644.

The power spectrum calculating unit 644 calculates the direction of a received wave from the power spectrum derived based on the AR coefficient and the variance $\sigma^2$ of the input white noise.

Figure 8:
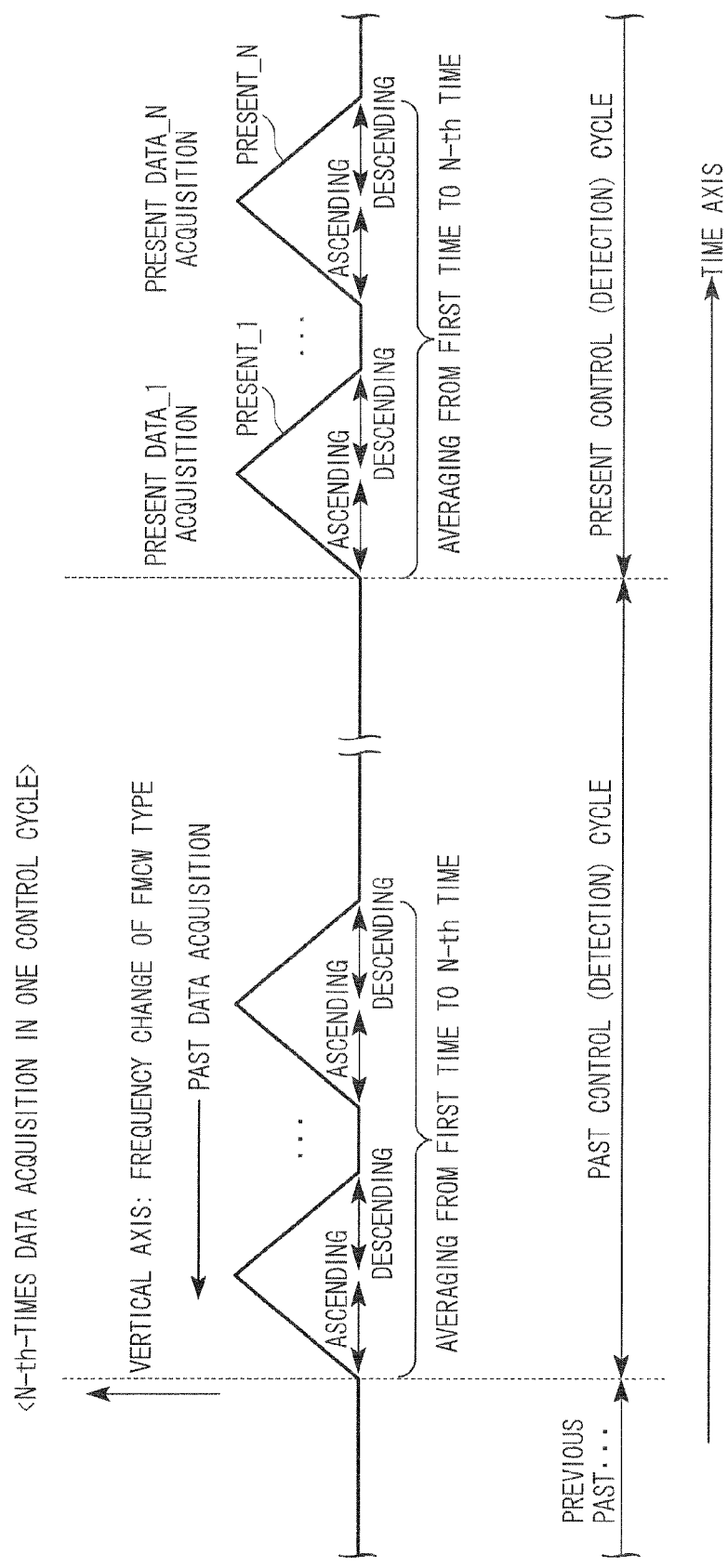
FIG. 8 is a timing diagram illustrating a data acquiring process in detection cycles.

FIG. 8 is a time chart indicating data acquisition process in the detection cycle.

FIG. 8 illustrates control (detection) cycles retroactive from the present control (detection) to the past control (detection) performed in past.

In each detection cycle, data acquisition is performed at least one time, in which the one time data acquisition is illustrated as a triangular wave. The triangular waveform represents a signal modulated by the FMCW method, and the ascending at the rising timing and the descending at the falling timing are detected.

The individual data acquisition is repeatedly performed at such a time gap so as not to interfere with each other and the frequency modulation period of the triangular wave may not be constant.

N times of data acquisition are performed in the present control (detection) cycle, the first data acquisition is represented by "present data_1 acquisition", and the N-th data acquisition is represented by "present data_N acquisition." In this case, the number of data acquisition can be determined as a predetermined optional number of acquisition time.

Based on the data acquired in the same cycle, various averaging processes described below are performed.

The control (detection) cycle in which data is presently acquired is referred to as "present control (detection) cycle" and the control (detection) cycle in which data was acquired previously to the "present control (detection) cycle" is referred to as "past control (detection) cycle."

(Principle of Creating Normal Equation using AR Model)

Next, the modified covariance method (forward-backward linear predictive coding method) will be described in detail below as an example of a normal equation creating process using an AR model.

A normal equation using a covariance matrix is expressed by Expression (1).

$$C_{xx}a = -c_{xx} \quad (1)$$

$$C_{xx} = \begin{bmatrix} \hat{C}x(1,1) & \hat{C}x(1,2) & \cdots & \hat{C}x(1,M) \\ \hat{C}x(2,1) & \hat{C}x(2,2) & \cdots & \hat{C}x(2,M) \\ \vdots & \vdots & \ddots & \vdots \\ \hat{C}x(M,1) & \hat{C}x(M,2) & \cdots & \hat{C}x(M,M) \end{bmatrix}$$

$$a = \begin{bmatrix} \hat{a}(1) \\ \hat{a}(2) \\ \vdots \\ \hat{a}(M) \end{bmatrix}$$

$$c_{xx} = \begin{bmatrix} Cx(1,0) \\ Cx(2,0) \\ \vdots \\ Cx(M,0) \end{bmatrix}$$

In Expression (1), the left-hand side represents the product of a covariance matrix $C_{xx}$ and an AR coefficient vector a and the right-hand side represents a right-hand vector $c_{xx}$.

Elements of the covariance matrix $C_{xx}$ are derived by the relational expression (modified covariance function) of Expression (2).

$$c_x(j,k) = \frac{1}{2(N-M)} \left\{ \sum_{n=M}^{N-1} x^*(n-j)x(n-k) + \sum_{n=0}^{N-1-M} x(n+j)x^*(n+k) \right\} \quad (2)$$

$$k, j = 0, 1, \ldots, M$$

An example where a third order process is performed using data of five channels will be described below as a specific configuration. The maximum model order can be set to any value, but in case of data of five channels, the third order is the maximum model order when the modified covariance method is used. When the number of data channels can be increased, the maximum order applicable to the normal equation is also raised, thereby enhancing the flexibility of the maximum mode order to be applied.

The $C_{xx}$ can be expressed by a matrix of 3 rows and 3 columns. The matrix is expressed by Expression (3).

$$\begin{bmatrix} \hat{C}_{x3}(1,1) & \hat{C}_{x3}(1,2) & \hat{C}_{x3}(1,3) \\ \hat{C}_{x3}(2,1) & \hat{C}_{x3}(2,2) & \hat{C}_{x3}(2,3) \\ \hat{C}_{x3}(3,1) & \hat{C}_{x3}(3,2) & \hat{C}_{x3}(3,3) \end{bmatrix} \quad (3)$$

In Expression (3), elements $C_{x3}(k, j)$ of the matrix represent complex numbers. A computational expression developed for the elements is described. $x(n)$, that is, $x(0)$, $x(1)$, $x(2)$, $x(3)$, and $x(4)$, represents complex data and "*" represents the complex conjugate.

As described in Expression (3), the covariance matrix $C_{xx}$ has the relationship expressed by Expression (4) and thus is a Herimitian matrix (complex symmetric matrix).

$$c_{x3}(k,j) = c_{x3}^*(j,k) \quad (4)$$

The right-hand vector $c_{xx}$ used perform the third order process is expressed by Expression (5).

$$\begin{bmatrix} \hat{C}_{x3}(1,0) \\ \hat{C}_{x3}(2,0) \\ \hat{C}_{x3}(3,0) \end{bmatrix} \quad (5)$$

Figure 9:
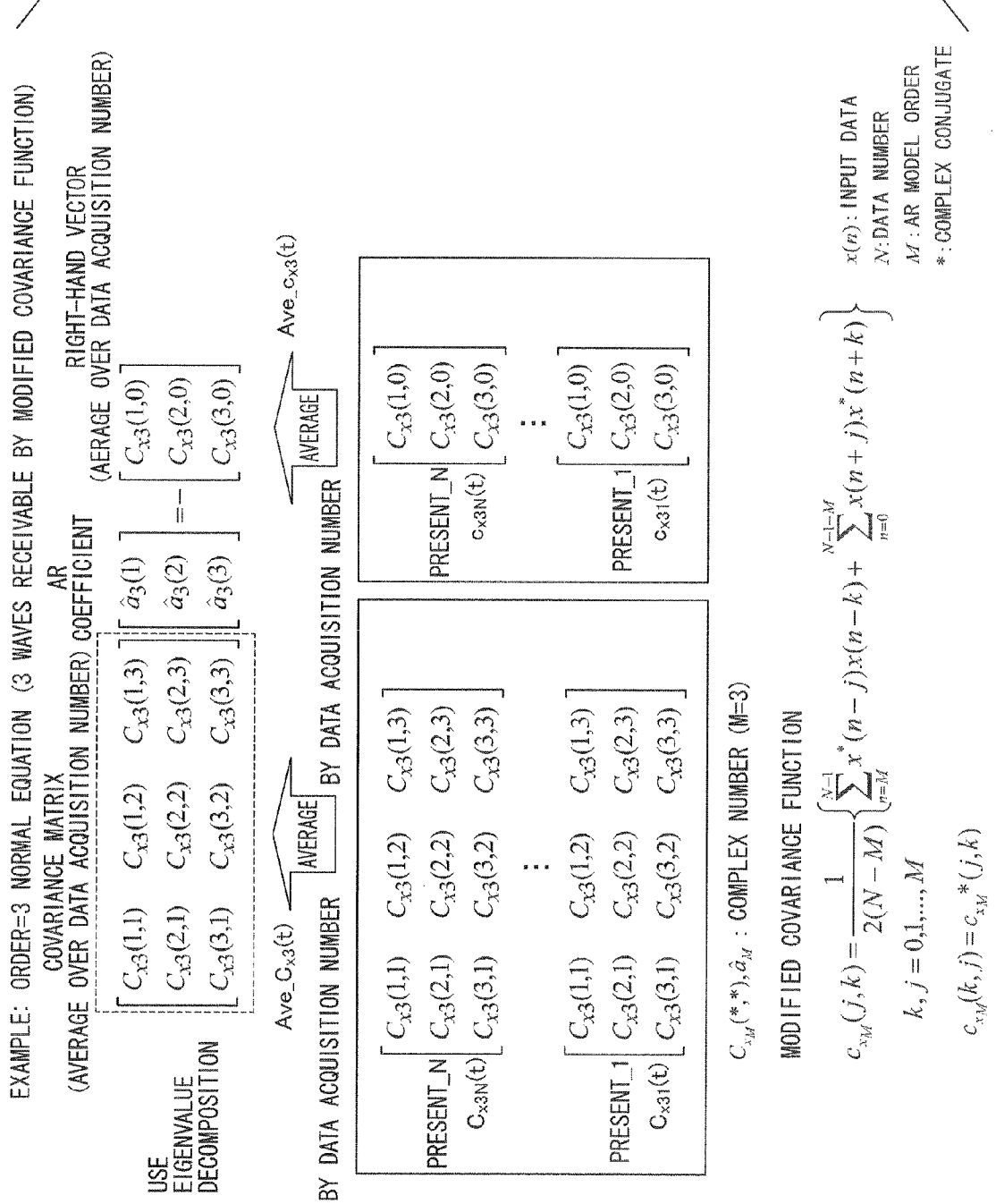
FIG. 9 is a diagram illustrating the configuration of a third order normal equation and an averaging process based on the acquired complex data thereof.

FIG. 9 is a drawing that illustrates the configuration of a third order normal equation and an averaging process based on acquired complex data.

The third order normal equation shown in FIG. 9 is formed by a covariance matrix being a square matrix of a third order, an AR coefficient being a matrix of 3 columns and 1 row, and a right-hand vector of 3 columns and 1 row.

Base on the acquired complex data, a covariance matrix and a right-hand vector are created. The AR coefficient is derived by solving the normal equation.

As shown in FIG. 8, data are acquired plural times in one control (detection) cycle. The covariance matrix $C_{xxk}(t)$ and the right-hand vector $c_{xxk}(t)$ are created in the acquisition order of the acquired complex data.

In FIG. 8, the number of times that data is acquired in one control (detection) cycle is set to N.

To correspond to the times of data acquisition, the covariance matrix $C_{xxk}(t)$ and the right-hand vector $c_{xxk}(t)$ are expressed in the order of "present_1", . . . , and "present_N."

In the first embodiment, the process of averaging the normal equation is performed on the basis of the data acquired in the same control (detection) cycle. That is, by averaging the elements of the covariance matrix $C_{xxk}(t)$ and the right-hand vector $c_{xxk}(t)$ from "present_1" to "present_N", the averaging process is performed. A computational expression for calculating an averaged covariance matrix Ave_$C_{xxk}(t)$ is expressed by Expression (6).

$$\text{Ave}\_C_{xx}(t) = k1 * C_{xx1}(t) + k2 * C_{xx2}(t) + \ldots + kN * C_{xxN}(t) \quad (6)$$

In Expression 6, k1 to kn represent weighting coefficients used for weighted-averaging.

A computational expression for calculating an averaged right-hand vector Ave_$c_{xxk}(t)$ is expressed by Expression (7).

$$\text{Ave}\_c_{xx}(t) = k1 * c_{xx1}(t) + k2 * c_{xx2}(t) + \ldots + kN * c_{xxN}(t) \quad (7)$$

In Expression (7), k1 to kn represent weighting coefficients used for weighted-averaging.

When an eigenvalue and an eigenvector are calculated based on an averaged normal equation, the eigenvalue and eigenvector of a covariance matrix of the averaged normal equation are calculated.

FIG. 10 is a drawing that illustrates an eigenvalue decomposition in a third means.

For resolution of an eigenvalue, when the order of a normal equation is set to 3 as shown in the first embodiment, the eigenvalue decomposition is performed based on Expressions written as Expression (8) and Expression (9).

$$C_{xx}e = \lambda e \quad (8)$$

$$|C_{xx} - \lambda I| \quad (9)$$

The eigenvalue decomposition can be applied to any solution algorithms as well as to direct solution of the characteristic equation of Expression (9). For example, the eigenvalue decomposition can be applied to iterative method algorithms such as a Jacobi method, a Householder method, and a QR method. When the eigenvalue decomposition is performed based on a small size covariance matrix such as the first embodiment, the computational load can be reduced.

Figure 11:
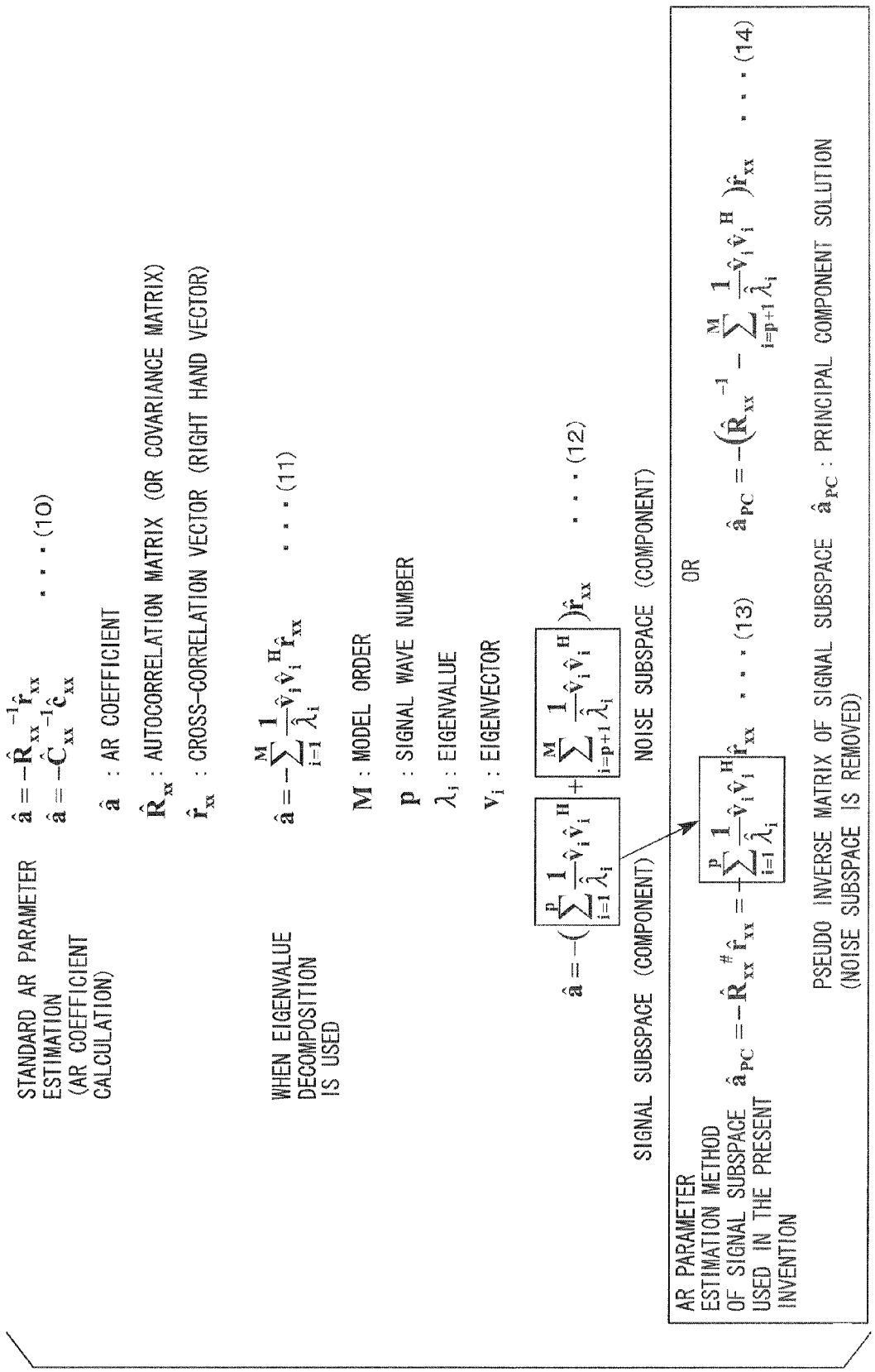
FIG. 11 is a diagram illustrating calculation process of AR coefficients in the fourth functional unit.

FIG. 11 is a drawing that illustrates the computation process for acquiring an AR coefficient by the fourth means.

Here, a description is given for a computational process that creates a covariance pseudo inverse matrix of a signal subspace from the eigenvalue and eigenvector which have been acquired with the second means.

A computational equation of AR parameter estimation for calculating an AR coefficient a is expressed as Expression (10).

$$\hat{a} = -\hat{R}_{xx}^{-1}\hat{r}_{xx}$$

$$\hat{a} = -\hat{C}_{xx}^{-1}\hat{c}_{xx} \tag{10}$$

As expressed in Expression (10), an AR coefficient a is derived by the inverse matrix calculation of the correlation matrix $R_{xx}$ (or covariance matrix $C_{xx}$). Thus, the condition is that the correlation matrix $R_{xx}$ (or covariance matrix $C_{xx}$) is regular (determinant is not 0: det $R_{xx} \neq 0$: full rank). In this case, even if the noise subspace can ideally be removed from the correlation matrix, the accuracy of a solution is not assured because of rank down when the number of signals is less than the order of a matrix.

Therefore, the expression of a standard AR spectrum estimation method cannot ideally remove the noise subspace.

The inverse matrix of a correlation matrix $R_{xx}$ written in Expression (10) is decomposed by spectrum decomposition (eigenvalue decomposition) and can be expressed as Expression (11) (assuming that the correlation matrix $R_{xx}$ is regular and a positive definite matrix).

$$\hat{a} = -\sum_{i=1}^{M} \frac{1}{\hat{\lambda}_i} \hat{v}_i \hat{v}_i^H \hat{r}_{xx} \tag{11}$$

In Expression (11), M represents a model order. In this manner, the AR coefficient a can be decomposed with an eigenvalue $\lambda i$ and an eigenvector vi.

Furthermore, as expressed by Expression (12), Expression (11) can be decomposed by a signal subspace ranging from i=1 to i=p and a noise subspace ranging form i=p+1 to i=M. For the noise subspace, the eigenvalue represents to be nearly zero.

$$\hat{a} = -\left(\sum_{i=1}^{p} \frac{1}{\hat{\lambda}_i} \hat{v}_i \hat{v}_i^H + \sum_{i=p+1}^{M} \frac{1}{\hat{\lambda}_i} \hat{v}_i \hat{v}_i^H\right)\hat{r}_{xx} \tag{12}$$

In Expression (12), the first term represents a signal subspace (signal component), and the second term represents a noise subspace (noise component).

In addition, an AR coefficient $a_{pc}$, the principal component solution, is resulted from removing the term of the noise subspace from Expression (12), and can be expressed as Expression (13).

$$\hat{a}_{PC} = -\hat{R}_{xx}^{\#}\hat{r}_{xx} = -\sum_{i=1}^{p} \frac{1}{\hat{\lambda}_i} \hat{v}_i \hat{v}_i^H \hat{r}_{xx} \tag{13}$$

For an arithmetic operation expressed in Expression (13), the calculation can be performed even for a rank being a low state because a signal subspace can be calculated by use of a pseudo inverse matrix. Therefore, even if the number of signals is small relative to a model order, the accuracy of an AR spectrum estimation can be improved by setting the order of an arithmetic equation to be high and calculating it.

Furthermore, Expression (13) can be calculated subtracting the noise subspace from the whole space based on an arithmetic equation expressed in Expression (14).

$$\hat{a}_{PC} = -\left(\hat{R}_{xx}^{-1} - \sum_{i=p+1}^{M} \frac{1}{\hat{\lambda}_i} \hat{v}_i \hat{v}_i^H\right)\hat{r}_{xx} \tag{14}$$

In the first embodiment, the model order is set to be 3 (M=3), and for a case where an estimation wave number is 1 or 2, the arithmetic equation becomes an AR coefficient which the component of a noise subspace is removed. When an estimation wave number is 3, the expression, the calculation result becomes to be the same as a standard AR spectrum estimation result. Thus, if the number of data channels and the order number can be greater, then the effect of the present method becomes greater.

Figure 12:
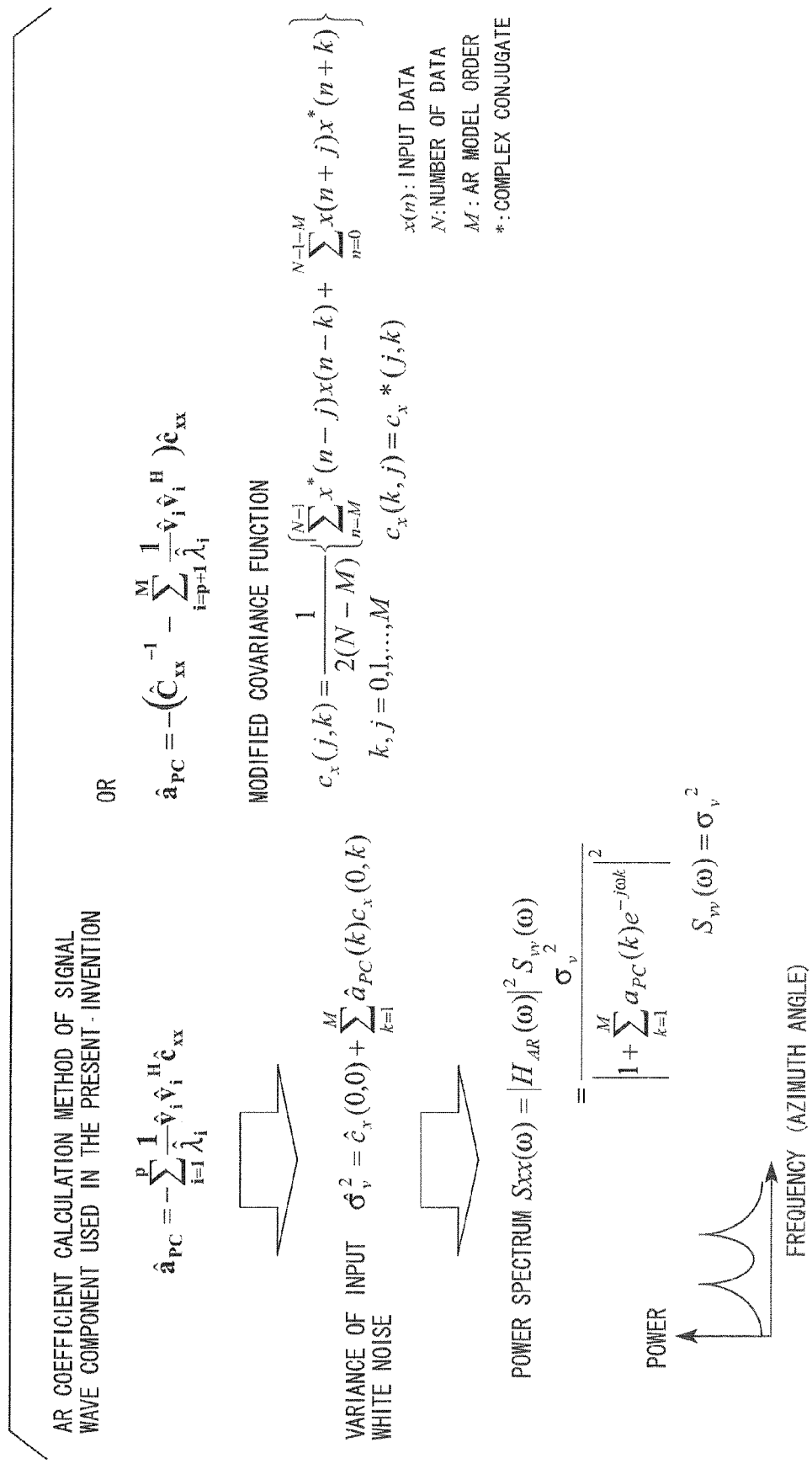
FIG. 12 is a diagram illustrating calculation process that obtains variations and power spectrum of white noise based on a primary resolution AR coefficient $a_{pc}$.

FIG. 12 is a drawing that illustrates an arithmetic operation process which acquires a variance and a power spectrum of the white noise from an AR coefficient $a_{pc}$ that is a principal component solution.

In a principal component AR spectrum estimation method shown in FIG. 12, an arithmetic operation process after deriving an AR coefficient can basically derived with the arithmetic operation process similar to a standard AR spectrum estimation.

Subsequently, based on the AR parameter estimation value derived from Expression (13), the relational expression used to derive the variance $\sigma^2$ (hat) of the input white noise is expressed by Expression (15).

$$\hat{\sigma}_v^2 = \hat{c}_x(0,0) + \sum_{k=1}^{M} \hat{a}_{pc}(k)c_x(0,k) \tag{15}$$

In the linear prediction using an AR model, the normal equation is derived from the conditions that the mean square error of differences (prediction errors) between predicted values and measured values is the minimum.

By solving this normal equation using a typical method, the AR coefficient is derived.

The power spectrum $Sxx(\omega)$ is calculated using Expression (16) on the basis of the variance $\sigma^2$ (hat) of the input white noise calculated by Expression (15).

$$Sxx(\omega) = |H_{AR}(\omega)|^2 S_{vv}(\omega) \tag{16}$$

$$= \frac{\sigma_v^2}{\left|1 + \sum_{k=1}^{M} a_{pc}(k)e^{-j\omega k}\right|^2}$$

In Expression (16), $\omega$ represents the angular velocity, $H_{AR}(\omega)$ represents the frequency characteristic from a transfer function of an AR filter at the angular velocity ω, and $S_{vv}(ω)$ represents the power spectrum of the input white noise at the angular velocity ω, which can be expressed by $S_{vv}(ω)=σ_v^2$. The angular velocity ω is converted into the phase difference of the received wave when it is used in direction detection like the radar of the present embodiment.

By using the above-mentioned expressions, it is possible to derive a spectrum having the peak characteristic matched with the direction of a target.

In addition, it is also possible to estimate the distribution of a power spectrum by using a spectrum created without multiplying the variance of the input white noise. Since the distribution of a power spectrum (a spectrum shape) does not change, the arithmetic operation multiplying the variance of the input white noise can be neglected.

Figure 13:
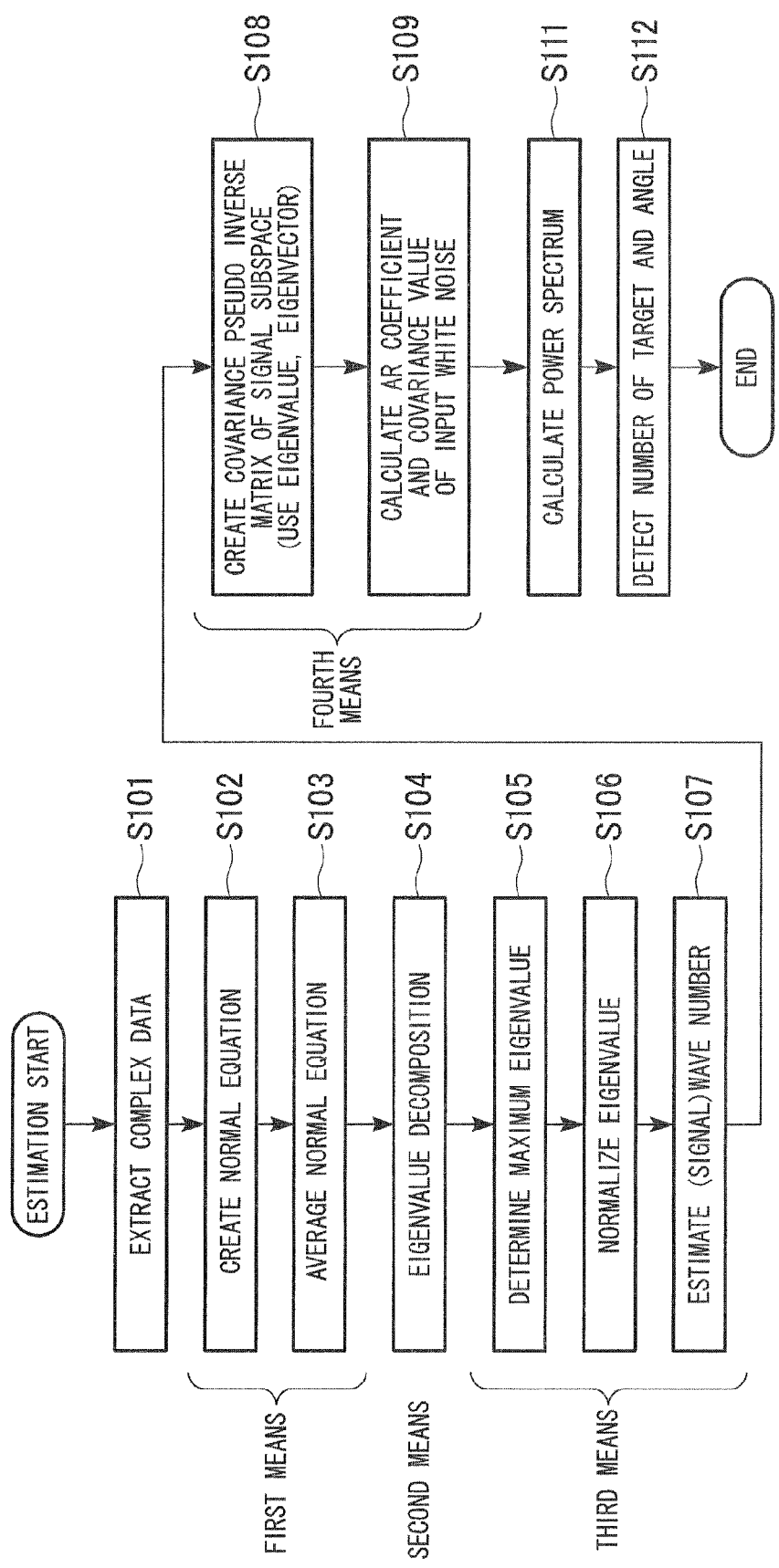
FIG. 13 is a flowchart illustrating a flow of processes in the first embodiment.

FIG. 13 is a flowchart that expresses a processing of the first embodiment of the present invention.

The process flow is repeated every control cycle (refer FIG. 8) for multiple targets selected in peak detection by the whole configuration of a radar.

In step S101, one or more than one complex data is acquired in a single control cycle for each channel. The frequency resolving unit 22 reads out a beat signal of a received wave stored in the memory unit 21 and performs frequency conversion for the beat signal for each antenna.

The acquired complex data can be separately processed in ascending and descending regions by different use of either one or both data of the frequency-modulated triangular waves in ascending and descending regions.

In step S102, the normal equation creating unit 611 creates the normal equation of the order corresponding to the maximum order of the AR model for each acquisition time. In the first embodiment, the maximum order is set to three.

In step S103, the normal equation filter unit 612 averages the elements of the covariance matrix and the right-hand vector (cross-correlation vector) of the normal equation created in step S102.

The processes of steps S102 and S103 correspond to the first means in the first embodiment and the covariance matrix of the modified covariance method is itself used as the correlation matrix used to calculate the eigenvalues in the subsequent stages. The covariance matrix of the AR model is Herimitian matrix (complex symmetric matrix). Therefore, it is possible to calculate the eigenvalues using the maximum order of the AR model.

The processes of steps S104 and S109 correspond to the second means in the first embodiment.

In step S104, the eigenvalue calculating unit 621 performs an eigenvalue decomposition process based on the covariance matrix of an averaged normal equation in "the present detection cycle" created by the normal equation filter unit 612. The eigenvalue decomposition unit 621 calculates an eigenvalue and an eigenvector from the characteristic equation based on a covariance matrix through the eigenvalue decomposition process.

For resolving the eigenvalue as well as solving the characteristic equation directly, any solution program can be employed. For example, terative method algorithms such as a Jacobi method, a Householder method, and a QR method can be employed. As shown in the case of the first embodiment, a computational load can be reduced even by using a general repeated calculation type eigenvalue decomposition method described above when the order is 3.

Next, the process steps S105 to S107 correspond to the third means of the first embodiment.

In step S105, the wave number estimating unit 631 determines a maximum eigenvalue which is the maximum value among eigenvalues of the covariance matrices Cxx calculated in step S104.

The wave number estimating unit 631 determines whether or not wave number estimation should be performed for the corresponding target group in the subsequent steps based on the determination in step S105. The wave number estimating unit 631 determines, based on the determination process of the maximum eigenvalue, that the wave number estimation should not be performed in the subsequent steps if the maximum eigenvalue is less than a predetermined threshold value.

In step S106, the wave number estimating unit 631 normalizes the calculated eigenvalues with reference to the maximum value among the calculated eigenvalues. In the normalizing process of the eigenvalues, a normalized eigenvalue is obtained by dividing each eigenvalue by the maximum eigenvalue. Such in a case of a radar apparatus, when an eigenvalue (signal intensity) is varied depending on the distance to a target, it is rather easy to determine relative sizes of eigenvalues by normalizing the eigenvalues.

In step S107, the wave number estimating unit 631 determines the normalized eigenvalues based on a predetermined threshold value, and chooses a wave number in the subsequent process step based on the determination result.

Figure 14:
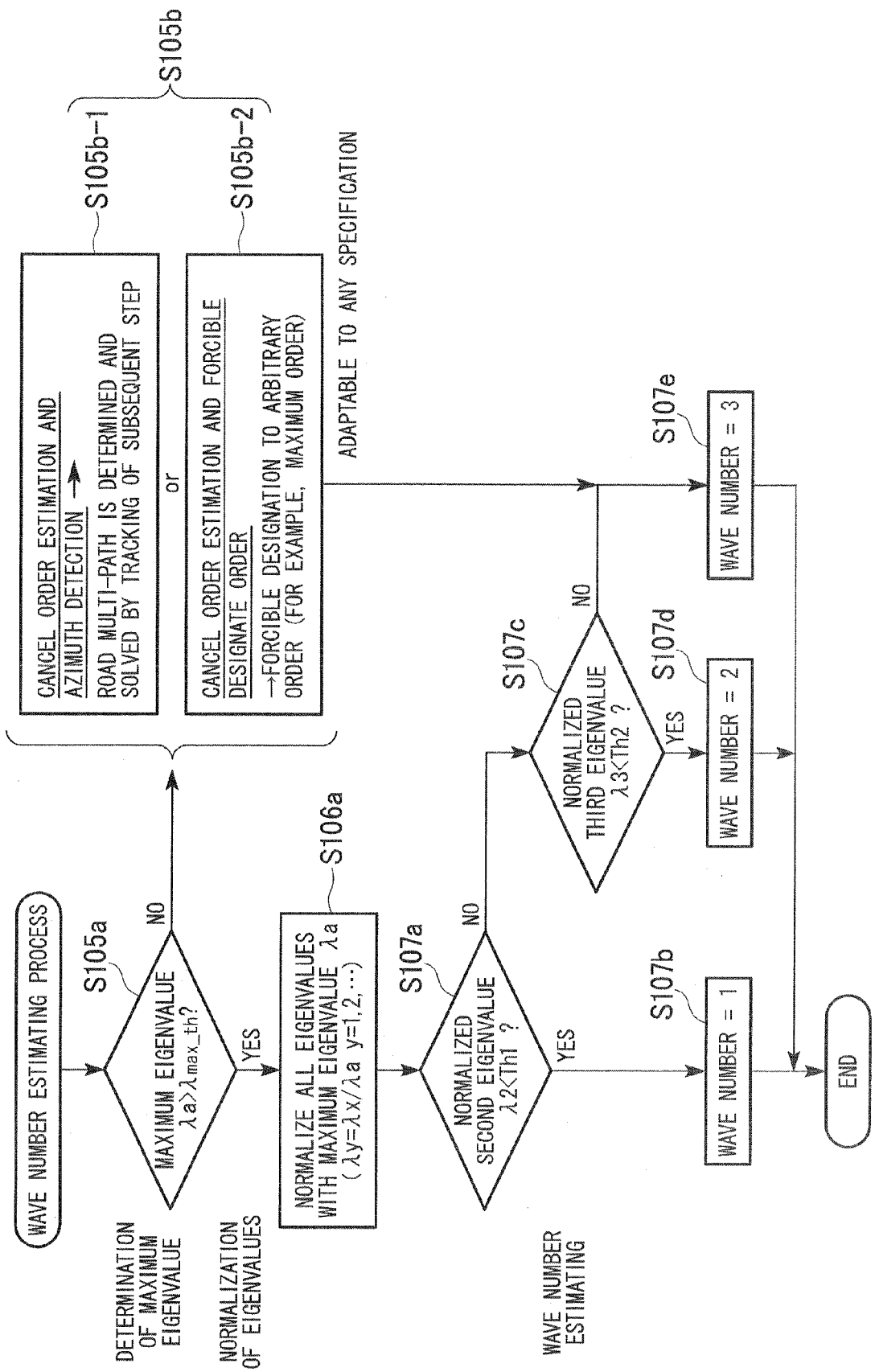
FIG. 14 is a diagram illustrating detailed signal wave number estimating process from step S105 to step S107 in FIG. 13.

In the wave number estimating step, there are two types of threshold values used for the determination as shown in FIG. 14, in which one threshold value separates wave numbers ranging from 1 to less than 2, and another threshold value separates wave numbers ranging from 2 to less than 3. In this manner, a wave number estimation result can be flexibly adjusted by determining threshold values.

FIG. 14 is a diagram that illustrates details of the signal wave estimation process in steps S105 to S107 of FIG. 13. The process of step S105a determines the maximum eigenvalue with respect to step S105. The process of step S105a determines whether or not the value of the maximum eigenvalue ($λ_a$) is larger than a predetermined threshold value ($λ_{max\_th}$). When the value of the maximum eigenvalue ($λ_a$) is smaller than the predetermined threshold value ($λ_{max\_th}$) (No" in step S105a), the reliability of information (complex data) acquired in step S105b is determined to be low and the wave number estimating unit 631 does not perform the wave number estimation process of the next step on the corresponding target. The maximum eigenvalue is equivalent (proportional) to the intensity of the input signal. Accordingly, even when a signal is received on the basis of a clutter unique to the in-vehicle radar such as the road multi-path, it is possible to prevent the incorrect azimuth estimation by determining the maximum eigenvalue. The wave number estimating unit 631 may perform the determination using the total sum of the calculated eigenvalues (or the sum of diagonal elements of the original correlation matrix) instead of the maximum eigenvalue.

For example, in step S105b, both the wave number estimation and the azimuth estimation can be cancelled as in step S105b-1. As in step S105b-2, the wave number estimation may be cancelled and any wave number (e.g., the maximum wave number) may be forcibly designated.

When it is determined in step S105a that the maximum eigenvalue is larger than the predetermined threshold value (Yes in step S105a), the process of step S106a is performed. A normalization process of the eigenvalue corresponding to step S105a is performed in step S106a and the values obtained by the eigenvalues λx by the maximum eigenvalue λa are set as the normalized eigenvalues λy.

These process steps S107a to S107e are the wave number estimation processes corresponding to step S107 performed by the wave number estimating unit 631.

In step S107a, the eigenvalue (normalized second eigenvalue) which is the second largest out of the eigenvalues normalized in step S106 is selected and it is determined whether or not the normalized second eigenvalue is smaller than a predetermined threshold value Th1.

When it is determined in step S107a that the normalized second eigenvalue is not smaller than the predetermined threshold value Th1 (NO in step S107a), the process of step S107c is performed.

In step S107b, when it is determined in step S107a that the normalized second eigenvalue is smaller than the predetermined threshold value Th1 (YES in step S107a), the wave number is set to 1 and is stored in a memory area storing the estimated wave number information not shown, and the wave number estimation process is ended.

In step S107c, the eigenvalue (normalized third eigenvalue) which is the third largest out of the eigenvalues normalized in step S106 is selected and it is determined whether or not the normalized third eigenvalue is smaller than a predetermined threshold value Th2. When the normalized third eigenvalue is smaller than the predetermined threshold value Th2 (NO in step S107c), the process of step S107e is performed.

In step S107d, when it is determined in step S107c that the normalized third eigenvalue is less than the predetermined threshold value Th2 (YES in step S107c), the wave number is set to 2 and is stored in the memory area storing the estimated wave number information not shown, and the wave number estimation process is ended.

In step S107e, when it is determined in step S107c that the normalized third eigenvalue is smaller than the predetermined threshold value Th2 (NO in step S107c), the estimated wave number is set to 3 and is stored in the memory area storing the estimated wave number information not shown, and the wave number estimation process is ended.

In this manner, in the wave number estimation process of steps S107a to S107e, two types of threshold values of the threshold value Th1 used to distinguish the wave number 1 from the wave number 2 or greater and the threshold value Th2 used to distinguish the wave number 2 from the order 3 are used.

Referring to FIG. 13, a description will be given of a fourth means in accordance with the first embodiment. The processes of steps S108 to S109 correspond to the fourth means of the first embodiment.

In step S108, the covariance pseudo inverse matrix calculating unit 641 performs a covariance pseudo inverse matrix creating process of creating a covariance pseudo inverse matrix of a signal subspace in the present detection cycle in response to the wave number estimated by the wave number estimating unit 631 in step S107.

In step S104, the covariance pseudo inverse matrix calculating unit 641 performs the covariance pseudo inverse matrix creating process according to the arithmetic equation above on the basis of the eigenvalue and the eigenvector calculated by the eigenvalue decomposition unit 621.

Subsequently, in step S109, the AR coefficient calculating unit 642 calculates an AR coefficient and the variance of an input white noise on the basis of a normal equation created in step S108.

In step S111, the power spectrum calculating unit 644 calculates a power spectrum based on the AR coefficient and the variance of the input white noise calculated in step S109.

In step S112, the power spectrum calculating unit 644 detects a number of targets and the angles indicating the directions of the targets on the basis of the calculated power spectrum.

Second Embodiment

An electronic scanning radar apparatus according to a second embodiment of the present invention will be described below with reference to FIG. 15.

Figures 15, 16A, 16B:
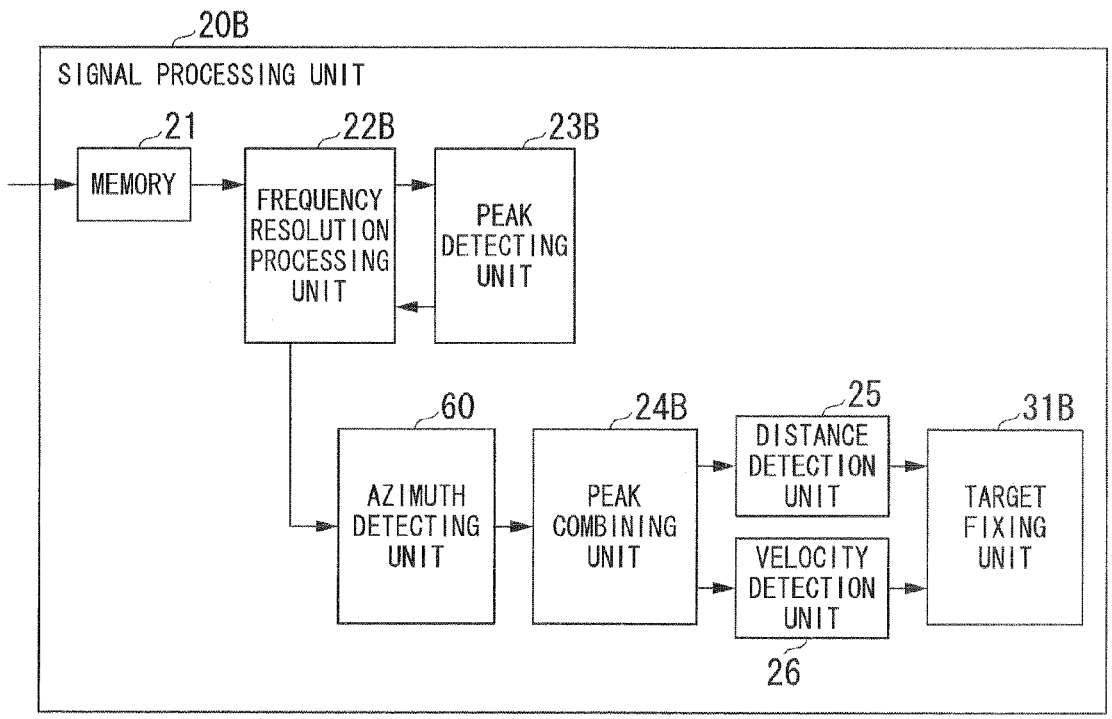
FIG. 15 is a block diagram illustrating the configuration of an azimuth detecting unit according to a second embodiment of the invention.
FIG. 16A is a data table provided in a memory unit.
FIG. 16B a data table provided in the memory unit.

FIG. 15 is a block diagram illustrating the configuration of the electronic scanning radar apparatus in the second embodiment.

A signal processing unit 20B in the second embodiment performs the azimuth estimating process using a high resolution algorithm, similarly to the first embodiment. The same elements as the first embodiment shown in FIG. 1 will be referred by the same reference symbols and the following description will be centered on the differences from the first embodiment.

The frequency resolving unit 22B of the signal processing unit 20B converts the beat signals of the ascending region and the descending region for each antenna into complex data and outputs the frequency point indicating the beat frequencies thereof and the complex data to the frequency resolving unit 22B.

The frequency resolving unit 22B outputs the complex data corresponding to the ascending region and the descending region to the azimuth detecting unit 60.

The complex data are target groups (beat frequencies having peaks in the ascending region an the descending region) of the ascending region and the descending region.

The azimuth detecting unit 60 estimates the order on the basis of the supplied complex data.

In this case, the peak detecting unit 23B can perform an operation identical to the maximum eigenvalue determination (step S106a) in the model order estimation process of the azimuth detecting unit 60, and thus the peak detecting unit 23B can be deleted.

The azimuth detecting unit 60 detects the angle θ for the AR coefficient of the ascending region and the AR coefficient of the descending region and outputs the detected angles to the peak combining unit 24B as the tables shown in FIGS. 16A and 16B.

The peak combination unit 24B performs combinations of data having the same angles on the basis of the information of the tables shown in FIG. 16A and FIG. 16B and outputs the combinations of the beat frequencies of the ascending region and the descending region to the distance detecting unit 25 and the velocity detecting unit 26.

The distance detecting unit 25 calculates the distance on the basis of the beat frequencies of the ascending region and the descending region in the combinations, similarly to the first embodiment.

The velocity detecting unit 26 calculates the relative velocity on the basis of the beat frequencies of the ascending region and the descending region in the combinations, similarly to the first embodiment.

In this case, the distance detecting unit 25 and the velocity detecting unit 26 calculate the values of the distance and the relative velocity on the basis of the combinations of the beat frequencies of the ascending region and the descending region.

The target fixing unit 31B determines the pair of peaks of the ascending region and the descending region and fixes a target.

Third Embodiment

An electronic scanning radar apparatus according to a third embodiment of the invention will be described below with reference to FIG. 17.

Figure 17:
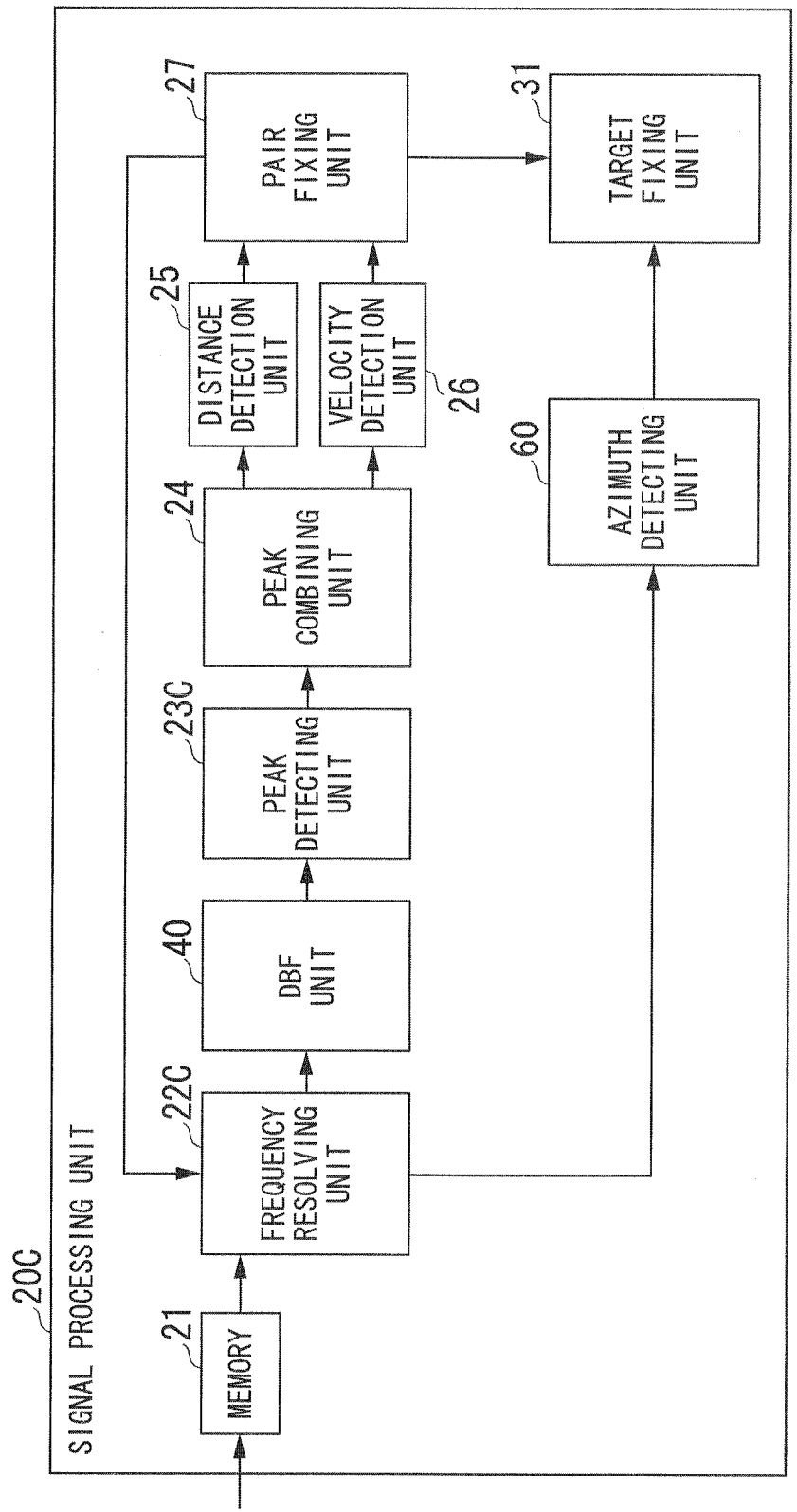
FIG. 17 is a block diagram illustrating the configuration of an electronic scanning radar apparatus according to a third embodiment of the invention.

FIG. 17 is a block diagram illustrating the configuration of the electronic scanning radar apparatus in accordance with the third embodiment.

A signal processing unit 20C of the third embodiment performs an azimuth estimating process first using a DBF (Digital Beam Forming) with a resolution lower than that of the high resolution algorithm such as the AR spectrum estimating process and then performs the azimuth estimating process using the high-resolution algorithm including the AR spectrum estimating process using the AR coefficient, unlike the first embodiment. The same elements as the first embodiment shown in FIG. 1 will be referenced by the same reference symbols and the following description will be centered on the differences from the first embodiment.

As shown in the drawing, the third embodiment is different from the first embodiment, in that a DBF processing unit 40 is provided between the frequency resolving unit 22C and the peak detecting unit 23C in the first embodiment shown in FIG. 1, and the azimuth in which the received wave arrives is estimated first using the DBF processing unit 40 as described above.

The same elements as the first embodiment shown in FIG. 1 will be referenced by the same reference symbols and the following description will be centered on the differences from the first embodiment.

The frequency resolving unit 22C converts the triangular waves in the ascending region (ascending) and descending region (descending) into frequencies of discrete time by performing the frequency resolution process on the basis of the data of beat signals stored in the memory unit 21. That is, the frequency resolving unit 22C resolves the beat signals into beat frequencies having a predetermined frequency bandwidth, calculates complex data based on the beat signals resolved for each beat frequency, and outputs the calculated complex data to the DBF processing unit 40.

The DBF processing unit 40 applies a Fourier transformation to the complex data corresponding to each antenna in the arranged direction of the antennas, that is, performs a Spatial Fourier transformation.

The DBF processing unit 40 depends on the angle, that is, calculates spatial complex data for the angular channels corresponding to the angle resolution and outputs the calculated spatial complex data to the peak detecting unit 23C for each beat frequency.

Accordingly, the spectrum represented by the spatial complex data (in the unit of beat frequency) for each angular channel output from the DBF processing unit 40 depends on the DOA estimation of the received wave based on a beam scanning resolution.

Since the complex data is transformed by Fourier transformation in the arranged direction of the antennas, the same advantage as the configuration in which the complex data of the angular channels are added can be achieved and the complex data for each angular channel is improved in the S/N ratio, thereby improving the accuracy in detecting the peak values, similarly to the first embodiment.

The complex data and the spatial complex data described above are calculated in both the ascending region and the descending region of the triangular wave, similarly to the first embodiment.

The peak detecting unit 23C detects a peak for each angular channel based on the DBF process result after the processing of the DBF processing unit 40, and outputs the detected peak values of the channels to the peak combining unit 24 for each angular channel. Namely, in the case of the Spatial Fourier transformation with a 16 resolution, the number of angular channels is 15.

Similarly to the first embodiment, the peak combining unit 24 combines the beat frequencies having the peak values in the ascending region and the descending region and with those peak values and outputs the combinations to the distance detecting unit 25 and the velocity detecting unit 26 for each angular channel.

The pair fixing unit 27 creates the table shown in FIG. 5 for each angular channel using the distance r and the relative velocity v sequentially input from the distance detecting unit 25 and the velocity detecting unit 26 and determines the combination of peaks of the ascending region and the descending region corresponding to each target for each angular channel, similarly to the first embodiment. In this case, since the resolution of the DBF processing represents that a target is present over plural angular channels, the peaks of the ascending region and the descending region for each angular channel can be properly combined in consideration of the agreement with neighboring angular channels (matrices).

The pair of the peaks in the ascending region and the descending region is determined, the target group number indicating the determined distance r and the determined relative velocity v and is generated to create the table shown in FIG. 18.

FIG. 18 is a diagram illustrating a table storing the determined pairs of the peaks in the ascending region and the descending region.

Since the pair fixing unit 27 can acquire information on the angular channels for each target as well as the distance r and the relative velocity v and can calculate a longitudinal position and a lateral position, the table which is shown in FIG. 18 having the results corresponding to each target group in the present detection cycle is created, in which the longitudinal positions and the lateral positions are included in the table shown in FIG. 6. In addition, the pair fixing unit 27 transmits the frequency points which the pairs have been determined to the frequency resolving unit 22C, and determines the complex data to be sent to the azimuth detecting unit 60.

Furthermore, the DBF processing unit 40 in accordance with the third embodiment detects the presence and the azimuth of a target on the basis of the complex data by the use of the digital beam forming (DBF) which enhances the receiving sensitivity in a desired direction to the received wave. The azimuth detecting unit 60 detects the azimuth of a target using the AR spectrum estimating process as a high resolution algorithm.

Accordingly, by detecting the azimuth using the DBF indicating a stable beam spectrum with a low resolution before the azimuth detection with high accuracy performed by the azimuth detecting unit 60, it is possible to improve the estimation accuracy.

By estimating the azimuth through the use of the logical product (AND logic) based on the azimuth information from the azimuth detecting unit 60 and the azimuth information from the DBF processing unit 40, it is possible to improve the reliability in detecting a direction, to share the azimuth information, or to use the angle information of the DBF because the poor angle resolution does not cause a particular problem at a short distance.

Fourth Embodiment

An electronic scanning radar apparatus according to a fourth embodiment of the present invention will be described below with reference to FIG. 19.

Figure 19:
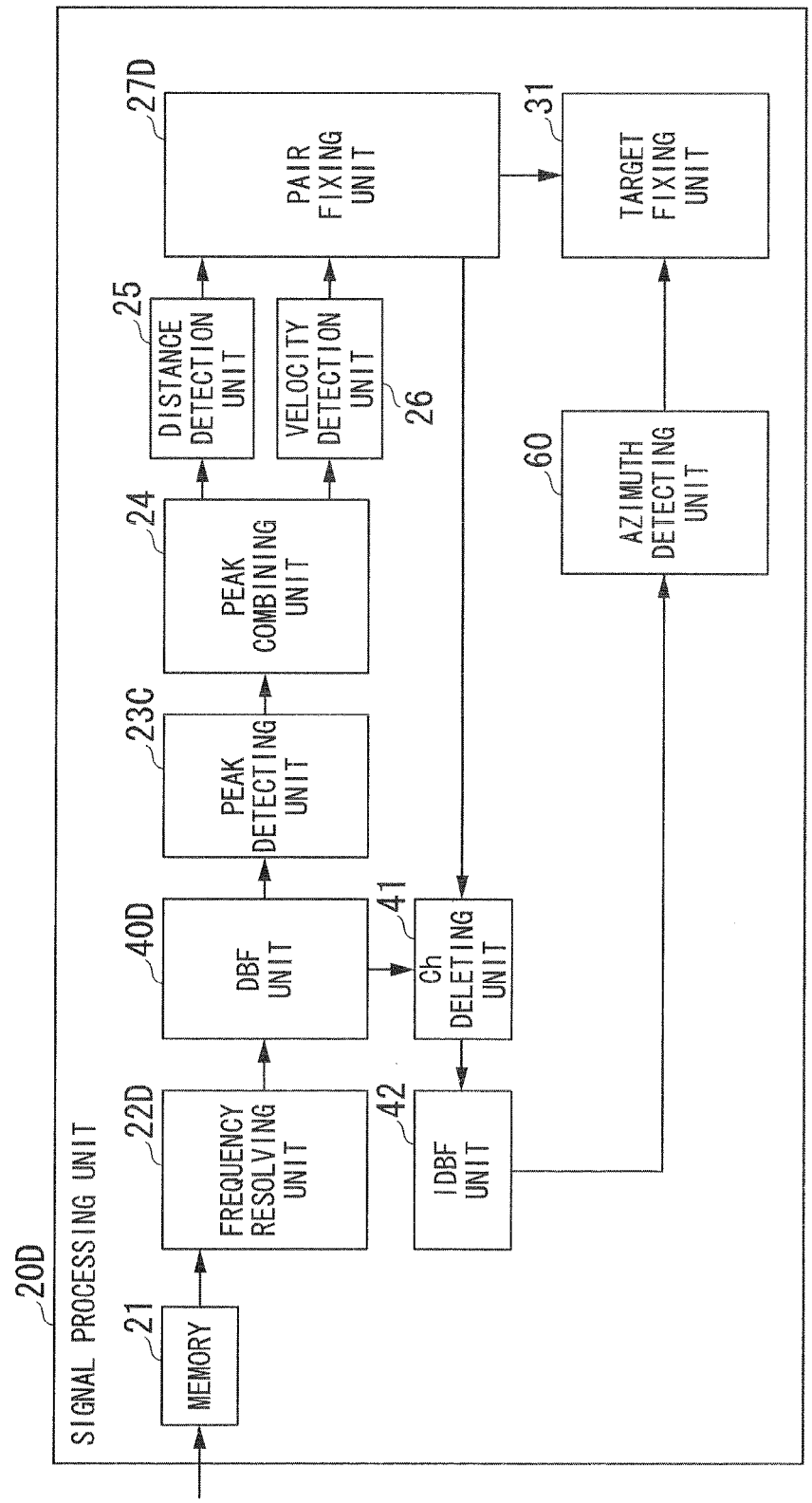
FIG. 19 is a block diagram illustrating the configuration of an electronic scanning radar apparatus according to a fourth embodiment of the invention.

FIG. 19 is a block diagram that illustrates the configuration of the electronic scanning radar apparatus of the fourth embodiment.

A signal processing unit 20D in the fourth embodiment performs an azimuth estimation in advance to a DBF (Digital Beam Forming) process with low resolution compared to a high resolution algorithm such as the AR spectrum estimation process, narrows the angle range of a target, performs an IDBF (Inverse DBF, that is, reverse space Fourier Transformation), and returns the data to complex data in the frequency axis to improve the accuracy of the azimuth estimation to be performed in the subsequent azimuth estimation process based on the high resolution algorithm, unlike the case of the first embodiment. The same elements as the third embodiment shown in FIG. 17 will be referred by the same symbols. The following description will be centered on the differences from the third embodiment.

In the fourth embodiment, a channel deleting unit (Ch deleting unit) 41 and an IDBF processing unit 42 are added to the configuration of the third embodiment.

The frequency resolving unit 22D performs a frequency transformation that transforms the sampled data of the beat signals stored in the memory unit 21 for the ascending region (ascending) and the descending region (descending) of the triangular waves into frequencies of discrete time. That is, the frequency resolving unit 22D resolves the beat signals into the beat frequencies having a predetermined frequency bandwidth, calculates complex data based on the resolved beat signals for each beat frequency, and outputs the calculated complex data to the DBF processing unit 40D.

The DBF processing unit 40D performs a Spatial Fourier transformation, similarly to the third embodiment, and outputs spatial complex data to the peak detecting unit 23C and the Ch deleting unit 41.

Figure 20A:
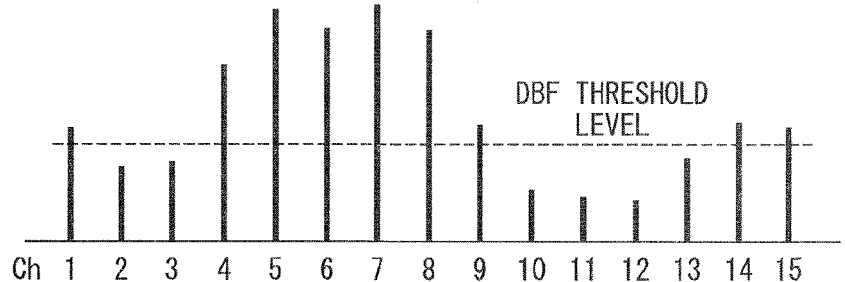
FIG. 20A is a conceptual diagram illustrating the processing of a spectrum intensity in angular channels.

In this case, the DBF processing unit 40D performs the Spatial Fourier transformation with a 16 point resolution in the arranged direction of the receiving antennas, in the fourth embodiment for example, as shown in FIG. 20A, generates a spectrum for each of 15 angular channels as a result, and outputs to the Ch deleting unit 41.

The Ch deleting unit 41 performs a process of detecting whether or not levels of the spectra of the spatial complex data corresponding to the peak frequency points (for example, the descending region) of the DBF target determined by the pair fixing unit 27D are continuous within a predetermined angle range and is greater than the level of predetermined DBF threshold value, and then replaces the spectrum of the angular channel not greater than the DBF threshold value with "0" and outputs the narrowed spatial complex data.

Figure 20B:
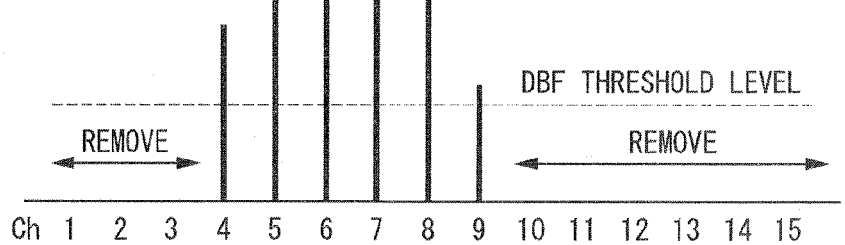
FIG. 20B is a conceptual diagram illustrating the processing of a spectrum intensity in angular channels.

In the process above, for example, when six neighboring angular channels have levels that are continuously greater than the DBF threshold value as shown in FIG. 20B, the Ch deleting unit 41 detects that more than one of targets exist within the range, leaves the spectra of the six neighboring channels and replaces levels of the spectra of the rest of channels with "0."

The IDBF processing unit 42 narrows the spectra, that is, generates the spatial complex data in which only the data of the angular channels continuously greater than the DBF threshold value out of a predetermined number of angular channels are left and the intensities of the other angular channels are replaced with "0." The IDBF processing unit 42 performs the inverse spatial-axis Fourier transform on the replaced spatial complex data to return the spatial complex data to the complex data in the frequency axis and outputs the resultant complex data to the azimuth detecting unit 60.

Figure 20C:
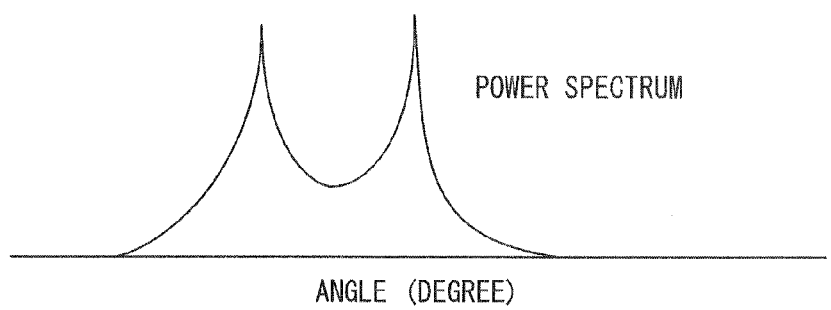
FIG. 20C is a conceptual diagram illustrating the processing of a spectrum intensity in angular channels.

In order to calculate a normal equation (or a correlation matrix) from the input complex data, the azimuth detecting unit 60 can calculate a normal equation (or a correlation matrix) from which the noise component is reduced by removing components of road-side objects. In FIG. 20C, the normal equation of a target group (referred to as a target group since two or more targets may be present in practice) with the DBF resolution shown in FIG. 20B is created using the above mentioned method and the targets are further separated using a high resolution algorithm.

Figure 21A:
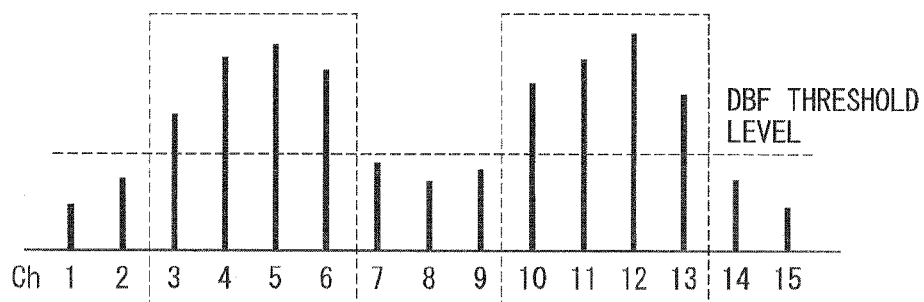
FIG. 21A is a conceptual diagram illustrating the processing of a spectrum intensity in angular channels.

As shown in FIG. 21A, when a received wave including reflected components from plural target groups is received, plural angular channels greater than the DBF threshold value level out of the continuous angular channels exist in the spatial complex data output from the DBF processing unit 40D.

Figure 21B:
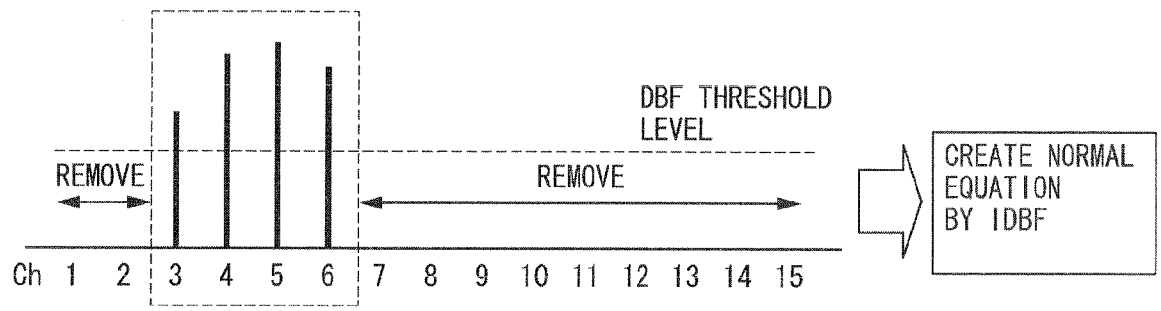
FIG. 21B is a conceptual diagram illustrating the processing of a spectrum intensity in angular channels.
Figure 21C:
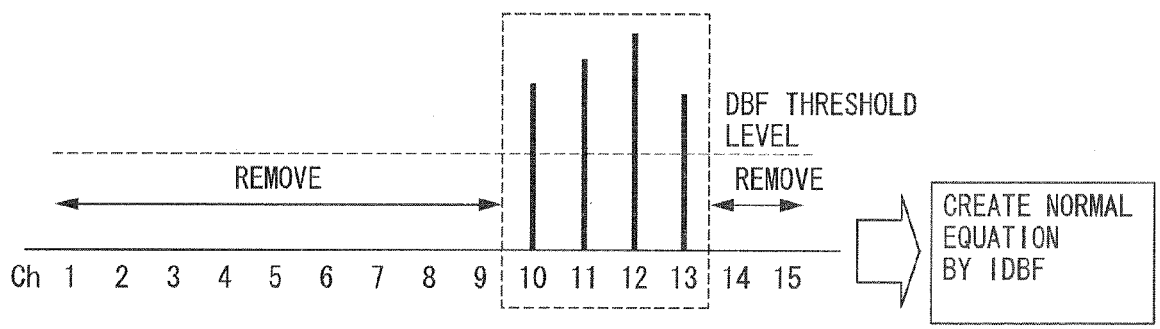
FIG. 21C is a conceptual diagram illustrating the processing of a spectrum intensity in angular channels.

The Ch deleting unit 41 divides the input spatial complex data into other spatial complex data identified in the angular channel regions. The Ch deleting unit 41 extracts the angular channel regions in which the levels of the spectra of the adjacent angular channels are continuously greater than the DBF threshold value level in the predetermined angular channel range. The Ch deleting unit 41 replaces the intensities of the spectra other than the extracted angular channel regions with "0." As shown in FIGS. 21B and 21C, the Ch deleting unit 41 divides the input spatial complex data into other spatial complex data identified in the unit of angular channel regions.

Here, the pair fixing unit 27D calculates the distance, the relative velocity, the longitudinal position, and the lateral position, similarly to the first embodiment, and outputs the calculated information to the Ch deleting unit 41.

The Ch deleting unit 41 selects the spatial complex data corresponding to the frequency point of the DBF target, performs the above mentioned Ch deletion thereon, and outputs the resultant spatial complex data to the IDBF processing unit 42.

The IDBF processing unit 42 performs the inverse spatial-axis Fourier transform on the input spatial complex data and outputs the acquired complex data in the frequency axis to the azimuth detecting unit 60.

The DBF processing unit 40D in the fourth embodiment calculates the spatial complex data indicating the intensity of the spectrum for each angular channel corresponding to the desired direction set on the basis of the digital beam forming. The DBF processing unit 40D detects the presence of a target and defines the detected target as a DBF detection target, when the intensities of the spectra of the adjacent angular channels are greater than a predetermined DBF threshold value level within a predetermined angular channel width range. The Ch deleting unit 41 replaces the spectrum intensities of the angular channels in which the presence of a target is not detected with "0." The Ch deleting unit 41 outputs the resultant data as new spatial complex data. The IDBF processing unit 42 generates reproduced complex data by performing the inverse DBF process on the new spatial complex data. The normal equation creating unit 611 creates a normal equation from the reproduced complex data.

When plural DBF detection targets are detected, the Ch deleting unit 41 in the fourth embodiment divides the spectra by the angular channels corresponding to the DBF detection targets and generates the spatial complex data corresponding to the number of DBF detection targets. The IDBF processing unit 42 generates reproduced complex data for each DBF detection target by performing the inverse DBF process on the spatial complex data for each DBF detection target. The normal equation creating unit 611 calculates a normal equation for each DBF detection target on the basis of the reproduced complex data for each DBF detection target.

By the processes mentioned above, it is possible to narrow the detection direction range when calculating the spectra in the AR spectrum estimating process of the azimuth detecting unit 60 and to enhance the resolution, compared with the first to third embodiments.

Furthermore, by employing the configuration described above, it is like that the received waves divided with the reflected components of the target groups are virtually received in the normal equation (or the correlation matrix) used for the calculation of the AR coefficient in the azimuth detecting unit 60. Accordingly, for example, even when the received wave containing reflected components from more targets than the number of receiving antennas and the set order is received, the AR coefficient an be correctly calculated.

Fifth Embodiment

In a fifth embodiment of the present invention, another example will be described with reference to the configuration of the electronic scanning radar apparatus shown in FIG. 1.

Figure 22:
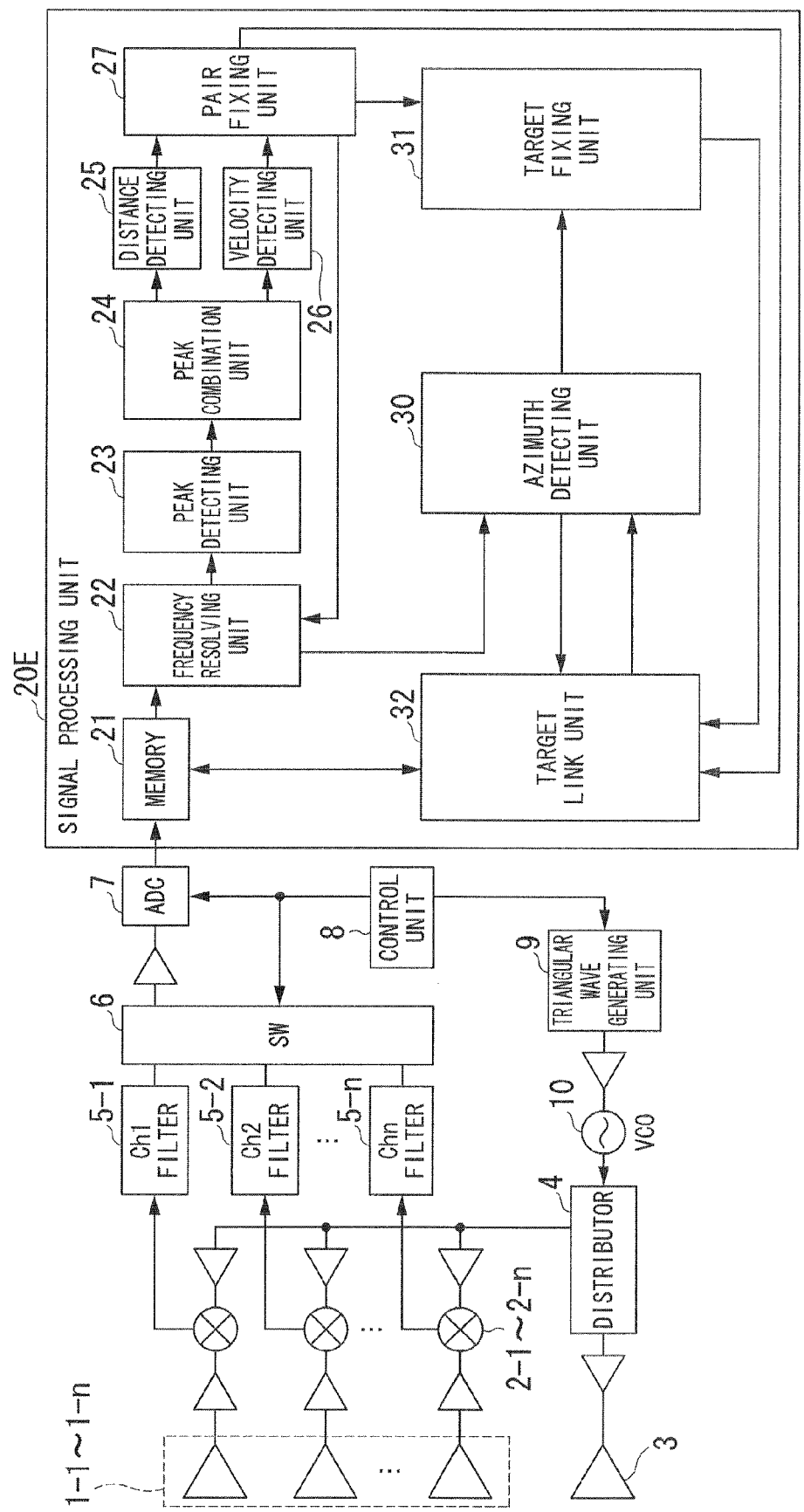
FIG. 22 is a block diagram illustrating the configuration of an electronic scanning radar apparatus according to a fifth embodiment of the invention.

FIG. 22 is a block diagram that illustrates part of the configuration of an electronic scanning radar apparatus according to a fifth embodiment.

The electronic scanning radar apparatus shown in FIG. 22 includes a signal processing unit 20E instead of the signal processing unit 20A shown in FIG. 1. The same elements as shown in FIG. 1 are referenced by the same reference symbols.

The signal processing unit 20E includes a memory 21, a frequency resolving unit 22, a peak detecting unit 23, a peak combining unit 24, a distance detecting unit 25, a velocity detecting unit 26, a pair fixing unit 27, an azimuth detecting unit 30, a target fixing unit 31, and a target link unit 32.

The target fixing unit 31 binds the azimuth of the target detected by the azimuth detecting unit 30 to the distance r, the relative velocity v, and the frequency point, which is shown in FIG. 6, input from the pair fixing unit 27 and outputs the resultant information to the target link unit 32.

The target link unit 32 binds the target in the past detection cycle stored in the memory 21 and outputs the complex data recorded in the past detection cycle (FIG. 24) for each target to the azimuth detecting unit 30.

The target link unit 32 adds the identification information of the distance, the relative velocity, and the azimuth output from the target fixing unit 31 to the complex data acquired in the present detection cycle (FIG. 24) and records the resultant data in the memory 21.

The azimuth detecting unit 30 performs a spectrum estimating process using the AR spectrum estimating method as the high-resolution algorithm or the method such as the MUSIC method. In the spectrum estimating process, the azimuth detecting unit 30 performs an averaging process on the normal equation created on the basis of the complex data acquired in the present detection cycle and the past detection cycle and performs the spectrum estimating process using the AR coefficient of the averaged normal equation and the variance of the input white noise, similarly to the first embodiment. The azimuth detecting unit 30 detects the azimuth of the corresponding target on the basis of the result of the spectrum estimating process and outputs the detected azimuth to the target fixing unit 31.

Hereinafter, the configurational example where the AR spectrum estimating method known as a high-resolution algorithm is used in the spectrum estimation process will be described below in more detail.

Figure 23:
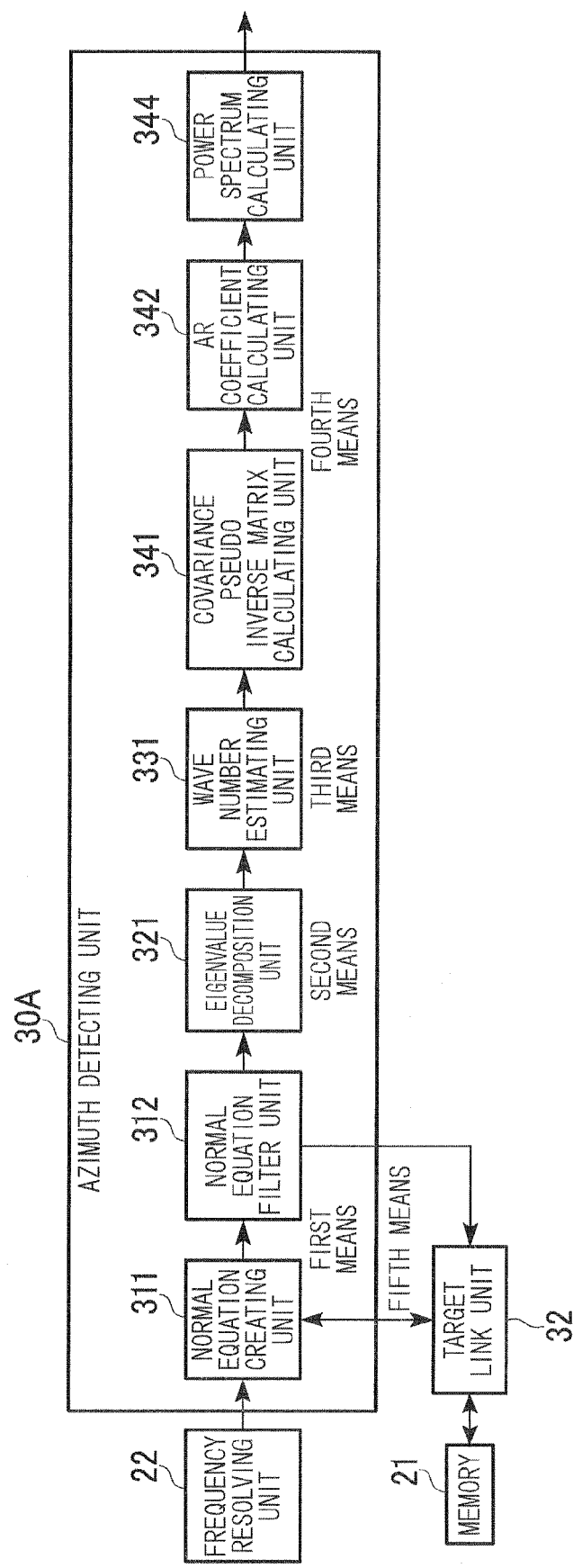
FIG. 23 is a block diagram illustrating the configuration of an azimuth detecting unit according to the fifth embodiment of the invention.

FIG. 23 is a block diagram that illustrates the configuration of the azimuth detecting unit in the fifth embodiment.

The azimuth detecting unit 30A shown in FIG. 23 is an example of the azimuth detecting unit 30 shown in FIG. 23.

The azimuth detecting unit 30A includes a normal equation creating unit 311, a normal equation filter unit 312, an eigenvalue decomposition unit 321, a wave number estimating unit 331, a covariance pseudo inverse matrix calculating unit 341, an AR coefficient calculating unit 342, and a power spectrum calculating unit 344.

In the fifth embodiment, the normal equation creating unit 311 and the normal equation filter unit 312 serve as first means, the eigenvalue calculating unit 331 and the order estimating unit 332A serve as third means, the normal equation creating unit 341 and the normal equation filter unit 342 serve as fourth means, and the normal equation creating unit 311 and the normal equation creating unit 341 serve as fifth means.

The normal equation creating unit 311 of the azimuth detecting unit 30A creates a normal equation necessary for estimating the order of a normal equation used for the AR spectrum estimating process in the subsequent step. The normal equation creating unit 311 creates a normal equation derived from the complex data corresponding to the beat frequencies (one or both of the ascending region and the descending region) frequency-resolved by the frequency resolving unit 22.

The azimuth detecting unit 30A acquires the complex data from the frequency resolving unit 22, creates the normal equation, outputs the acquired complex data to the target link unit 32, and stores the complex data in the memory unit 21. The azimuth detecting unit 30A acquires the complex data stored in the memory unit 21 via the target link processing unit 32. Thereby, the azimuth detecting unit 30A creates the normal equations corresponding to the respective complex data on the basis of the complex data acquired in the "present detection cycle" and the complex data acquired in the "past detection cycle."

The normal equation filter unit 312 performs an averaging process on the normal equation in the "present detection cycle" and the normal equation in the "past detection cycle" created by the normal equation creating unit 311.

The eigenvalue decomposition unit 321 performs an eigenvalue decomposition process based on the covariance matrix of the averaged normal equation in the "present detection cycle" and the "past detection cycle" created by the normal equation filter 312. The eigenvalue decomposition process is a calculation process that calculates an eigenvalue and an eigenvector from a characteristic equation on the basis of the covariance matrix. It is possible to apply an optional solution program to the eigenvalue decomposition process. For example, except for directly solving a characteristic equation, repeated calculation type algorithms such as a Jacobi method, a Householder method, and a QR method can be employed.

The wave number estimating unit 331 determines the maximum value of the eigenvalue from the eigenvalues (or the eigenvectors) calculated through the eigenvalue decomposition process by the eigenvalue decomposition unit 321. The wave number estimating unit 331 normalizes each calculated eigenvalue on the basis of the maximum value of the eigenvalues.

The wave number estimating unit 331 determines the normalized eigenvalue based on a predetermined threshold value and selects the wave number in the subsequent step based on the resultant of the determination.

The covariance pseudo inverse matrix calculating unit 341 creates the covariance pseudo inverse matrix of a signal subspace from the eigenvalue and the eigenvector calculated by the eigenvalue decomposition unit 321 (second means). It is possible to reduce the components of noise by creating the covariance pseudo inverse matrix of the signal subspace. With reference to the noise subspace reduction, the main component estimation of AR spectrum is described in Steven M. Kay, "Modern Spectral Estimation Theory & Application," Prentice Hall, 1988, pp. 426-428 (13.8.1 Ar Frequency Estimation).

The AR coefficient calculating unit 342 calculates a variance $\sigma^2$ of the input white noise an AR coefficient derived from the covariance pseudo inverse matrix of a signal subspace created by the covariance pseudo inverse matrix calculating unit 341 and the right hand vector, and calculates a variance $\sigma^2$ of the input white noise. In this way, the AR coefficient calculating unit 342 can derive, in response to each detection cycle, the AR coefficient based on the complex data of the detection beat frequency which is the beat frequency from which the presence of a target has been detected and the variance $\sigma^2$ of the input white noise. The AR coefficient calculating unit 342 outputs the derived AR coefficient and the derived variance $\sigma^2$ of the input white noise to the power spectrum calculating unit 344.

The power spectrum calculating unit 344 calculates the DOA of the received wave from the power the power spectrum derived o the based of the AR coefficient and the variance $\sigma^2$ of the input white noise.

Figure 24:
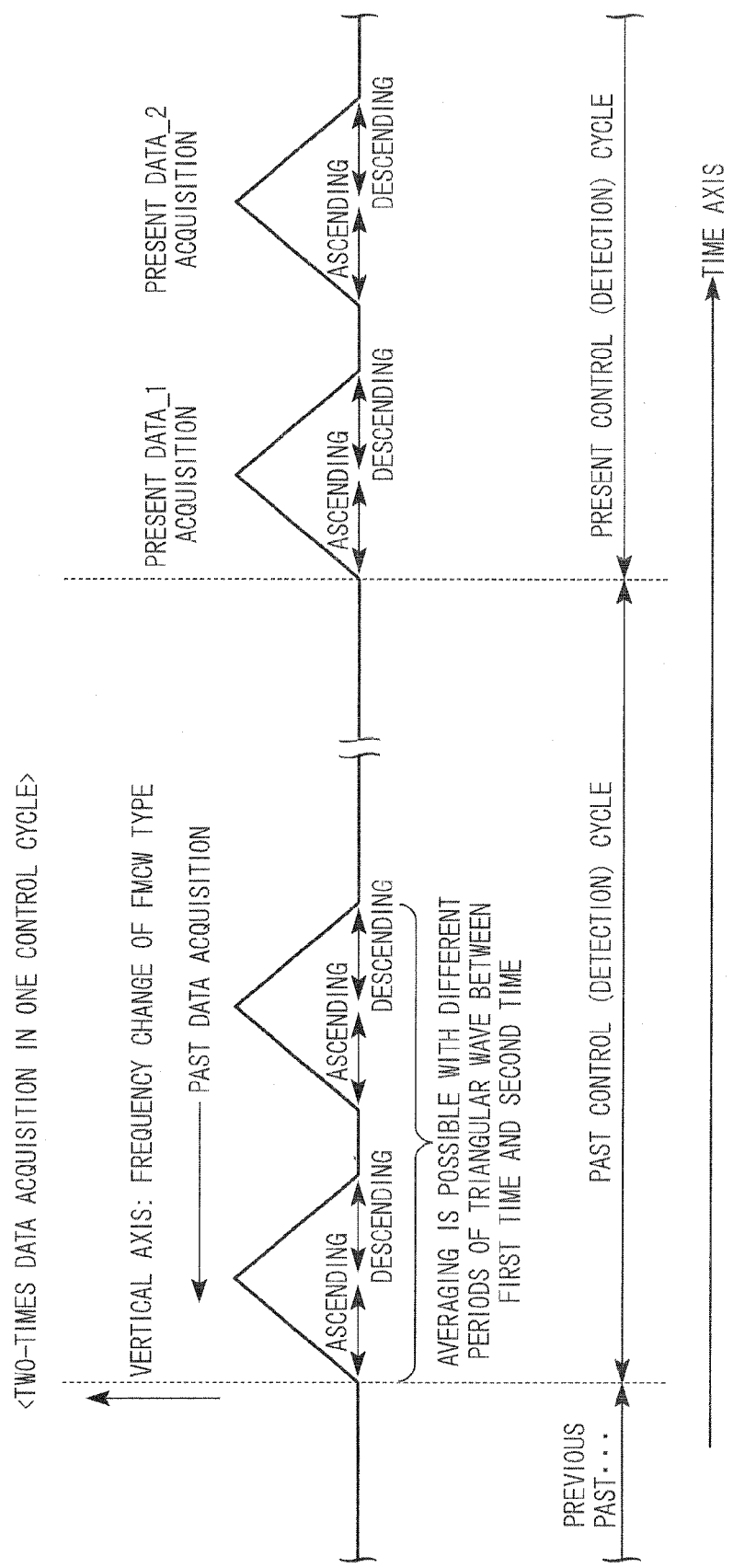
FIG. 24 is a time chart indicating data acquisition process in the detection cycle.

FIG. 24 is a timing diagram illustrating a data acquiring process in the detection cycles.

The past control (detection) cycles performed previously to the present control (detection) cycle are shown in FIG. 24.

In each cycle, at least one data acquisition is performed and the one data acquisition is indicated by a triangular waveform. The triangular waveform represents a signal modulated by the FMCW method, and the ascending at the rising timing and the descending at the falling timing are detected.

The individual data acquisition is repeatedly performed at such a time gap so as not to interfere with each other and the frequency modulation period of the triangular wave may not be constant.

For example, when twice of data acquisition are performed in the present control (detection) cycle, the first data acquisition is referred to as "present data_1 acquisition," and the second data acquisition is referred to as "present data_2 acquisition." Also, when twice of data acquisition were performed in the past control (detection) cycle, the data acquisition firstly performed is referred to as "past data_1 acquisition," and the data acquisition secondly performed is referred to as "past data_2 acquisition."

In the fifth embodiment, for each of the present detection cycle and the past detection cycle, various averaging processes in the subsequent steps are performed on the basis of the plural pieces of complex data acquired in the same cycle.

The control (detection) cycle in which data is presently acquired is referred to as "present control (detection) cycle" and the control (detection) cycle in which data was acquired previously to the "present control (detection) cycle" is referred to as "past control (detection) cycle." In this case, it is possible to optionally set the number of past. In the fifth embodiment, the number of past is set as 1 and the past is referred to as previous time.

Figure 25:
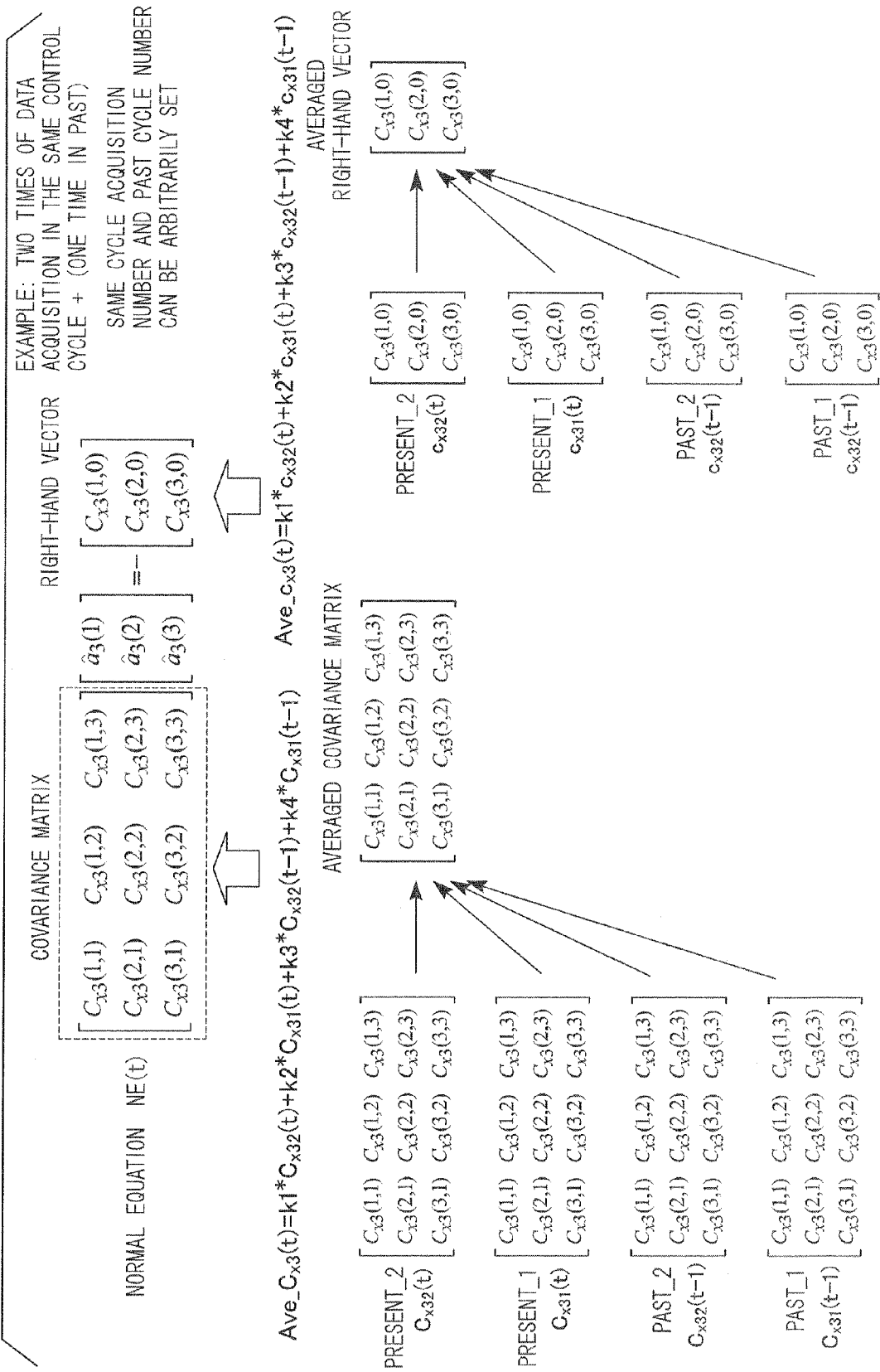
FIG. 25 is a drawing that illustrates the configuration of a normal equation and an averaging process based on acquired complex data.

FIG. 25 is a diagram illustrating the configuration of a normal equation based on the acquired complex data and the averaging process thereof.

The normal equation shown in FIG. 25 includes constituent parts of a covariance matrix which is an M-th-order normal matrix, an AR coefficient of M rows and 1 column, and a right-hand vector of M rows and 1 column.

The covariance matrix and the right-hand vector are created on the basis of the acquired complex data. The AR coefficient is calculated by solving the normal equation. As shown in FIG. 24, data are acquired plural times in plural control (detection) cycles. The covariance matrix $C_{xxk}(t)$ and the right-hand vector $c_{xxk}(t)$ are created in the acquisition order of the acquired complex data.

In FIG. 24, the number of times that data is acquired in one control (detection) cycle is set to two, and the order is set to three. To correspond to the times of data acquisition in the present control (detection) cycle, the covariance matrices $C_{xx1}(t)$ and $C_{xx2}(t)$ and the right-hand vectors $c_{xx1}(t)$ and $c_{xx2}(t)$ are expressed in the order of "present_1" and "present_2". To correspond to the times of data acquisition in the past control (detection) cycle, the covariance matrices $C_{xx1}(t-1)$ and $C_{xx2}(t-1)$ and the right-hand vectors $c_{xx1}(t-1)$ and $c_{xx2}(t-1)$ are expressed in the order of "past_1" and "past_2".

In the fifth embodiment, the process of averaging the normal equation to be described later is performed on the basis of the complex data acquired plural times in the same control (detection) cycle, in each of the present control (detection) cycle and the past control (detection) cycle. By averaging the elements of the covariance matrices $C_{xxk}(t)$ and the right-hand vectors $c_{xxk}(t)$ corresponding to four times of "present_1", "present_2", "past_1", and "past_2", the averaging process is performed.

A computational expression for calculating an averaged covariance matrix $Ave\_C_{xxk}(t)$ through the process of averaging the normal equation is expressed by Expression 17.

$$Ave\_C_{xx}(t) = k1*C_{xx2}(t) + k2*C_{xx1}(t) + k3*C_{xx2}(t-1) + k4*C_{xx1}(t-1) \quad (17)$$

In Expression 17, k1* to k4* represent weighting coefficients.

A computational expression for calculating an averaged right-hand vector $Ave\_c_{xxk}(t)$ through the process of averaging the normal equation is expressed by Expression 18.

$$Ave\_c_{xx}(t) = k1*c_{xx2}(t) + k2*c_{xx1}(t) + k3*c_{xx2}(t-1) + k4*c_{xx1}(t-1) \quad (8)$$

When the eigenvalues are calculated on the basis of the averaged normal equation, the eigenvalues of the covariance matrix in the averaged normal equation are calculated.

A specific process of averaging the normal equations in the present detection cycle and the past detection cycle in the fifth embodiment will be described below.

This averaging process is mainly performed by the normal equation filter unit 312 of the azimuth detecting unit 30A and the target link unit 32 in FIG. 23.

FIG. 26 is a diagram illustrating a table stored in the memory 21.

To perform the process of averaging the normal equation in the normal equation filter unit 312, the target link unit 32 performs the following process of linking the present target group (t), a target (t) predicted from the fixed past target data, and the target (t−1) fixed in the past for each target in the table shown in FIG. 26.

In FIG. 26, t−1 is the result of the (previous) detection cycle previous by one cycle.

As the results of the detection cycles, for each fixed target, the distance r, the longitudinal position long_d (a position in the direction perpendicular to the arrangement direction of antennas), the lateral position late_d (a position in the direction parallel to the arrangement direction of antennas), the relative velocity velo (that is, v) to the target, the ascending peak frequency point f_up, the complex data x_up_1 and x_up_2 of the ascending peak frequencies, the descending peak frequency point f_dwn, and the complex data x_dwn_1 and x_dwn_2 of the descending peak frequencies are stored in the memory 21 in the table format shown in FIG. 26 (Accurately, the memory areas of the elements described above are greater than the other memory areas, but are shown in the same area for the purpose of easy understanding of the table). Here, the longitudinal position long_d and the lateral position late_d of a target are calculated from the angle of the target (the angle of the DOA of the received wave) and the distance r. When the angle is $\theta$ and the distance is r, the longitudinal position long_d is calculated by r·cos $\theta$ and the lateral position late_d is calculated by r·sin $\theta$.

The target link unit 32 predicts the distance r, the longitudinal position long_d, the lateral position late_d, the relative velocity, and the peak frequency point for each target in the present cycle from the distance r, the longitudinal position long_d, the lateral position late_d, the relative velocity velo, and the peak frequency point of a target fixed in the past in advance. For example, the prediction of the longitudinal position long_d, the lateral position late_d, and the peak frequency point is carried out within a movable range after the detection cycle on the basis of the distance r, the longitudinal position long_d, the lateral position late_d, and the peak frequency point in the previous detection cycle. The prediction of the relative velocity can be carried out by calculating the variation slope of the relative velocity in any past cycle.

For example, the target link unit 32 forms a predetermined movable range, a predetermined frequency point range, and a relative velocity range to correspond to the distance r, the longitudinal position long-d, the lateral position late_d, the peak frequency point, and the relative velocity predicted from the results fixed in the past, performs a linking process depending on whether the values calculated in the present cycle are within the ranges, and determines that they are different targets when the calculated values are not within the ranges.

When the target in the present detection cycle is linked to the past target in the table shown in FIG. 26, the target link unit 32 transfers the result of the present detection cycle to the result of (t−1) and calculates the prediction result of the subsequent cycle.

When a past target not linked to the results of the present target groups is present, the target link unit 32 clears all the information of the past target.

Accordingly, in a detection cycle in which a target is within the distance range to be influenced by multi path and no peak is not detected in the beat frequency, the filter effect using the results of the past target groups is reset. In the fifth embodiment shown in FIG. 26, the result of a target in one past detection cycle is stored in the memory 21.

When a past target not linked to the targets in the present detection cycle is detected, the target link unit 32 may hold the result of the fixed past target by a predetermined cycle number.

Since the stored results are sequentially updated, the prediction results based on the past results are sequentially updated. The target link unit 32 may use the past data other than the number of cycles in which no peak is detected due to the influence of multipath or the like for the filtering process, when no target is detected due to the influence of multipath or the like but the past target is associated with a next or later cycle.

Like the extrapolation method in tracking control, in a detection cycle in which a peak value is not detected, the presence of a target may be maintained using the prediction result as the result in the present detection cycle.

In the method of calling complex data shown in the drawing, the target link unit 32 can select an estimation range on the basis of distance point information corresponding to a previously detected target, thereby enhancing the processing efficiency. That is, the target link unit 32 can define the estimation range on the basis of the relative velocity and the angle about a target when referring to the stored complex data. In the next detection cycle, it is possible to select the estimation range based on the distance point information corresponding to the previously detected target. Accordingly, the target link unit 32 can improve the processing efficiency. Therefore, the target link unit 32 can refer to the complex data corresponding to the distance point within the defined range, thereby enhancing the call accuracy.

Figure 27:
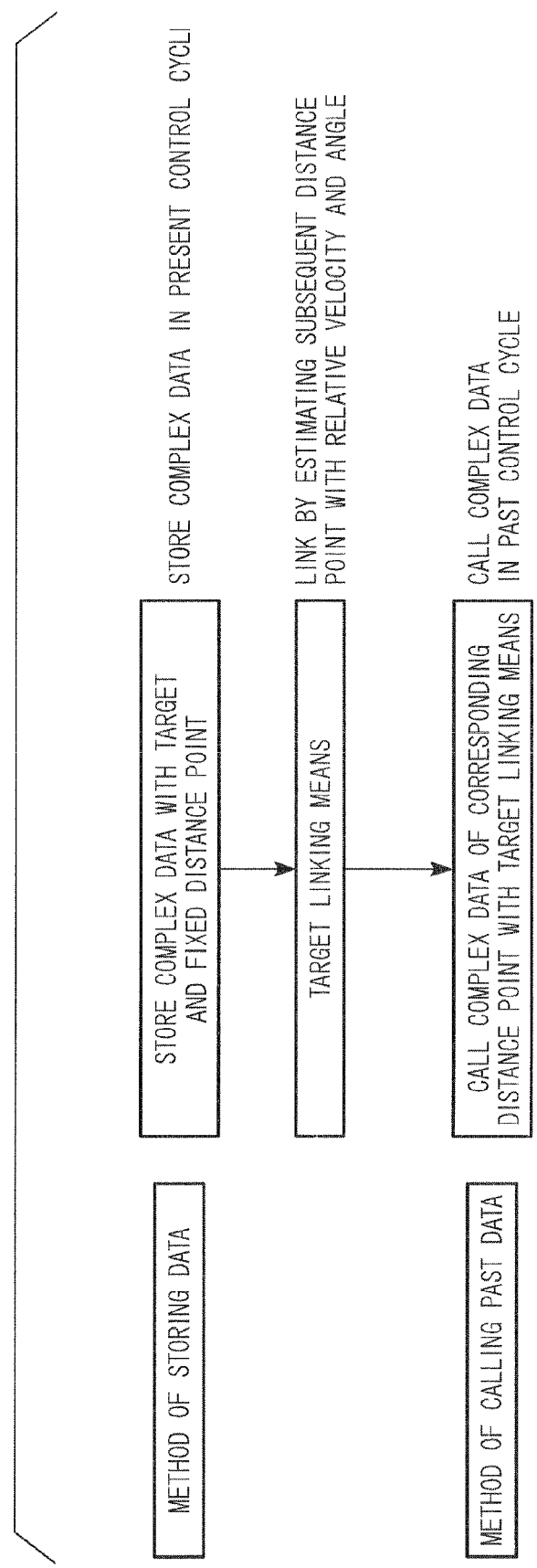
FIG. 27 is a diagram illustrating methods of storing and calling complex data.

FIG. 27 is a diagram illustrating the methods of storing and calling complex data.

In the method of storing an AR coefficient shown in the drawing, the target link unit 32 performs a correlation with the distance point finally fixed as a target and stores the complex data in the memory unit 21. The complex data stored in the memory 21 is information by the present control cycle.

The target line unit 32 refers to the distance point information as a key and reads out the complex data stored in the memory unit 21. The complex data read from the memory unit 21 is the information of the past control cycle.

Accordingly, the azimuth detecting unit 30 can perform the linking to the target using the distance point information as a key.

The description will be made with reference to the flowchart shown in FIG. 28.

Figure 28:
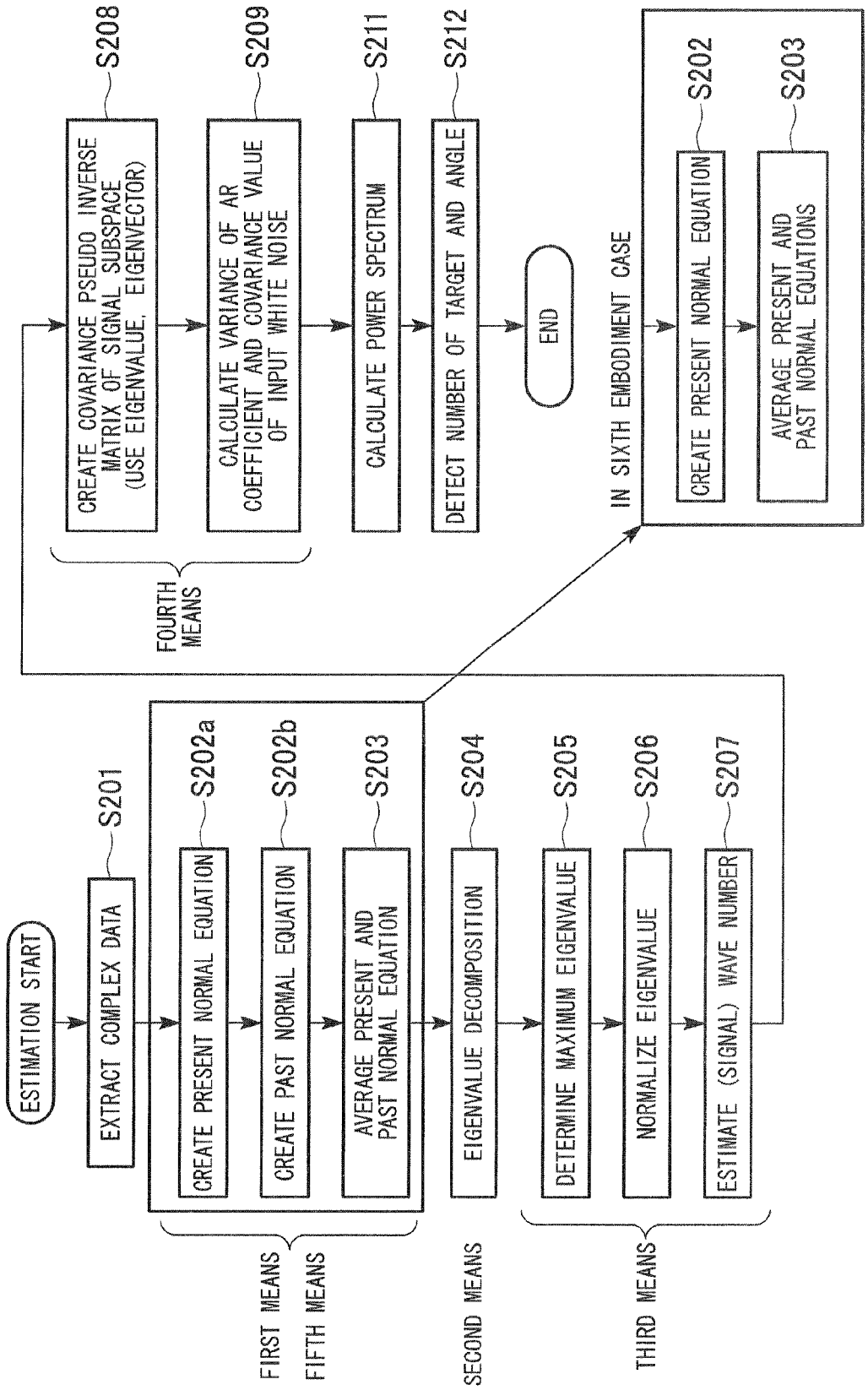
FIG. 28 is a flowchart illustrating a flow of processes in the fifth embodiment.

FIG. 28 is a flowchart illustrating the flow of processes. The flow of processes is repeatedly (iteratively) performed for each control cycle (see FIG. 24) and for individual targets selected by the peak detection through the use of the entire configuration of the radar.

In step S201, the complex data for each channel (CH) is acquired one or more times in the same control cycle.

The acquired complex data are complex data transformed based on frequencies in the present detection cycle and may be processed separately in the ascending and the descending by individually using one or both of the ascending data and the descending data of the frequency modulated triangular wave.

In step S202a, the normal equation creating unit 311 creates the normal equation of the order corresponding to the order of the AR model for each acquisition time on the basis of the complex data acquired in the present detection cycle. In the fifth embodiment, the order is set to three.

In step S202b, the normal equation creating unit 311 creates the normal equation of the order corresponding to the order of the AR model for each acquisition time on the basis of the complex data acquired in the previous detection cycle. In the fifth embodiment, the order is set to three.

In step S203, the normal equation filter unit 312 averages the elements of the covariance matrix and the right-hand vector (cross-correlation vector) of the normal equation created in steps S202a and S202b.

The processes of steps S202 (a, b) and S203 correspond to the first means in the fifth embodiment and the covariance matrix of the modified covariance method is itself used as the correlation matrix used to calculate the eigenvalues in the subsequent step. The covariance matrix of the AR model is a Herimitian matrix (complex symmetric matrix). Therefore, it is possible to perform eigenvalue decomposition using the order of the AR model as a reference.

The step S204 corresponds to the second means in the fifth embodiment.

In step S204, the eigenvalue decomposition unit 321 performs the eigenvalue decomposition of a covariance matrix.

FIG. 10 of the first embodiment is referred for details of step S204.

Steps S205 through S207 correspond to the third means of the fifth embodiment.

In step S205, the wave number estimating unit 331 calculates the maximum eigenvalue which is the largest value selected from the eigenvalues of the covariance matrix Cxx calculated in step S104.

In step S206, the wave number estimating unit 331 normalizes respective calculated eigenvalues based on the largest value of the calculated eigenvalues, that is, divides the values of the eigenvalues by the largest value.

In step S207, in order for optimizing the spectrum estimating process to be performed in the subsequent stage, the wave number estimating unit 331 determines the normalized eigenvalues on the basis of a predetermined threshold value and selects a wave number to be performed in the subsequence stage based on the determination result.

The series of processes of steps S205 to S207 is referred to as a wave number estimating process. The details of the wave number estimating process are referred to the first embodiment.

Subsequently, a description with reference to a fourth means will be given. Steps S208 to S209 correspond to the fourth means in the fifth embodiment.

In step S208, the covariance pseudo inverse matrix calculating unit 341 performs a covariance pseudo inverse matrix calculating process which creates a covariance pseudo inverse matrix of a signal subspace in the present detection cycle in response to the wave number estimated by the wave number estimating unit 331 in step S207.

In step S209, the AR coefficient calculating unit 342 calculates an AR coefficient and the variance of input white noise from the normal equation created in step S208.

In step S211, the power spectrum calculating unit 344 calculates a power spectrum on the basis of the AR coefficient and the variance of the input white noise calculated in step S209.

In step S212, the power spectrum calculating unit 344 detects the angle indicating the direction of targets and the number of targets.

Sixth Embodiment

Referring to FIG. 1, and FIGS. 20-30, another example of the spectrum estimating process using the AR spectrum estimating method known as a high-resolution algorithm will be described below in more detail.

In the fifth means of the sixth embodiment of the present invention, information is stored, which is different from the case of the fifth embodiment. Thus, the table format in FIG. 29 is used instead of the table format in FIG. 26.

FIG. 29 is a diagram illustrating a table stored in the memory unit 21.

The table format shown in FIG. 26 of the fifth embodiment includes complex data corresponding to a peak frequency such as the ascending peak frequency point f_up, the complex data x_up_1 and x_up_2 of the ascending peak frequencies, the descending peak frequency point f_dwn, and the complex data x_dwn_1 and x_dwn_2 of the descending peak frequencies.

On the other hand, the table of the sixth embodiment includes the variance matrices and the right-hand vectors corresponding to the peak frequency point, such as an ascending peak frequency covariance matrix $C_{xxav\_up}$, an ascending peak frequency right-hand vector $c_{xxav\_up}$, a descending peak frequency point f_dwn, a descending peak frequency covariance matrix $C_{xxav\_dwn}$, and a descending peak frequency right-hand vector $c_{xxav\_dwn}$.

The peak frequency covariant matrices and the right-hand vectors above are stored in the table format in FIG. 29 (Accurately, the memory areas of the ascending peak frequency covariance matrix $C_{xxav\_up}$, the ascending peak frequency right-hand vector $c_{xxav\_up}$, the descending peak frequency point f_dwn, the descending peak frequency covariance matrix $C_{xxav\_dwn}$, and the descending peak frequency right-hand vector $c_{xxav\_dwn}$ are greater than the other memory areas, but are shown in the same area for the purpose of easy understanding of the table). The stored covariance matrix $C_{xxav\_up}$ and the stored right-hand vector $C_{xxav\_up}$ are called in the previous detection cycle as an averaged covariance matrix $C_{xxave}$ (t−1) and a right-hand vector $c_{xxave}$ (t−1), in which the averaged covariance matrix $C_{xxave}$ (t−1) is obtained by averaging the previous data "past_1" and "past_2."

The configuration of the azimuth detecting unit 30A shown in FIG. 23 of the sixth embodiment is different from the case of the fifth embodiment as described in the following points.

The normal equation filter unit 312 functions as the fifth means.

The normal equation filter unit 312 averages the normal equation in the "present detection cycle" created by the normal equation creating unit 311. In addition, the normal equation filter unit 312 averages the normal equation in the "present detection cycle" and makes the target link unit 32 store the averaged covariance matrix and the right-hand vector in the memory unit 21.

Furthermore, the normal equation filter unit 312 reads out the information of the normal equation in the "past detection cycle" stored in the memory unit 21 by the target link unit 32 when averaging the normal equations in the "present detection cycle" and the "past detection cycle." The normal equation filter unit 312 performs the averaging process for the averaged covariance matrix and the right-hand vector, which are the information of the read normal equation in the "past detection cycle," and the averaged covariance matrix and the right-hand vector in the "present detection cycle," respectively.

By employing the above-mentioned configuration, a past normal equation creation process (step S202b) in the first means is omitted, and a process of reading information of the normal equation in the "past detection cycle" from the memory unit 21 in step S203 is added. In this manner, by modifying part of the processes, the averaging process of the normal equations in the "present detection cycle" and the "past detection cycle" can be performed.

Figure 30:
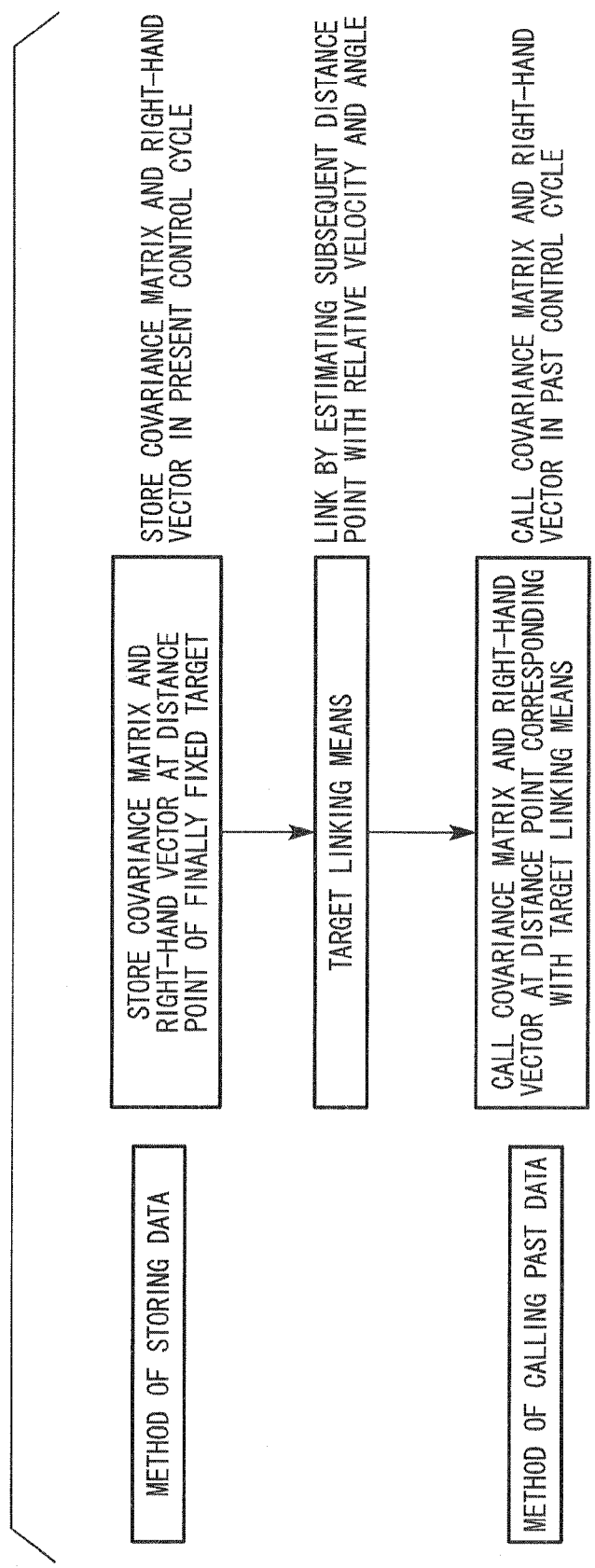
FIG. 30 is a diagram illustrating methods of storing and calling normal equations.

FIG. 30 is a diagram illustrating methods of storing and calling normal equations.

In the storing method of a covariance matrix and a right-hand vector shown in FIG. 30, the target link unit 32 performs a correlation with the distance point finally fixed as a target and stores the covariance matrix and the right-hand vector in the memory unit 21. The covariance matrix and the right-hand vector stored in the memory unit 21 are the information in the present control cycle.

The target link unit 32 refers the distance point information as a key, and reads out the covariance matrix and the right-hand vector stored in the memory unit 21. The covariance matrix and the right-hand vector read from the memory unit 21 are information in the past control cycle.

Thereby, the azimuth detecting unit 30 makes the distance point information as a key and can perform a correlation with a target.

Seventh Embodiment

Referring to FIG. 1, FIGS. 22-28, and FIGS. 31-33, another example of the spectrum estimating process using the AR spectrum estimating method known as a high-resolution algorithm will be described below in more detail.

The seventh embodiment includes the fifth means which is different compared to the case of the fifth embodiment. The seventh embodiment uses FIG. 31 instead of FIG. 25 of the fifth embodiment and uses FIG. 32 instead of the table in FIG. 25 of the fifth embodiment.

Figure 31:
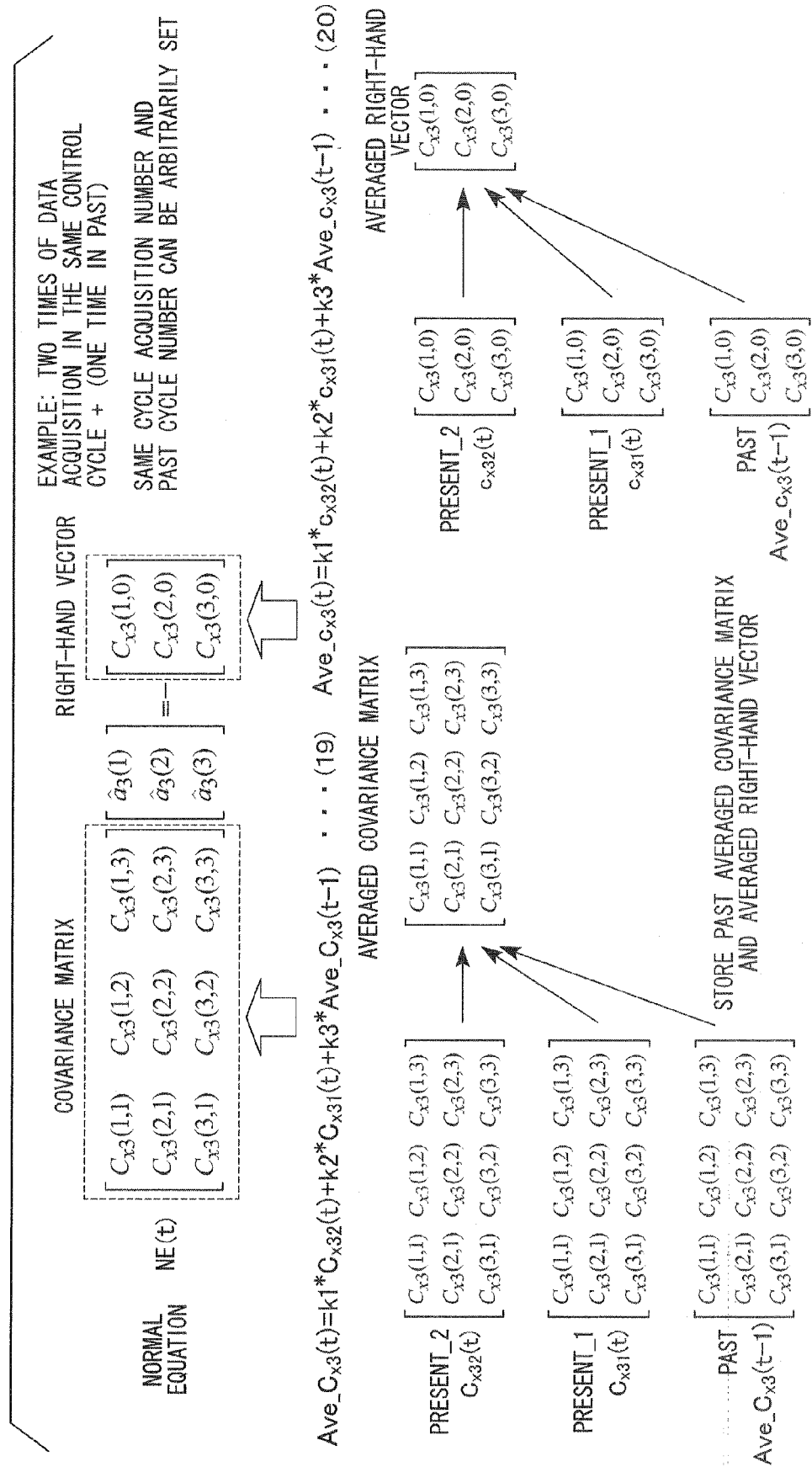
FIG. 31 is a drawing that illustrates the configuration of a normal equation and an averaging process based on acquired complex data in a seventh embodiment.

FIG. 31 is a drawing illustrating the configuration of the normal equation on the basis of the acquired complex data and the averaging process thereof.

The order normal equation shown in FIG. 31 is formed by a covariance matrix being a square matrix of an order of M, an AR coefficient being a matrix of M columns and 1 row, and a right-hand vector of M columns and 1 row.

A covariance matrix and a right-hand vector are created based on the acquired complex data. An AR coefficient is calculated by solving the square matrix.

As shown in FIG. 24, data are acquired plural times in plural control (detection) cycles. The covariance matrix $C_{xxk}(t)$ and the right-hand vector $c_{xxk}(t)$ are created in the acquisition order of the acquired complex data.

In FIG. 24, the number of times that date is acquired in one control (detection) cycle is set to two, and the order is set to three. To correspond to the times of data acquisition in the present control (detection) cycle, the covariance matrices $C_{xx1}(t)$ and $C_{xx2}(t)$ and the right-hand vectors $c_{xx1}(t)$ and $c_{xx2}(t)$ are expressed in the order of "present_1" and "present_2." To correspond to the times of data acquisition in the past control (detection) cycle, the covariance matrices $C_{xx1}(t-1)$ and $C_{xx2}(t-1)$ and the right-hand vectors $c_{xx1}(t-1)$ and $c_{xx2}(t-1)$ are expressed in the order of "past_1" and "past_2."

In the seventh embodiment, the process of averaging the normal equation to be described later is performed based on the complex data acquired plural times in the same control (detection) cycle, in each of the present control (detection) cycle and the past control (detection) cycle. Specifically, by averaging the covariance matrices $C_{xxk}(t)$ of "present_1" and "present_2," and the previous averaged covariance matrix Ave_$C_{xx}(t-1)$ acquired in the previous averaging process of the normal equation, the averaging process is performed.

By averaging the right-hand vectors $c_{xxk}(t)$ of "present_1" and "present_2," and the previous averaged covariance matrix Ave_$C_{xx}(t-1)$ acquired in the previous averaging process of the normal equation, the averaging process is performed.

A computational expression for calculating an averaged covariance matrix Ave_$C_{xx}(t)$ through the process of averaging the normal equation is expressed by Expression 19.

$$\text{Ave\_}C_{x3}(t) = k1 * C_{x32}(t) + k2 * C_{x31}(t) + k3 * \text{Ave\_}C_{x3}(t-1) \quad (19)$$

In Expression 19, k1 to k3 represent weighting coefficients.

A computational expression for calculating an averaged right-hand vector Ave_$c_{xx}(t)$ through the process of averaging the normal equation is expressed by Expression 20.

$$\text{Ave\_}c_{x3}(t) = k1 * c_{x32}(t) + k2 * c_{x31}(t) + k3 * \text{Ave\_}c_{x3}(t-1) \quad (20)$$

When the eigenvalues are calculated based on the averaged normal equation, the eigenvalues of the covariance matrix in the averaged normal equation are calculated.

FIG. 32 is a diagram illustrating a table stored in the memory unit 21.

The table of the fifth embodiment described above includes elements of the ascending peak frequency point f_up, the complex data x_up_1 and x_up_2 of the ascending peak frequencies, the descending peak frequency point f_dwn, and the complex data x_dwn_1 and x_dwn_2 of the descending peak frequencies, and the complex data corresponding to the peak frequency point are stored in the memory unit 21.

On the other hand, the table described in the sixth embodiment includes the averaged covariance matrix Ave_$C_{xx}$_up of ascending peak frequency, the averaged right-hand vector Ave_$c_{xx}$_up of ascending peak frequency, the averaged covariance matrix Ave_$C_{xx}$_down of descending peak frequency, and the averaged right-hand vector Ave_$c_{xx}$_dwn of descending peak frequency, and the complex data corresponding to the peak frequency point are stored in the memory unit 21.

The covariance matrices of the peak frequencies and the right-hand vectors are stored in the memory unit 21 based on the table format in FIG. 32 (Accurately, the memory areas of the elements described above are greater than the other memory areas, but are shown in the same area for the purpose of easy understanding of the table).

Figure 33:
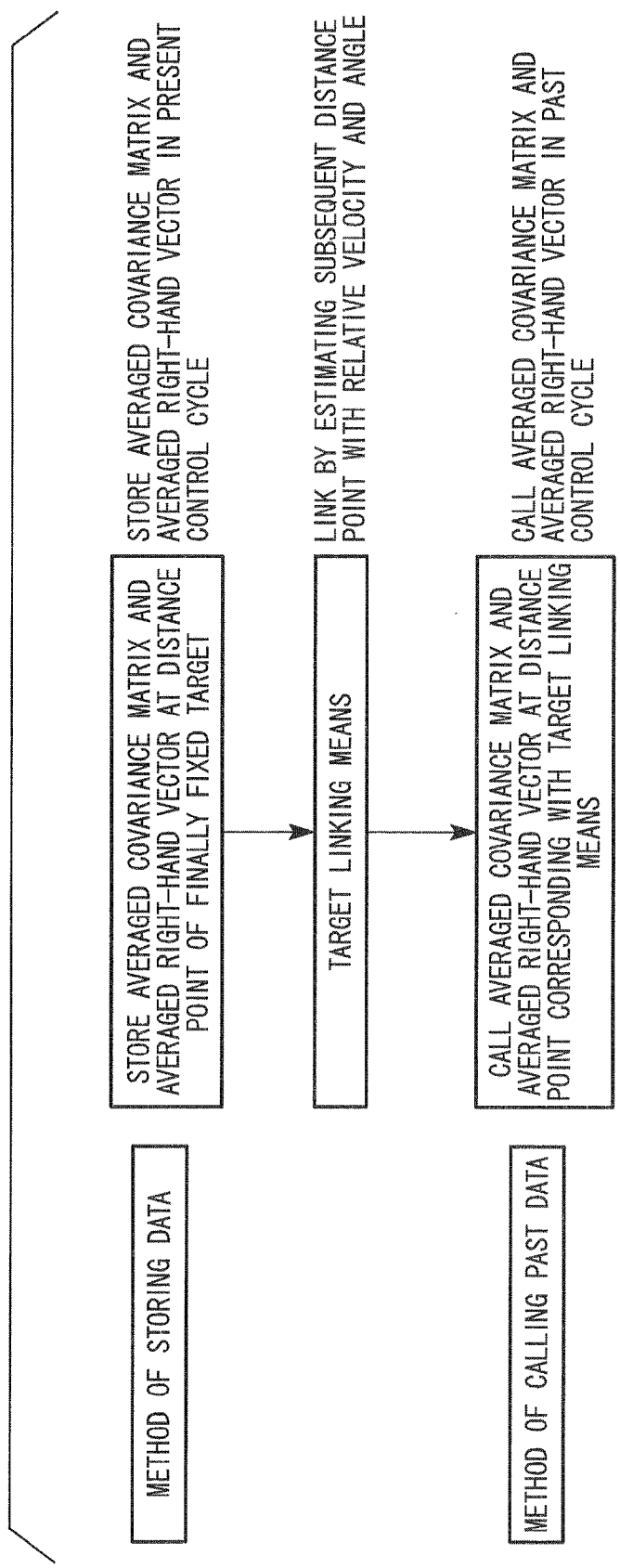
FIG. 33 is a diagram illustrating methods of storing and calling complex data.

FIG. 33 is a diagram illustrating the storing/calling method of complex data.

In the method of storing an AR coefficient shown in FIG. 33, the target link unit 32 performs a correlation with the distance point finally fixed as a target and stores the averaged covariance matrix and the averaged right-hand vector in the memory 21. The averaged covariance matrix and the averaged right-hand vector stored in the memory unit 21 are information in the present control cycle.

The target link unit 32 refers to the distance point information as a key, and reads out the averaged covariance matrix and the averaged right-hand vector stored in the memory unit 21. The covariance matrix and the right-hand vector read from the memory unit 21 are information in the past control cycle.

Thereby, the azimuth detecting unit 30 makes the distance point information as a key and can perform a correlation with a target.

Eighth Embodiment

Referring to FIG. 1, FIGS. 22-28, and FIGS. 34-37, another example of the spectrum estimating process using the AR spectrum estimating method known as a high-resolution algorithm will be described below in more detail.

The eighth embodiment includes the sixth means being added, which is different compared to the case of the fifth embodiment.

Figure 34:
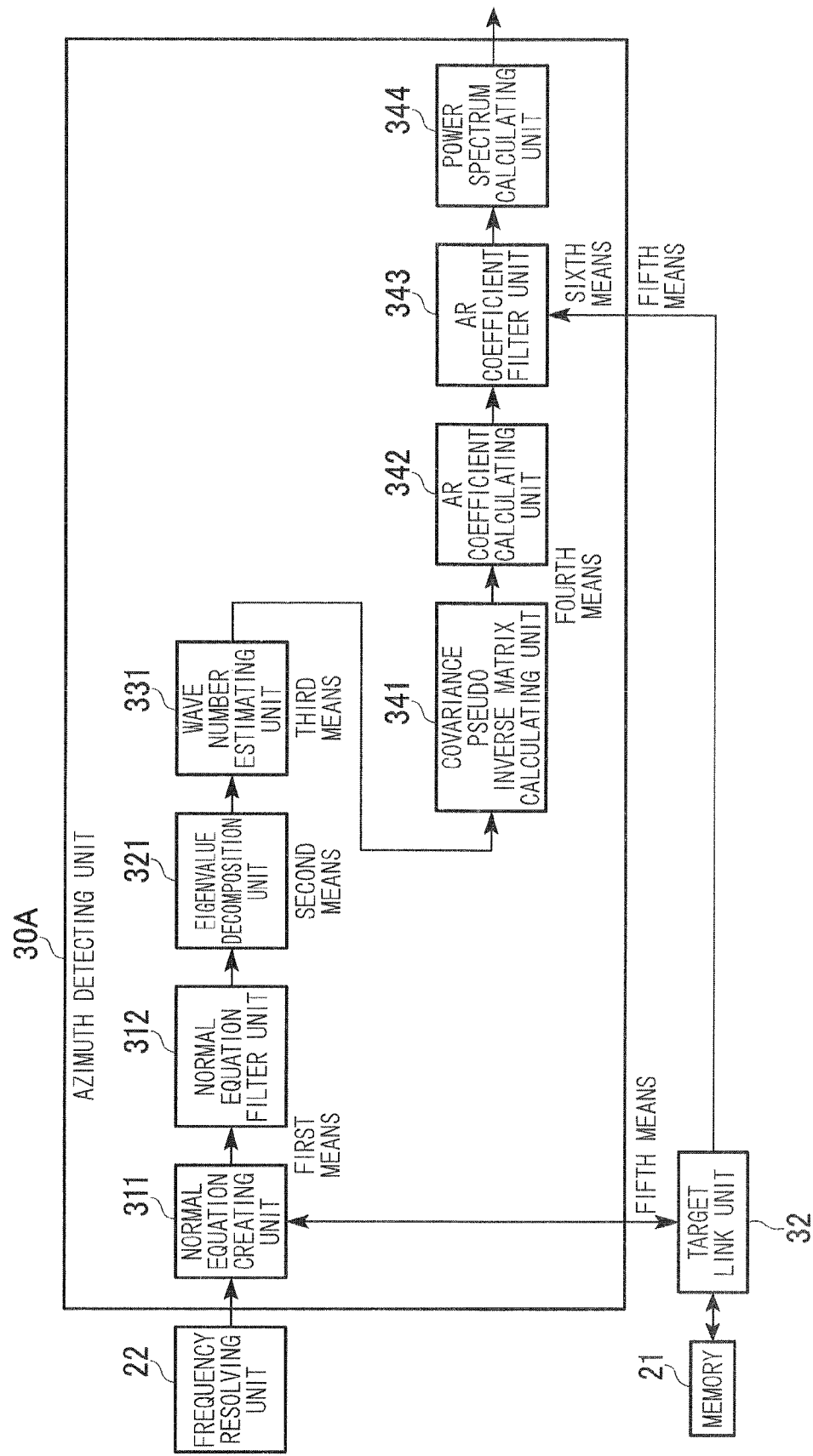
FIG. 34 is a block diagram that illustrates the configuration of an azimuth detecting unit according to an eighth embodiment.

The eighth embodiment includes the configuration of FIG. 34 instead of FIG. 23 of the fifth embodiment. In this case, for the configurations which are identical to FIG. 23, the identical symbols are used.

FIG. 34 is a block diagram illustrating the configuration of the azimuth detecting unit 30A of the eighth embodiment.

The azimuth detecting unit 30A shown in FIG. 34 represents one of variations of the azimuth detecting unit 30 shown in FIG. 22.

The azimuth detecting unit 30A includes the normal equation creating unit 311, the normal equation filter unit 312, the eigenvalue decomposition unit 321, the wave number estimating unit 331, the covariance pseudo inverse matrix calculating unit 341, the AR coefficient calculating unit 342, the AR coefficient filter unit 342, and the power spectrum calculating unit 344.

In the eighth embodiment, the normal equation creating unit 311 and the normal equation filter unit 312 function as the first means, the eigenvalue decomposition unit 321 functions as the second means, the wave number estimating unit 331 functions as the third means, the covariance pseudo inverse matrix calculating unit 341, the AR coefficient calculating unit 342, and the AR coefficient filter unit 343 function as the fourth means, and also, the target link unit 32 and the normal equation creating unit 311 function as the fifth means, and the AR coefficient filter unit 343 functions as the sixth means.

The normal equation filter unit 343 performs an averaging process on the AR coefficient calculated by the AR coefficient calculating unit 342. The AR coefficient flier unit 343 stores the AR coefficient calculated in the present detection cycle in the memory unit 21 by using the target link unit 32.

In addition, when the AR coefficient filter unit 343 performs the averaging process on the AR coefficients in the "present detection cycle" and the "past detection cycle," the AR coefficient filter unit 343 reads out the AR coefficient in the "past detection cycle" stored in the memory unit 21 through the target link unit 32.

The AR coefficient filter unit 343 performs the averaging process on the read AR coefficient in the "past detection cycle" and the AR coefficient calculated in the "present detection cycle."

Figure 35:
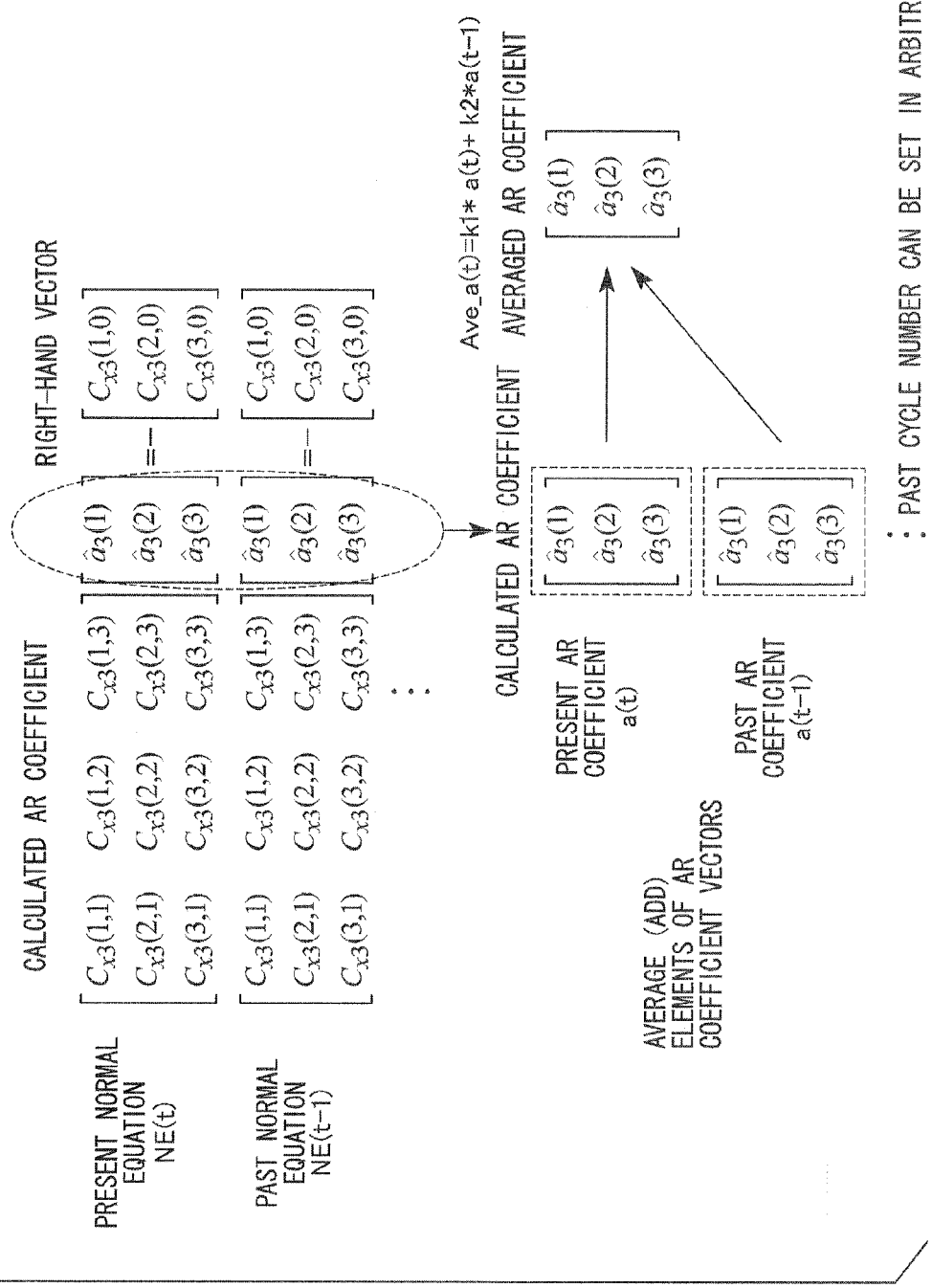
FIG. 35 is a drawing illustrating the averaging process of AR coefficients.

FIG. 35 is a diagram illustrating the averaging process on AR coefficients.

The normal equation shown in FIG. 35 includes the configuration similar to those of the embodiments described above, and expresses the normal equation created in the present control cycle as the "present normal equation NE(t)" and the normal equation created in the previous control cycle as the "past normal equation NE(t−1)."

The AR coefficients calculated from the "present normal equation NE(t) and the "previous normal equation NE(t−1) are expressed as the "present AR coefficient a(t)" and the "previous AR coefficient a(t−1)."

A computational expression for calculating the averaged AR coefficient, which is the averaged AR coefficient Ave_a(t) calculated through the process of averaging the "present AR coefficient a(t)" and the "previous AR coefficient a(t−1)," is expressed by Expression 21.

$$\text{Ave\_}a(t)=k1*a(t)+k2*a(t-1) \tag{21}$$

In Expression 21, k1 to k2 represent weighted coefficients.

In the eighth embodiment, since the order of the normal equation is fixed, the number of elements of the AR coefficient vector becomes a constant value. Therefore it is possible to perform the averaging process of the AR coefficient vector.

FIG. 36 is a diagram illustrating a table formed in the memory unit.

In the table shown in FIG. 36, the following elements shown are added to the table in FIG. 26.

The added elements are the AR coefficient AR_C_up of ascending peak frequency, the AR coefficient AR_C_dwn of descending peak frequency, and the AR coefficient corresponding to the peak frequency point is stored.

The AR coefficients of the peak frequencies are stored in the memory unit 21 as the table format in FIG. 36 (Accurately, the memory areas of the elements described above are greater than the other memory areas, but are shown in the same area for the purpose of easy understanding of the table). The memory unit 21 stores the AR coefficient AR_C_up of the ascending peak frequency and the AR coefficient AR_C_dwn of the descending peak frequency.

The process flow is described with reference to FIG. 37.

Figure 37:
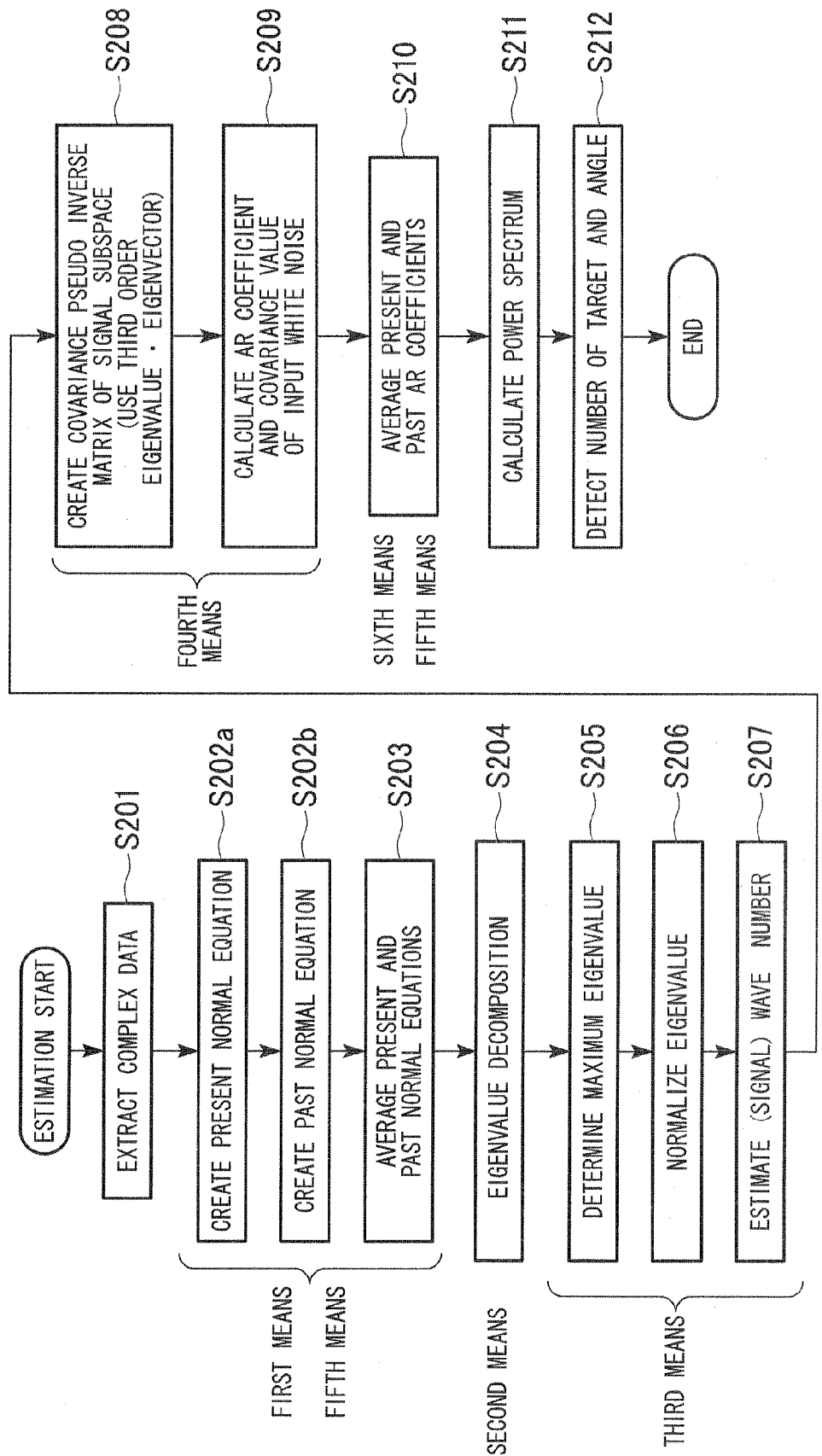
FIG. 37 is a flowchart that illustrates a flow of processes in the eighth embodiment.

FIG. 37 is a flowchart illustrating the processes of procedures (flow). In the description, the processes identical to those shown in FIG. 28 are assigned the same symbols.

The AR coefficient filter unit 343 performs the process of averaging the AR coefficient calculated by the AR coefficient calculating unit 342 on the basis of the AR coefficient calculated in step S209 (step S210). The computational process of the power spectrum in step S211 and the processes of detecting the number of targets and the azimuth of the targets in step S212 are performed on the basis of the averaged AR coefficient calculated in step S210.

In this case, it is possible to store the averaged AR coefficient to perform the averaging process in the next cycle as the past AR coefficient.

Ninth Embodiment

An electronic scanning radar apparatus according to a ninth embodiment in accordance with the present invention will be described below with reference to the drawings.

Figure 38:
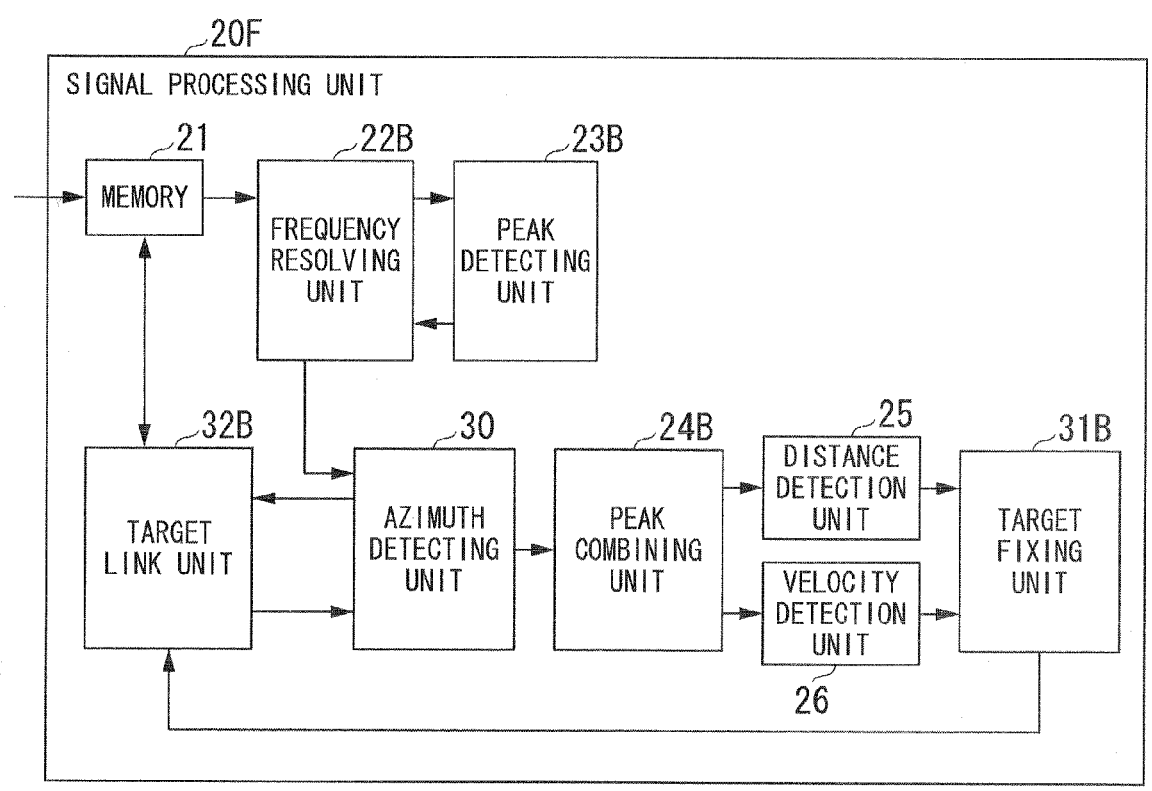
FIG. 38 is a block diagram that illustrates the configuration of an electronic scanning radar apparatus according to an ninth embodiment.

FIG. 38 is a block diagram illustrating the configuration of the electronic scanning radar apparatus according to the ninth embodiment.

In the ninth embodiment, the azimuth is estimated using a high-resolution algorithm, similarly to the fifth to eighth embodiments. The same elements as the fifth to eighth embodiments shown in FIG. 22 will be referenced by the same reference symbols and the following description will be centered on the differences from the fifth embodiment.

The frequency resolving unit 22B of the signal processing unit 20F transforms the beat signals of the ascending region and the descending region for each antenna into complex data and outputs the frequency points indicating the beat frequencies thereof and the complex data to the peak detecting unit 23B.

The peak detecting unit 23B detects the peak values of the ascending region and the descending region and the frequency points at which the peak values are present and outputs the frequency points to the frequency resolving unit 22B.

The frequency resolving unit 22B outputs the complex data corresponding to the ascending region and the descending region to the azimuth detecting unit 30B.

These complex data are target groups (beat frequencies having peaks in the ascending region and the descending region) of the ascending region and the descending region. Here, the function of the peak detecting unit 23B can be replaced with the maximum eigenvalue determination (step S106a) in the model order estimating process of the azimuth detecting unit, and thus the peak detecting unit may be deleted.

Since the target link unit 32B needs to link both target groups of the ascending and the descending to the previously fixed target, the table described above is stored in the memory 21.

The target link unit 32B links the present detection cycle to the past detection cycle through the same process as the target link unit 32 shown in FIG. 22.

The azimuth detecting unit 30 performs the processes of estimating the order of the normal equation and averaging the normal equation, which are described in the fifth to eighth embodiment, in the ascending region and the descending region.

The azimuth detecting unit 30 detects the angle θ for the AR coefficient of the ascending region and the AR coefficient of the descending region and outputs the detected angles to the peak combining unit 24B as the tables shown in FIGS. 39A and 39B.

The peak combining unit 24B makes combinations of the same angles on the basis of the information of the tables shown in FIGS. 39A and 39B and outputs the combinations of the beat frequencies of the ascending region and the descending region to the distance detecting unit 25 and the velocity detecting unit 26.

The distance detecting unit 25 calculates the distance on the basis of the beat frequencies of the ascending region and the descending region in the combinations, similarly to the first embodiment.

The velocity detecting unit 26 calculates the relative velocity on the basis of the beat frequencies of the ascending region and the descending region in the combinations, similarly to the first embodiment.

The target fixing unit 31B fixes the complex data of the ascending region and the descending region and the frequency point, the distance, the relative velocity, and the azimuth in the ascending region and the descending region as the present status.

The target link unit 32B stores the frequency points of the ascending region and the descending region and the complex data, the distance, the longitudinal position, the lateral position, and the relative velocity for each of the ascending region and the descending region, which are input from the target fixing unit 31B, in the table shown in FIG. 36 for each target through the same processes as from the fifth to eighth embodiment.

Tenth Embodiment

An electronic scanning radar apparatus according to a tenth embodiment of the invention will be described below with reference to the drawings.

Figure 40:
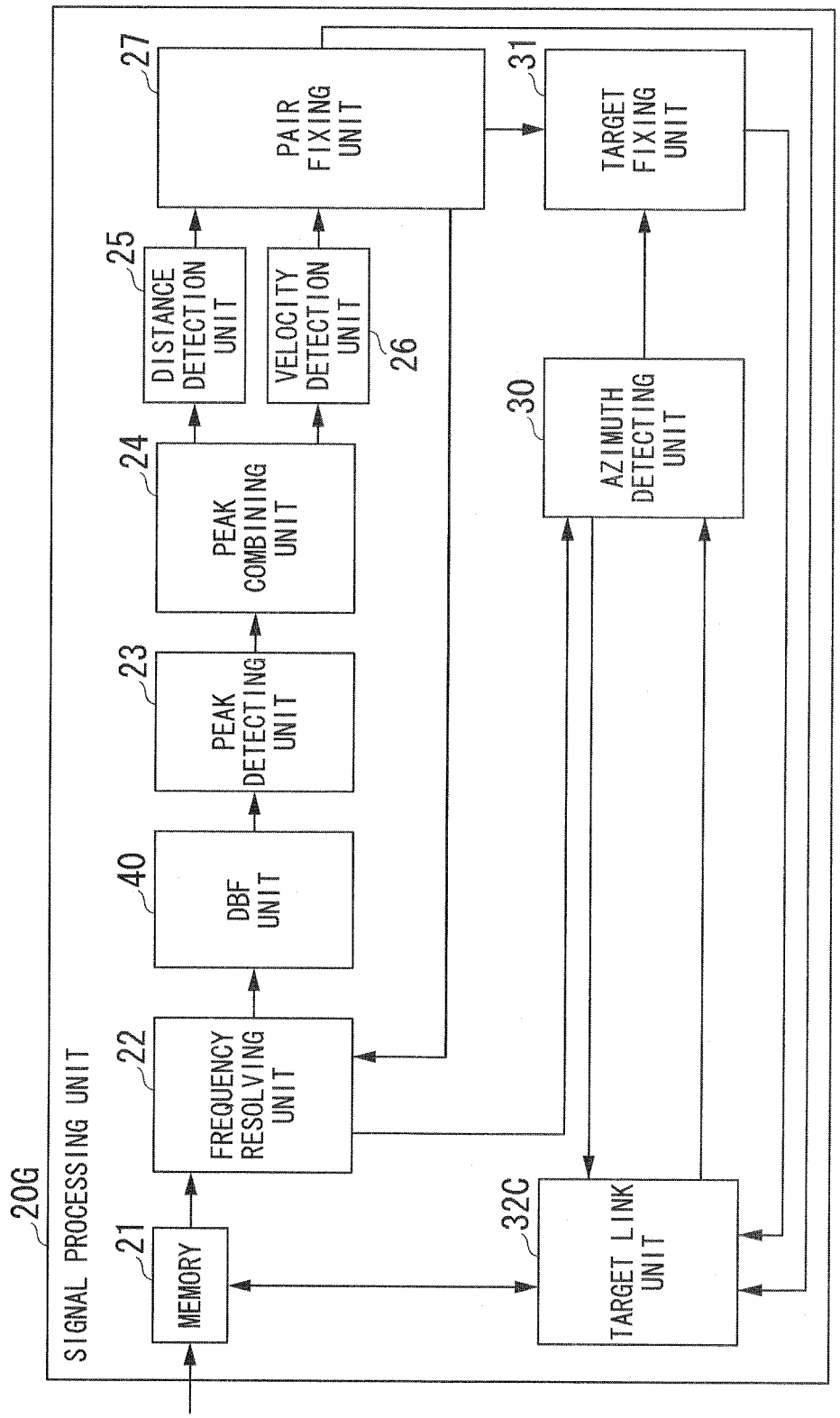
FIG. 40 is a block diagram that illustrates an electronic scanning radar apparatus according to a tenth embodiment.

FIG. 40 is a block diagram illustrating the configuration of the electronic scanning radar apparatus according to the tenth embodiment.

In the tenth embodiment, unlike the fifth embodiment, an azimuth estimating process is performed first using a DBF (Digital Beam Forming) with a resolution lower than that of the high-resolution algorithm such as the AR spectrum estimating process and then the azimuth estimating process using an averaged normal equation is performed using the high-resolution algorithm including the AR spectrum estimating process using the AR coefficient. The same elements as the first embodiment shown in FIG. 1 will be referenced by the same reference signs and the following description will be centered on the differences from the first embodiment.

As shown in the drawing, this embodiment is different from the first embodiment, in that a DBF processing unit 40 is disposed between the frequency resolving unit 22 and the peak detecting unit 23 in the first embodiment shown in FIG. 1 and the azimuth in which the received wave arrives is estimated first using the DBF as described above.

In the tenth embodiment, similarly to the third embodiment, the frequency resolving unit 22 resolves (time-axis Fourier transformation) the input beat signals with respect to frequencies and outputs the frequency points indicating the beat frequencies and the complex data to the DBF processing unit 40.

The DBF processing unit 40 performs the Fourier-transformation to the complex data corresponding to each antenna in the arrangement direction of the antennas, that is, the spatial Fourier-transformation is performed.

The DBF processing unit 40 depends on the angle, that is, calculates spatial complex data for the angular channels corresponding to the angle resolution and outputs the calculated spatial complex data to the peak detecting unit 23 for each beat frequency.

Accordingly, the spectrum represented by the spatial complex data (in the unit of beat frequency) for each angular channel output from the DBF processing unit 40 depends on the DOA estimation of the received wave based on a beam scanning resolution.

In the tenth embodiment, since the complex data is transformed by the Fourier-transformation in the arrangement direction of the antennas, the same advantage as the configuration in which the complex data of the angular channels are added can be achieved and the complex data for each angular channel is improved in the S/N ratio, thereby improving the accuracy in detecting the peak values, similarly to the first embodiment.

The complex data and the spatial complex data are both calculated in the ascending region and the descending region of the triangular wave, similarly to the third embodiment.

The peak detecting unit 23 detects a peak for each angular channel on the basis of the DBF processing result after the processing of the DBF processing unit 40, and outputs the detected peak values of the channels to the peak combining unit 24 for each angular channel. That is, in the case of the spatial Fourier transformation with a 16 resolution, the number of angular channels is 15.

Similarly to the third embodiment, the peak combining unit 24 combines the peak values with the beat frequencies having the peak values in the ascending region and the descending region and outputs the combinations to the distance detecting unit 25 and the velocity detecting unit 26 for each angular channel.

The pair fixing unit 27 creates the table shown in FIG. 5 for each angular channel using the distance r and the relative velocity v sequentially input from the distance detecting unit 25 and the velocity detecting unit 26 and determines the combination of peaks of the ascending region and the descending region corresponding to each target for each angular channel, similarly to the first embodiment. Here, since the resolution of the DBF represents that a target is present over plural angular channels, the peaks of the ascending region and the descending region for each angular channel can be appropriately combined in consideration of the agreement with neighboring angular channels (matrices). The pair of the peaks of the ascending region and the descending region is fixed and the target group number indicating the fixed distance r and the fixed relative velocity v is output to the target fixing unit 31 to create the table shown in FIG. 41.

FIG. 41 is a diagram illustrating a table storing the fixed pairs of the peaks of the ascending region and the descending region.

Since the pair fixing unit 27 can acquire information of the angular channels for each target in addition to the distance r and the relative velocity v and can calculate the longitudinal position and the lateral position, and create the table which is shown in FIG. 41, having the results corresponding to the target groups in the present detection cycle is created, in which the longitudinal positions and the lateral positions are included in the table shown in FIG. 6.

The target link unit 32C performs the process of linking the target in the present detection cycle to the target in the past detection cycle shown in FIG. 24 using the information of the table shown in FIG. 41. In addition, since the longitudinal position and the lateral position in addition to the distance, the relative velocity, and the peak frequency point are used as the linking parameters, it is possible to perform the linking process with higher accuracy.

The azimuth detecting unit 30 performs the processes of estimating the order of the normal equation and averaging the normal equation, which are described in the fifth through seventh embodiment.

By estimating the azimuth through the use of the AND logic based on the azimuth information from the azimuth detecting unit 30 and the azimuth information from the DBF processing unit, it is possible to improve the reliability in detecting a direction, to share the azimuth information, or to use the angle information of the DBF because the poor angle resolution can be used in a short distance.

Eleventh Embodiment

An electronic scanning radar apparatus according to an eleventh embodiment of the invention will be described below with reference to the drawings.

Figure 42:
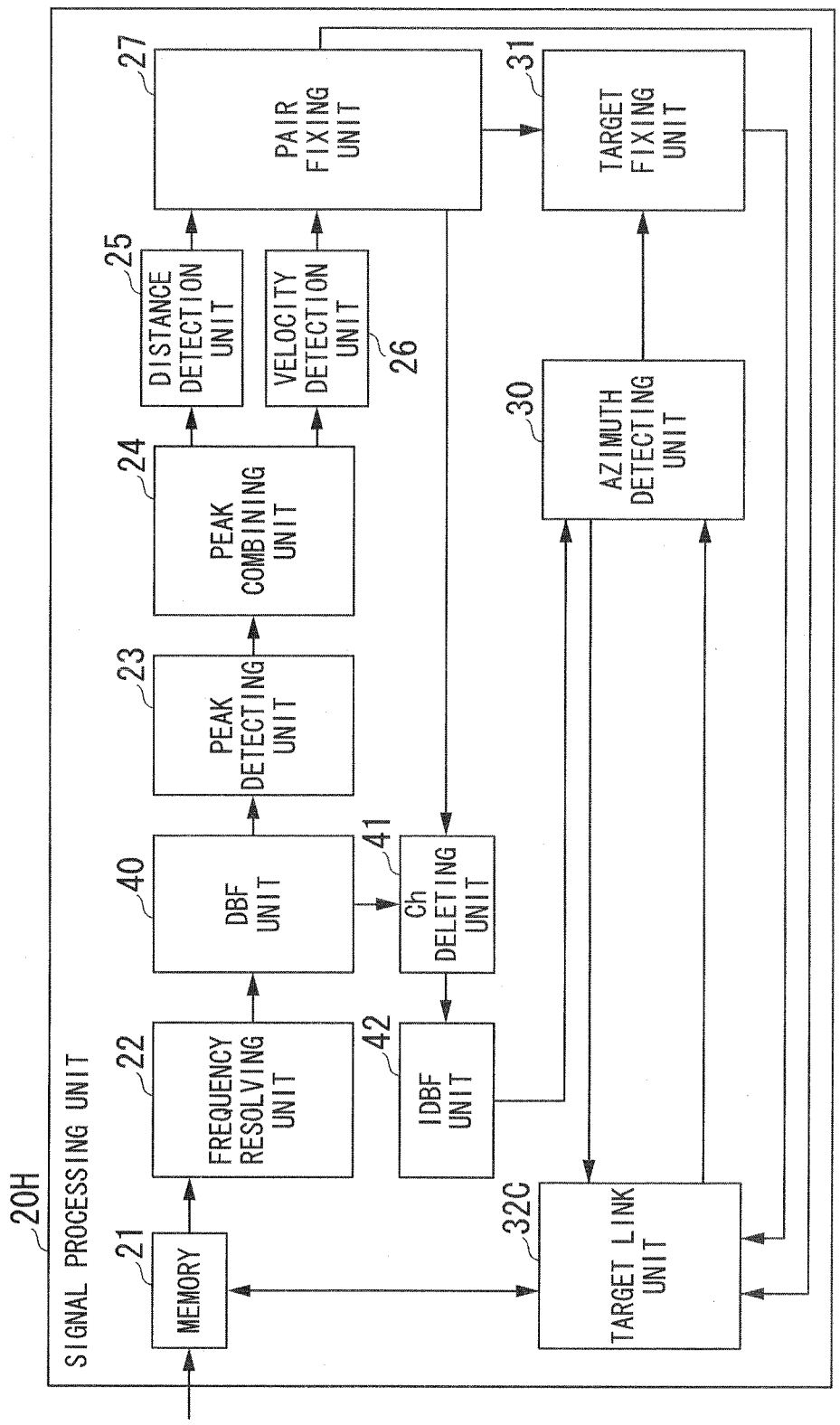
FIG. 42 is a block diagram that illustrates the configuration of an electronic scanning radar apparatus according to an eleventh embodiment.

FIG. 42 is a block diagram illustrating the configuration of the electronic scanning radar apparatus according to the eleventh embodiment.

In the eleventh embodiment, unlike the fifth embodiment, an azimuth estimating process is performed first using a DBF (Digital Beam Forming) with a resolution lower than that of the high-resolution algorithm such as the AR spectrum estimating process to narrow the angle range of the target and an IDBF (Inverse DBF, that is, the inverse spatial Fourier transformation) is then performed to return the data to complex data in the frequency axis, whereby the accuracy of the azimuth estimation to be performed later using the high-resolution algorithm is improved. The same elements as the tenth embodiment shown in FIG. 40 will be referenced by the same reference symbols and the following description will be centered on the differences from the fifth embodiment.

In the eleventh embodiment, a channel (Ch) deleting unit 41 and an IDBF processing unit 41 are added to the configuration of the tenth embodiment.

The DBF processing unit 40 performs a spatial Fourier transformation, similarly to the tenth embodiment, and outputs spatial complex data to the peak detecting unit 23 and the Ch deleting unit 41.

Figure 43A:
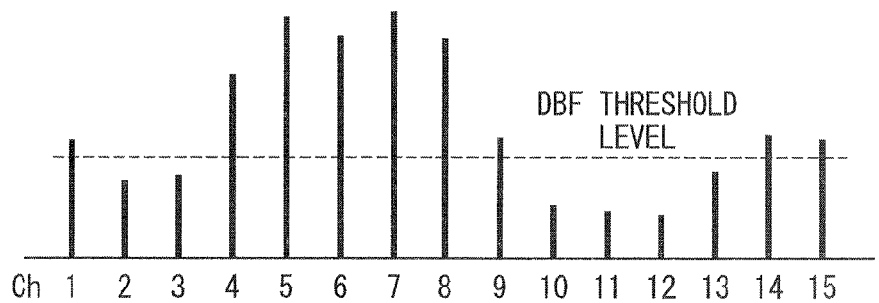
FIG. 43A is a conceptual diagram illustrating a spectrum intensity process in angular channels.

In this case, the DBF processing unit 40 performs the spatial Fourier transform in the arrangement direction of the receiving antennas, for example, with a 16-point resolution in the tenth embodiment, as shown in FIG. 43A, generates a spectrum for each of 15 angular channels as a result, and outputs the generated spectra to the Ch deleting unit 41.

The Ch deleting unit 41 performs a process of detecting whether levels of the spectra of the spatial complex data corresponding to the peak frequency points (for example, the descending region) of the DBF target fixed by the pair fixing unit 27 are continuous within a predetermined angle range and is greater than a predetermined DBF threshold value level, and replaces the spectrum of the angular channel not greater than the DBF threshold value with "0" and outputs the narrowed spatial complex data.

Figure 43B:
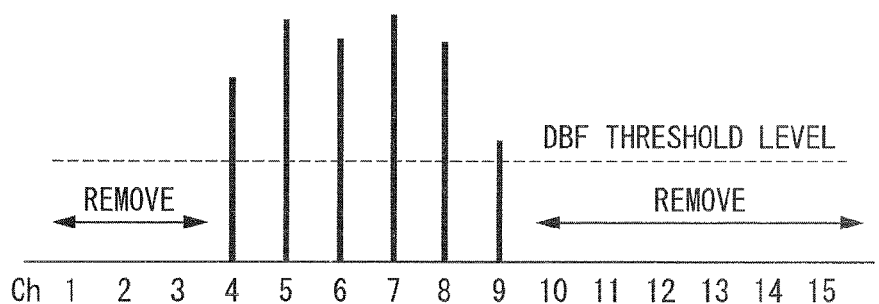
FIG. 43B is a conceptual diagram illustrating a spectrum intensity process in the angular channels.

In the above described process, for example, when four neighboring angular channels have a level continuously greater than the DBF threshold value as shown in FIG. 43B, the Ch deleting unit 41 determines that one or more targets are present in the range, leaves the spectra of the angular channels, and replaces the intensities of the spectra of the other angular channels with "0."

The IDBF processing unit 42 narrows the spectra, that is, performs the inverse spatial Fourier transformation to the spatial complex data in which only the data of the angular channels continuously greater than the DBF threshold value out of a predetermined number of angular channels are left and the intensities of the other angular channels are replaced with "0" on the replaced spatial complex data to return the spatial complex data to the complex data in the frequency axis and outputs the resultant complex data to the azimuth detecting unit 30.

Figure 43C:
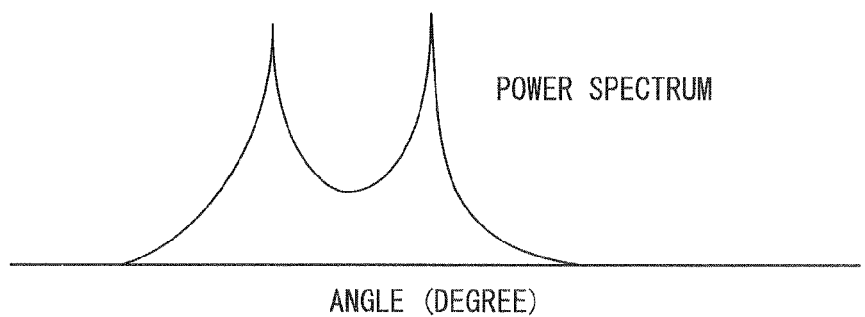
FIG. 43C is a conceptual diagram illustrating a spectrum intensity process in the angular channels.

As a normal equation (or a correlation matrix) is calculated from the input complex data, the azimuth detecting unit 30 can calculate a normal equation (or a correlation matrix) from which the noise component is reduced by removing components of road-side objects. In FIG. 43C, the normal equation of a target group (referred to as a target group since two or more targets may be present in the actual situations) with the DBF resolution shown in FIG. 43B is created using the above described method and the targets are further separated using a high-resolution algorithm.

Figure 44A:
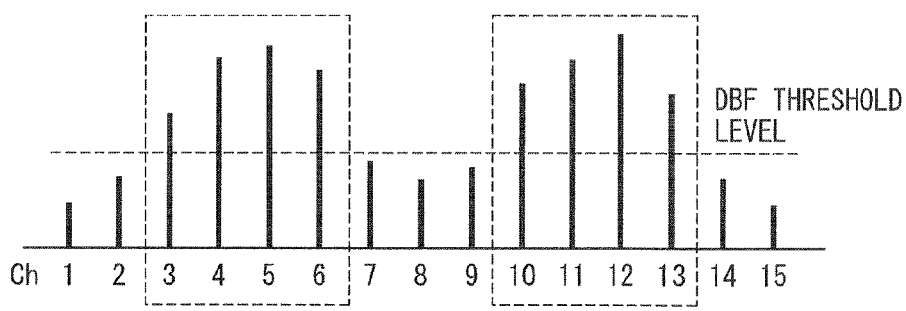
FIG. 44A is a conceptual diagram illustrating a spectrum intensity process in angular channels.

As shown in FIG. 44A, when a received wave including reflected components from plural target groups is received, plural angular channels greater than the DBF threshold level out of the continuous angular channels are present in the spatial complex data from the DBF processing unit 40.

Figure 44B:
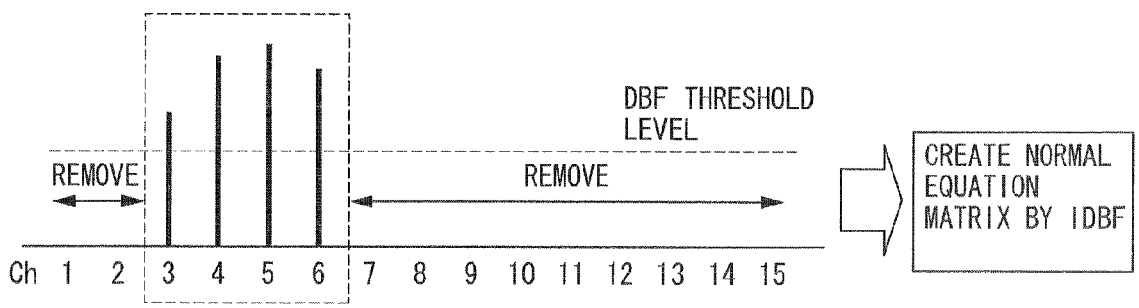
FIG. 44B is a conceptual diagram illustrating a spectrum intensity process in the angular channels.
Figure 44C:
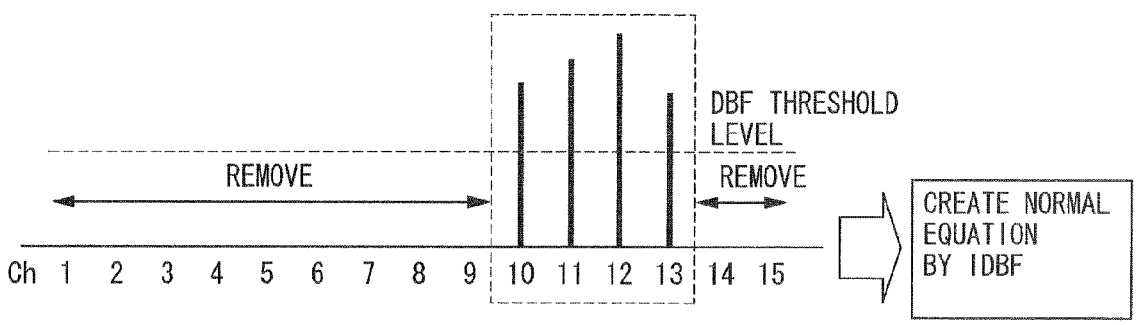
FIG. 44C is a conceptual diagram illustrating a spectrum intensity process in the angular channels.

The Ch deleting unit 41 extracts the angular channel regions, in which the levels of the spectra of the adjacent angular channels are continuously greater than the DBF threshold level in the predetermined angular channel range, from the input spatial complex data, replaces the intensities of the spectra other than the extracted angular channel regions with "0," and divides the input spatial complex data into other spatial complex data identified in the angular channel regions, as shown in FIGS. 44B and 44C.

Here, the pair fixing unit 27 calculates the distance, the relative velocity, the longitudinal position, and the lateral position, similarly to the fifth embodiment and outputs the calculated information to the Ch deleting unit 41 and the target link unit 32.

The Ch deleting unit 41 selects the spatial complex data corresponding to the frequency point of the DBF target, performs the above-described Ch deletion thereon, and outputs the resultant spatial complex data to the IDBF processing unit 42.

The IDBF processing unit 42 performs the inverse spatial Fourier transformation to the input spatial complex data and outputs the acquired complex data in the frequency axis to the azimuth detecting unit 30.

The target link unit 32C extracts the complex data in the past detection cycle corresponding to the distance, the relative velocity, the longitudinal position, and the lateral position from the table stored in the memory 21 and shown in FIG. 26 and outputs the extracted complex data to the azimuth detecting unit 30.

By the above-described processes, in the eleventh embodiment, it is possible to narrow the detection direction range when calculating the spectra in the AR spectrum estimating process of the azimuth detecting unit 30 and to improve the resolution, compared with the first to fifth embodiments.

Furthermore, by employing the configuration described above, it is like that the received waves divided with the reflected components of the target groups are virtually received in the normal equation used for the calculation of the AR coefficient in the azimuth detecting unit 30. Accordingly, for example, even when the received wave containing reflected components from more targets than the maximum order of the normal equation is received, the AR coefficient can be correctly calculated.

The azimuth detecting unit 30 performs the processes of estimating the order of the normal equation and averaging the normal equation, which are described in the fifth through eighth embodiments.

(Direction Estimation Characteristics in Embodiments)

The direction estimation characteristics of the electronic scanning radar apparatus according to the first to eleventh embodiments will be described below.

FIGS. 45 and 46 are diagrams illustrating the normalized eigenvalues and the effect on the wave number estimation of the electronic scanning radar apparatus according to the embodiments.

Part 1 of FIG. 45 shows a wave number estimation result when the number of target vehicles is one.

The horizontal axis represents the distance to the target and the vertical axis represents the normalized eigenvalues. The graph shows the determination result of the normalized eigenvalues using two threshold values Th1 and Th2 depending on the distance to the target. Here, the plot of a region surrounded with dotted lines in the graph is broken. This region means that the maximum eigenvalue is equal to or less than the threshold value and the wave number estimating process is cancelled.

The determination result indicates that an estimation result with a low wave number tends to be acquired when the number of target vehicles is one.

Part 2 of FIG. 45 shows the order estimation result when the number of target vehicles is two.

The horizontal axis represents the distance to the target and the vertical axis represents the normalized eigenvalues. The graph shows the determination result of the normalized eigenvalues using two threshold values Th1 and Th2 depending on the distance to the target, similarly to part 1 of FIG. 45.

The determination result indicates that an estimation result with a high wave number tends to be acquired when the number of target vehicles is plural.

In order to confirm the effect on the embodiments, a data point is selected in a region where it is determined that two waves are present but the target vehicles could not be separated as a result of the estimation using the second order modified covariance method which is a standard AR spectrum estimation method. For example, there is a data point corresponding the distance around 60 m where peaks cannot be separated in part 2 of FIG. 45, and the corresponding spectrum estimation result is shown in part 2 of FIG. 46.

With respect to the selected point, a power spectrum is estimated for the wave number of 2 using the main component AR spectrum estimation method described in the embodiments, and the estimated power spectrum is shown in part 1 of FIG. 46. In the results shown in part 1 of FIG. 46, the peak value is detected as separated two peaks, and thus the presence of the target of two vehicles is detected clearly.

In the electronic scanning radar apparatus according to the embodiments, by performing the direction estimating process based on the complex data of the detected beat frequencies setting the order of the normal equation performing the spectrum estimation using the azimuth detecting unit 30 and the estimated actual wave number, it is possible to improve the detection accuracy.

According to the embodiments of the present invention, the series of processes of averaging the normal equation, estimating the wave number and detecting the azimuth improves the azimuth detection accuracy, and it is possible to reduce the computational load and perform calculations efficiently.

By employing the first means, without newly creating a correlation matrix for resolving an eigenvalue, since the eigenvalue is resolved by the matrix configured by the elements of a covariance function using almost all the acquired channel (CH) data, it is possible to perform the eigenvalue decomposition process and the azimuth detecting process accurately. By employing the covariance matrix of the order being the same as the number of detectable targets, it is possible to perform calculating processes using a matrix having relatively small order and resolve eigenvalues with relatively light computational load.

For example, it is possible to calculate the eigenvalues with an order lower than the order of the correlation matrix created using the MUSIC method. This is because the calculation of a MUSIC spectrum in the subsequent step requires one or more white noise component vectors searching the orthogonality to a mode vector in addition to the same number of vectors as the maximum detectable number of targets.

Furthermore, by creating the normalized normal equation, it is possible to reduce the noise components and perform stable eigenvalue decomposition processes and the azimuth detecting processes.

Thanks to the second means, it is possible to connect the eigenvalue decomposition process with the wave estimating process in the subsequent stage and the azimuth detecting method (primary component AR spectrum estimating method) directly, and perform the processes efficiently.

Thanks to the third means, relatively easily, it is possible to estimate the wave number on the basis of effective use of the eigenvalue decomposition process in the previous stage. By determining the maximum eigenvalue, it is possible to prevent a wrong azimuth estimation, so that even if no peak is detected or after a peak is detected in the whole radar configuration (for example, when a spectrum estimation is performed for angles of all the distant point range or optional distance point range), it is possible to determine whether a wave number estimation should be performed for different threshold values.

Furthermore, by estimating a wave number on the basis of the normalized eigenvalues, it is possible to perform the wave number estimation determining process without depending on the distance of a target. By configuring plural threshold values of the eigenvalue, it is possible to set specific wave number estimation reference levels.

Thanks to the fourth means, after the stage of determining the wave number, it is possible to detect the azimuth for only the signal subspace (the noise subspace is removed).

Thanks to the fifth means, it is possible to improve the accuracy of the covariance matrix for performing the eigenvalue calculation in the previous stage and to improve the accuracy of the azimuth detection in the subsequent stage. Also, as a storage type, a storage of the complex data and the AR coefficients (when combined with the sixth means) with small memory capacity can be coped with.

Thanks to the sixth means, it is possible to average the AR coefficients in the past control cycle, so that the accuracy of the azimuth detection can be improved.

It has been stated that the first to fourth embodiments are applied to the FMCW type radar shown in FIG. 1, and that the fifth to fourth embodiments are applied to the FMCW type radar shown in FIG. 22, but the embodiments may be applied to other antennas of the FMCW type. Also, the processes of the data acquisition through the extraction of complex data (the frequency resolving process or the peak detecting process) can be calculated with not only the micro-computer in accordance with the embodiments but also the other devices, processors (FPGA, DSP, or microcomputer) or the like, so that the number of data acquisition can be increased and the accuracy of the azimuth detection can be improved.

The invention can employ types such as a multi-frequency CW and pulse radar other than the FMCW type.

In the above-mentioned embodiments, peaks of a power spectrum are calculated to calculate the number of targets and the azimuth. However, since the estimation can be performed using a spectrum created without multiplying the variance value of the input white noise thereby, it is possible to skip the calculation of the variance of the input white noise. The azimuth may be estimated at the pole by calculating a root of a high-order equation instead of a power spectrum.

The first to fourth embodiments perform the setting of the appropriate wave number of received signals and provide an electronic scanning radar apparatus, a received wave direction estimating method, which can accurately detect the direction of a target, and a received wave direction estimating program used therein.

A program for realizing the functions of the signal processing units 20A to 20H in FIGS. 1, 7, 15, 17, 19, 22, 23, 34, 38, 40 and 42 may be recorded into a computer-readable recording medium and the program recorded in the recording medium may be read and executed by a computer apparatus, thereby performing the signal process of detecting an azimuth from a received wave. The "computer apparatus" includes an OS and hardware such as peripherals. The "computer apparatus" also includes a WWW system having a homepage provision environment (or display environment). The "computer-readable recording medium" include a portable medium such as a flexible disc, a magneto-optical disc, a ROM, or a CD-ROM and a storage device, such as a hard disk incorporated into a computer system. The "computer-readable recording medium" also includes a device temporarily storing a program, such as an internal volatile memory (RAM) of a computer system serving as a server or a client when the program is transmitted through a network such as the Internet or a communication link such as a telephone line.

The program may be transmitted from a computer system having the program stored in a storage device thereof or the like to another computer system through a transmission medium or by carrier waves in the transmission medium. The "transmission medium" which transmits a program means a medium having a function of transmitting information and examples thereof include a network (communication network) such as the Internet and a communication link (communication line) such as a telephone line. The program may realize some of the above-described functions. The program may realize the above-described functions in combination with a program already recorded in a computer system, that is, the program may be a differential file (differential program).

In the embodiments, for example, when it is determined in step S106 that the maximum eigenvalue is smaller than the predetermined threshold value, it is determined that the reliability of the acquired information (complex data) is low and the order estimating process of the next step is not performed on the corresponding target, thereby preventing incorrect information from being provided.

For example, even when the processes of estimating the order and estimating the azimuth in the subsequent steps, information of a target in the corresponding cycle is not detected, and the target is lost, it is possible to similarly maintain the lost information of the target by using the extrapolation method with tracking which is typically performed in the subsequent steps as a recognition process of the radar. According to this technique, since it is possible to prevent a target from being lost, the idea that it is more desirable to cancel the incorrect estimation than to output the incorrect azimuth detection result is preferable. The idea that the azimuth detection should not be cancelled as much as possible may be right in some cases. In this case, the order estimation in the subsequent step is not performed but the order can be forcibly allocated to an order of a predetermined value (for example, one of the maximum order and the minimum order). By performing the model order estimating process including the maximum eigenvalue determination, it is effective in the case where it is determined whether the targets of which the peak is detected should be additionally subjected to the azimuth detection for each target or in the configuration in which the peak should be detected. An example of the configuration in which the peak should not be detected is a process configuration in which the azimuth detection is unconditionally performed on the overall points or any distance point.

What is claimed is:

1. An electronic scanning radar apparatus mounted on a moving object, comprising:
a receiving unit configured to include a plurality of antennas receiving a received wave arriving from a target having reflected a transmitted wave;
a beat signal generating unit configured to generate beat signals from the transmitted wave and the received wave;
a frequency resolving unit configured to resolve the beat signals into beat frequencies having a predetermined frequency bandwidth and calculate complex data based on the resolved beat signals for each beat frequency; and
an azimuth detecting unit configured to estimate a wave number of the received wave based on an eigenvalue being a component part of a normal equation having complex data as elements calculated based on the beat signals, create a coefficient calculated as a solution of a normal equation of a signal subspace formed based on eigenvalues and eigenvectors corresponding to a number of the estimated wave number, and calculate a DOA of the received wave based on the created coefficient.

2. The electronic scanning radar apparatus according to claim 1, wherein the azimuth detecting unit calculates the DOA of the received wave based on the normal equation of the signal subspace by an AR spectrum estimating method using an autoregressive model.

3. The electronic scanning radar apparatus according to claim 1, wherein the azimuth detecting unit estimates the wave number based on a calculated result according to a value of the eigenvalue, separates a signal subspace being effective and a noise subspace in response to the wave number, and calculates the coefficient from the signal subspace.

4. The electronic scanning radar apparatus according to claim 1, wherein the azimuth detecting unit calculates the coefficient based on the normal equation of the signal subspace formed from the eigenvector and the eigenvalue obtained by eigenvalue decomposition being a component part of the normal equation.

5. The electronic scanning radar apparatus according to claim 1, wherein the azimuth detecting unit calculates the eigenvalues and the eigenvectors from a matrix being a component part of the normal equation having the same order as the order being applied to the order of the normal equation created based on complex data calculated from the beat signals.

6. The electronic scanning radar apparatus according to claim 1, wherein the azimuth detecting unit calculates the eigenvalues and the eigenvectors from an averaged matrix being a component part of an averaged normal equation obtained by averaging a plurality of normal equations.

7. The electronic scanning radar apparatus according to claim 6, wherein the azimuth detecting unit creates the averaged normal equation for calculating the eigenvalues and the eigenvectors from complex data acquired in detection cycles corresponding to predetermined detection times including a present detection cycle in repeatedly performed detection cycles calculating the DOA of the received wave.

8. The electronic scanning radar apparatus according to claim 1, wherein the azimuth detecting unit performs an averaging process to a matrix and a right-hand vector being a component part of a normal equation having complex data as elements in advance of calculations of the eigenvalues and eigenvectors.

9. The electronic scanning radar apparatus according to claim 1, wherein the azimuth detecting unit determines the eigenvalues with a fixed threshold value being independent on a distance between the target and the electronic scanning radar apparatus and estimates the wave number.

10. The electronic scanning radar apparatus according to claim 1, wherein the azimuth detecting unit normalizes the eigenvalues based on a maximum value of the eigenvalues when a value calculated from the eigenvalues is equal or greater than a predetermined threshold value.

11. The electronic scanning radar apparatus according to claim 10, wherein a value calculated from the eigenvalues is either the maximum value of the eigenvalues or a sum total of the eigenvalues.

12. The electronic scanning radar apparatus according to claim 10, wherein the azimuth detecting unit determines values of the normalized eigenvalues bases on a predetermined threshold value, and selects the wave number based on a determination result of the values.

13. The electronic scanning radar apparatus according to claim 1, wherein the azimuth detecting unit selects the wave number based on each result determined from values calculated from the eigenvalues using plural threshold values.

14. The electronic scanning radar apparatus according to claim 1, wherein the azimuth detecting unit interrupts the wave number estimation process based on the value calculated from the eigenvalues.

15. The electronic scanning radar apparatus according to claim 14, wherein the azimuth detecting unit determines to interrupt the wave number estimation process based on either the maximum value of the eigenvalues or a sum total of the eigenvalues.

16. The electronic scanning radar apparatus according to claim 14, wherein the azimuth detecting unit interrupts a calculation process of the DOA of the received wave based on interruption of the wave number estimation process.

17. The electronic scanning radar apparatus according to claim 14, wherein the azimuth detecting unit forcibly sets an arbitrary predetermined wave number as the wave number based on interruption of the wave number estimation process.

18. The electronic scanning radar apparatus according to claim 1, further comprising:
a memory unit configured to store complex data based on the beat signals detected in detection cycles repeatedly calculating the DOA of the received wave; and
a target link unit configured to correlate with a target to be detected and store the complex data correlated with the correlated target to the memory unit in a present detection cycle and a past detection cycle performed before the present detection cycle.

19. The electronic scanning radar apparatus according to claim 18, wherein
the memory unit stores the distance from the correlated target and the relative velocity of the correlated target detected in the past detection cycle in correlation with the complex data or a normal equation, and the target link unit correlates the target in the present detection cycle and a target in the past detection cycle time sequentially related to the present detection cycle being correlated with the target in the present detection cycle.

20. The electronic scanning radar apparatus according to claim 18, wherein when the target link unit correlates targets respectively detected in the present and past detection cycles, the target link unit detects whether or not the targets in the present and past detection cycles correspond to the correlated target based on a result determined whether a present distance and a present relative velocity obtained from a detection beat frequency in the present detection cycle is respectively included in a distance range and a relative velocity range calculated based on a past distance and a past relative velocity obtained in the past detection cycle.

21. The electronic scanning radar apparatus according to claim 18, wherein the azimuth detecting unit creates the matrix being a component part of the averaged normal equation for calculating the eigenvalues and the eigenvectors including the complex data acquired in the past detection cycle.

22. The electronic scanning radar apparatus according to claim 18, wherein the azimuth detecting unit includes the normal equation calculated in the past detection cycle with the matrix being a component part of the normal equation and the averaged normal equation for calculating the eigenvalues and the eigenvectors.

23. The electronic scanning radar apparatus according to claim 18, wherein the azimuth detecting unit estimates a spectrum by averaging the coefficient calculated from the normal equation of the signal subspace for calculating the DOA of the received wave and another coefficient calculated based on the normal equation of the signal subspace in the past detection cycle.

24. The electronic scanning radar apparatus according to claim 1, further comprising:
a target detecting unit configured to detect a presence of the target by detecting a peak value from an intensity value of the beat frequency,
wherein the azimuth detecting unit calculates the DOA of the received wave based on complex data corresponding to the target which the target detecting unit has detected the presence of the target.

25. The electronic scanning radar apparatus according to claim 24, further comprising:
a DBF processing unit configured to detect the presence of the target and an azimuth of the target based on a digital beam forming process increasing a detection sensitivity of the received wave receiving from a predetermined direction based on the complex data; and
a target link unit configured to correlate with the detected target and store the complex data correlated with the correlated target to the memory unit in a present detection cycle and a past detection cycle performed before the present detection cycle,
wherein the target detecting unit further includes
a normal equation creating unit configured to create a normal equation and detect an azimuth of the target based on the digital beam forming process of the beat frequency in the present detection cycle, and
the target link unit correlates with the target in the present and past detection cycles with respect to a distance, a relative velocity and an azimuth.

26. The electronic scanning radar apparatus according to claim 25,
wherein the DBF processing unit further includes
a channel deleting unit configured to detect a target, determine the target as a DBF detection target, replace a spectrum intensity of an angular channel where a target has not been detected with "0," and output resultant data as new spatial complex data, when intensities of spectra of adjacent angular channels are greater than a predetermined DBF threshold values in a predetermined angular channel range, and
an IDBF processing unit configured to create a recreated complex data obtained by applying an inverse DBF processing to the new spatial complex data,
wherein the normal equation creating unit creates the normal equation from the recreated complex data.

27. The electronic scanning radar apparatus according to claim 26, wherein
the channel deleting unit divides a spectrum into each angular channel range corresponding to the DBF detection target when a plurality of DBF detection targets are detected and creates spatial complex data corresponding to a number of the DBF detection targets,
the IDBF processing unit creates the recreated complex data for each of the DBF detection targets by applying the inverse DBF processing to the spatial complex data of each of the DBF detection targets, and
the normal equation creating unit calculates a normal equation for each of the DBF detection targets based on the recreated complex data for each of the DBF detection targets.

28. A received wave direction estimating method using an electronic scanning radar apparatus mounted on a moving object, comprising:
a receiving step of receiving a received wave arriving from a target having reflected a transmitted wave by use of a receiving unit including a plurality of antennas;
a beat signal generating step of generating beat signals from the transmitted wave and the received wave by use of a beat signal generating unit;
a frequency resolving step of resolving the beat signals into beat frequencies having a predetermined frequency bandwidth and calculating complex data based on the resolved beat signals for each beat frequency by use of a frequency resolving unit; and
a azimuth estimating step of estimating a wave number of the received wave based on an eigenvalue being a component part of a normal equation having complex data as elements calculated based on the beat signals, creating a coefficient calculated as a solution of a normal equation of a signal subspace formed based on eigenvalues and eigenvectors corresponding to a number of the estimated wave number, and calculating a DOA of the received wave based on the created coefficient by use of an azimuth detecting unit.

29. A received wave direction estimating program for causing a computer to control operations on a received wave direction estimation by use of an electronic scanning radar apparatus mounted on a moving object, the program causing a computer to execute:
a receiving process that receives a received wave arriving from a target having reflected a transmitted wave by use of a receiving unit including a plurality of antennas;
a beat signal generating process that generates beat signals from the transmitted wave and the received wave by use of a beat signal generating unit;
a frequency resolving process that resolves the beat signals into beat frequencies having a predetermined frequency bandwidth and calculates complex data based on the resolved beat signals for each beat frequency by use of a frequency resolving unit; and
a azimuth estimating process that estimates a wave number of the received wave based on an eigenvalue being a component part of a normal equation having complex data as elements calculated based on the beat signals, creates a coefficient calculated as a solution of a normal equation of a signal subspace formed based on eigenvalues and eigenvectors corresponding to a number of the estimated wave number, and calculates a DOA of the received wave based on the created coefficient by use of an azimuth detecting unit.

* * * * *